US011409744B2

(12) United States Patent
Shah et al.

(10) Patent No.: US 11,409,744 B2
(45) Date of Patent: Aug. 9, 2022

(54) QUERY GENERATION BASED ON MERGER OF SUBQUERIES

(71) Applicant: ThoughtSpot, Inc., Sunnyvale, CA (US)

(72) Inventors: Naman Shah, Sunnyvale, CA (US); Rakesh Kothari, San Jose, CA (US); Archit Bansal, Cupertino, CA (US)

(73) Assignee: ThoughtSpot, Inc., San Jose, CA (US)

( * ) Notice: Subject to any disclaimer, the term of this patent is extended or adjusted under 35 U.S.C. 154(b) by 0 days.

(21) Appl. No.: 16/945,735

(22) Filed: Jul. 31, 2020

(65) Prior Publication Data

US 2021/0034625 A1 Feb. 4, 2021

Related U.S. Application Data

(60) Provisional application No. 62/881,545, filed on Aug. 1, 2019.

(51) Int. Cl.
*G06F 16/2453* (2019.01)
*G06F 16/2455* (2019.01)
(Continued)

(52) U.S. Cl.
CPC ...... *G06F 16/24542* (2019.01); *G06F 16/248* (2019.01); *G06F 16/2456* (2019.01); *G06F 16/24535* (2019.01); *G06F 16/9024* (2019.01)

(58) Field of Classification Search
None
See application file for complete search history.

(56) References Cited

U.S. PATENT DOCUMENTS 5,649,591 A 7/1997 Green
6,449,605 B1 * 9/2002 Witkowski ........ G06F 16/24537
(Continued)

FOREIGN PATENT DOCUMENTS

EP 268367 A2 5/1988
EP 1587011 A1 10/2005
(Continued)

OTHER PUBLICATIONS

Avrach, A., Thoughtspot.com, "What the Bleep is a Chasm Trap?", https://www.thoughtspot.com/fact-and-dimension/what-bleep-chasm-trap 9/, Date Unknown, Downloaded Apr. 2, 2019 (9 pp).
(Continued)

*Primary Examiner* — Giuseppi Giuliani
(74) *Attorney, Agent, or Firm* — Young Basile Hanlon & MacFarlane, P.C.

(57) ABSTRACT

Systems and methods for query generation based on merger of subqueries are described. For example, methods may include accessing a first join graph representing tables in a database, wherein the first join graph has vertices corresponding to respective tables in the database and directed edges corresponding to join relationships; receiving a first query specification that references data in two or more of the tables of the database to specify multiple subqueries in a set of subqueries; checking that two or more subqueries from the set of subqueries have the same join graph; checking that the two or more subqueries have the same set of grouping columns; responsive, at least in part, to the two or more subqueries having the same join graph and the same set of grouping columns, merging the two or more subqueries to obtain a consolidated query.

20 Claims, 40 Drawing Sheets

(51) Int. Cl.
*G06F 16/248* (2019.01)
*G06F 16/901* (2019.01)

(56) References Cited

U.S. PATENT DOCUMENTS

| | | | |
|---|---|---|---|
| 8,577,913 | B1 | 11/2013 | Hansson et al. |
| 9,275,132 | B2 | 3/2016 | Roberts et al. |
| 9,405,794 | B2 | 8/2016 | Prakash et al. |
| 2004/0267730 | A1 | 12/2004 | Dumais et al. |
| 2005/0027717 | A1 | 2/2005 | Koudas et al. |
| 2005/0289124 | A1 | 12/2005 | Kaiser et al. |
| 2006/0167865 | A1 | 7/2006 | Andrei |
| 2007/0185833 | A1 | 8/2007 | Turkel et al. |
| 2007/0192300 | A1 | 8/2007 | Reuther et al. |
| 2007/0219974 | A1 | 9/2007 | Chickering et al. |
| 2008/0109422 | A1 | 5/2008 | Dedhia |
| 2008/0262999 | A1 | 10/2008 | Helsen et al. |
| 2009/0019019 | A1 | 1/2009 | Jones et al. |
| 2009/0019022 | A1 | 1/2009 | Schallert et al. |
| 2010/0017395 | A1 | 1/2010 | Wayn et al. |
| 2011/0113048 | A1 | 5/2011 | Njemanze |
| 2012/0066206 | A1 | 3/2012 | Chappell et al. |
| 2012/0066217 | A1 | 3/2012 | Eder |
| 2012/0254251 | A1 | 10/2012 | Barbosa et al. |
| 2013/0339370 | A1 | 12/2013 | Holstege et al. |
| 2014/0172914 | A1* | 6/2014 | Elnikety ............ G06F 16/9024 707/774 |
| 2014/0201241 | A1 | 7/2014 | Wood et al. |
| 2014/0337371 | A1 | 11/2014 | Li |
| 2017/0270159 | A1 | 9/2017 | Wang et al. |
| 2019/0026337 | A1 | 1/2019 | Aksman |
| 2020/0341978 | A1 | 10/2020 | Shah et al. |

FOREIGN PATENT DOCUMENTS

| | | | |
|---|---|---|---|
| EP | 2202658 | A2 | 6/2010 |
| EP | 2207106 | A2 | 7/2010 |
| WO | 0141002 | A1 | 6/2001 |
| WO | 2015009353 | A1 | 1/2015 |

OTHER PUBLICATIONS

Sisense, "Chasm and Fan Traps", https://documentation.sisense.com/latest/managing-data/working-with-data/chasm-fan-traps.htm. Date Unknown, Downloaded Apr. 2, 2019 (8 pp).

Thoughtspot, "Chasm Traps", https://docs.thoughtspot.com/4.4/admin/loading/chasm-trap.html, Version 4.4 Guides, Date Unknown, Downloaded Apr. 2, 2019 (4 pp).

Morton, K., et al., "Dynamic Workload Driven Data Integration In Tableau", Proceedings of the 2012 International Conference on Management of Data, SIGMOD '12, Jan. 1, 2012, p. 807 (9 pp).

Extended European Search Report dated Jul. 26, 2019, issued in co-pending EP Application No. 19166422.6 (11 pp).

Sayyadian et al., "Efficient Keyword Search Across Heterogeneous Relational Databases", 2007, IEEE, 346-355 (10 pp).

Wu et al: "Towards Keyword-Driven Analytical Processing", Proceedings of the 2007 ACM Sigmod International Conference on Management of Data, Sigmo '07, Jun. 12, 2007, (12 pp).

Anonymous: "File System Permission—Wikipedia, The Free Encyclopedia." Jun. 11, 2013 (Jun. 11, 2013); URL http://en.wikipedia.org/w/index/php?title.sub.—File.sub.—system.sub.—p- ermissions &oldid=559455322 [retrieved on May 11, 2014]; (8 pp).

Shi et al.: "50x Faster: Speeding Up An SQL-Based Legacy System With Few Changes", Oct. 4, 2011 Retrieved from Internet: URL: http://www.user.tu-berline.de/komm/CD/paper/040221.pdf [retrieved on Jun. 11, 2014]. (12 pp).

Li et al: "Efficient Type-Ahead Search on Relational Data: a TASTIER Approach", Sigmod-Pods '09: Compilation Proceedings of the International Conference on Management Data & 28th Symposium on Principles of Database Systems; Providence, RI,USA, Association for Computing Machines, New York NY Jun. 29, 2009, pp. 695-706 (12 pp).

Blunschi et al: "SODA: Generating SQL for Business Users", Proceedings of the VLDB Endowment, vol. 5, No. 10, Aug. 27, 2012 pp. 932-935 (12 pp).

Baid et al: "Toward Scalable Keyword Search over Relational Data", Proceedings of the VLDS Endowment, vol. 3, No. 1-2, Sep. 1, 2010, pp. 140-149 (10 pp).

Jajodia et al., "Flexible Support for Multiple Access Control Policies", ACM Transactions on Database Systems, ACM New York, NY, USA, vol. 26, No. 2, Jun. 1, 2001, pp. 217-228 (48 pp).

Anonymous, "Natural Language Processing", Wikipedia, Downloaded Jan. 30, 2019, https://en.wikipedia.org/wiki/Natural_language_processing, (8 pp).

Seif, G., "An Easy Introduction to Natural Language Processing—Using Computers to Understand Human Language", Oct. 1, 2018 (Downloaded Jan. 30, 2019), https://towardsdatascience.com/an-easy-introduction-to-natural-language-processing-b1e2801291c1, (11 pp).

Extended European Search Report received in co-pending Application No. EP 19160657.3 dated Apr. 4, 2019 (11 pp).

International Search Report and Written Opinion for PCT/US14/39230; dated Nov. 24, 2014 (16 pp).

Wikipedia, "Consistent hashing", https://en.wikipedia.org/wiki/Consistent_hashing, Date Unknown, Downloaded Aug. 15, 2019, (5 pp).

Eades, Peter, et al., "A Fast & Effective Heuristic for the Feedback Arc Set Problem," Information Processing Letters, vol. 47, Issue 6, Oct. 18, 1993, pp. 319-323.

Wikipedia, "Dijkstra's algorithm", Date Unknown, downloaded Jul. 16, 2019, https://en.wikipedia.org/wiki/Dijkstra%27s_algorithm (11 pp).

* cited by examiner ns corresponding to respective tables in the database and directed edges corresponding to join relationships; receive a first query specification that references data in two or more of the tables of the database to specify multiple subqueries in a set of subqueries; check that two or more subqueries from the set of subqueries have the same join graph; check that the two or more subqueries have the same set of grouping columns; and responsive, at least in part, to the two or more subqueries having the same join graph and the same set of grouping columns, merge the two or more subqueries to obtain a consolidated query.

QUERY GENERATION BASED ON MERGER OF SUBQUERIES

CROSS-REFERENCE TO RELATED APPLICATION(S)

This application claims priority to and the benefit of U.S. Provisional Application Patent Ser. No. 62/881,545, filed Aug. 1, 2019, the entire disclosure of which is hereby incorporated by reference.

BACKGROUND

Databases can be used to store vast quantities of data regarding complex systems and provide access to that data via interfaces, such as a user interface (e.g., a webpage with a search query field). Queries on databases can sometimes produce unexpected or counterintuitive results, particularly when a schema of the database being interrogated is complex.

SUMMARY

Disclosed herein are implementations of query generation based on merger of subqueries.

An aspect of the disclosure is a system for query generation. The system may include a memory, a processor, and a network interface. The memory may store instructions executable by the processor to: access a first join graph representing tables in a database, wherein the first join graph has vertices corresponding to respective tables in the database and directed edges corresponding to join relationships; receive a first query specification that references data in two or more of the tables of the database to specify multiple subqueries in a set of subqueries; check that two or more subqueries from the set of subqueries have the same join graph; check that the two or more subqueries have the same set of grouping columns; and responsive, at least in part, to the two or more subqueries having the same join graph and the same set of grouping columns, merge the two or more subqueries to obtain a consolidated query.

An aspect of the disclosure is a method for query generation. The method may include accessing a first join graph representing tables in a database, wherein the first join graph has vertices corresponding to respective tables in the database and directed edges corresponding to join relationships; receiving a first query specification that references data in two or more of the tables of the database to specify multiple subqueries in a set of subqueries; checking that two or more subqueries from the set of subqueries have the same join graph; checking that the two or more subqueries have the same set of grouping columns; responsive, at least in part, to the two or more subqueries having the same join graph and the same set of grouping columns, merging the two or more subqueries to obtain a consolidated query; invoking a transformed query on the database that is based on the consolidated query to obtain a transformed query result; and presenting data based on the transformed query result.

An aspect of the disclosure is a non-transitory computer-readable storage medium for query generation. The non-transitory computer-readable storage medium may include executable instructions that, when executed by a processor, facilitate performance of operations including: accessing a first join graph representing tables in a database, wherein the first join graph has vertices corresponding to respective tables in the database and directed edges corresponding to join relationships; receiving a first query specification that references data in two or more of the tables of the database to specify multiple subqueries in a set of subqueries; checking that two or more subqueries from the set of subqueries have the same join graph; checking that the two or more subqueries have the same set of grouping columns; responsive, at least in part, to the two or more subqueries having the same join graph and the same set of grouping columns, merging the two or more subqueries to obtain a consolidated query; invoking a transformed query on the database that is based on the consolidated query to obtain a transformed query result; and presenting data based on the transformed query result.

BRIEF DESCRIPTION OF THE DRAWINGS

The disclosure is best understood from the following detailed description when read in conjunction with the accompanying drawings. It is emphasized that, according to common practice, the various features of the drawings are not to scale. On the contrary, the dimensions of the various features are arbitrarily expanded or reduced for clarity.

DETAILED DESCRIPTION

Figure 1:
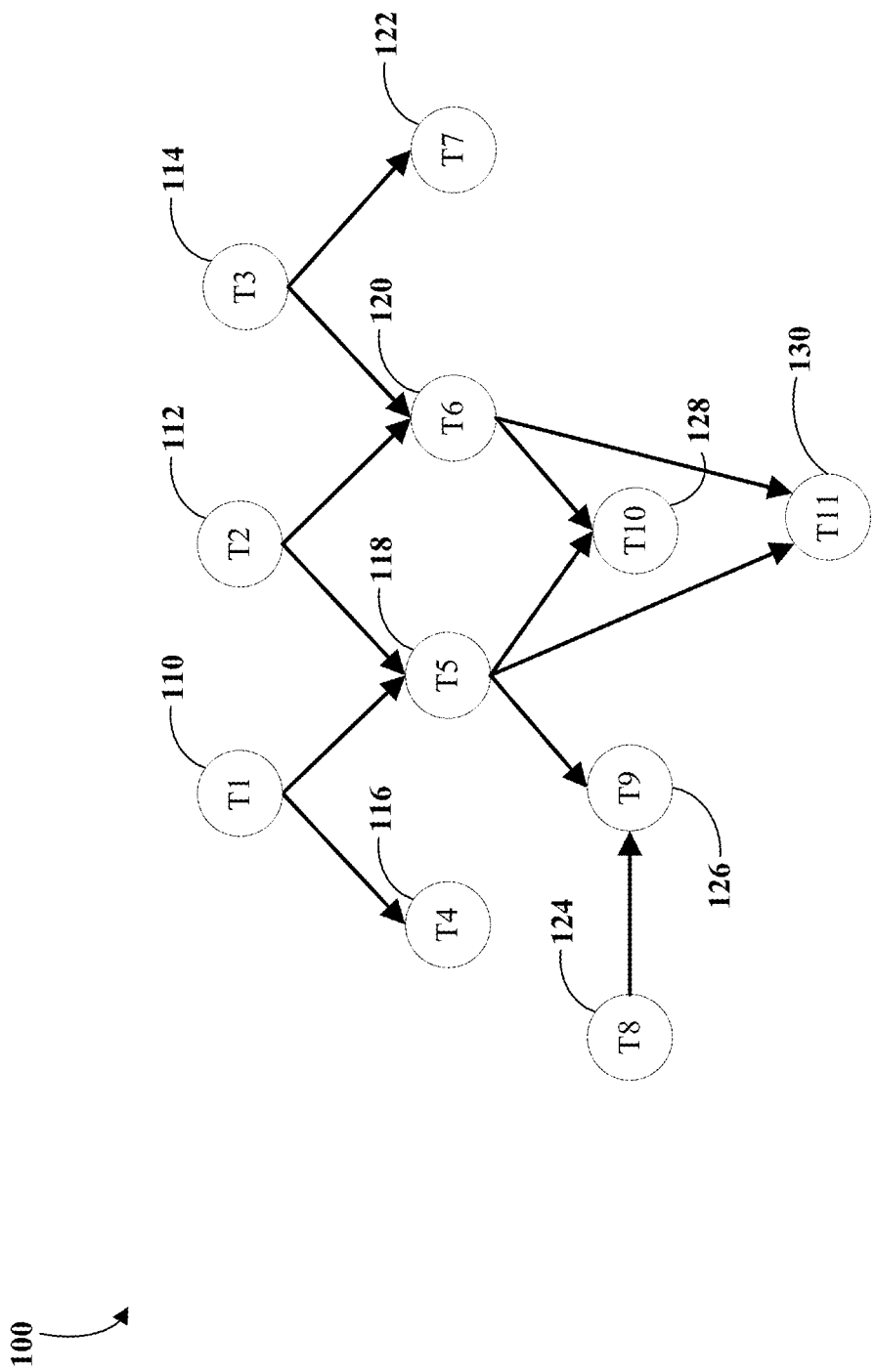
FIG. 1 is a diagram of an example of a join graph representing tables in a database.

Described herein are systems and techniques for query generation based on a logical data model. The complexity of a database schema (e.g., chasm traps, fan traps, or nested chasm traps) can create challenges for a user to conduct meaningful analysis of the data stored in a database. Query transformation based on a logical data model may be used to detect complexities of a database schema by examining a join graph of the schema in a logical data model, and seamlessly using this information to transform a user query to avoid double-counting and other logical errors in the presence of the detected complexity of the schema. A connected subgraph of the join graph is selected that includes the tables of the database referenced by an input query. A multi-root transformed query may be generated based on the roots of this connected subgraph and the tables including measures referenced in the input query, which correspond to leaf queries of the multi-root transformed query. Primary keys for shared dimension tables in the connected subgraph may also be inserted into the leaf queries of the multi-root transformed query to facilitate proper joining of leaf query results. The multi-root transformed query may be represented as graph or tree of queries, including the leaf queries and join operations, with the root node of the query graph corresponding to the final multi-root transformed query after all the results of the leaf queries are joined.

Formulas of the query may also be transformed to avoid logical errors caused by the database schema. For example, a formula may be decomposed into component formulas that can properly be pushed down to relevant leaf queries of the multi-root transformed query. The component formula may be composed to a transformed formula in the root query node of the multi-root transformed query.

Indications that particular edges of a join graph actually correspond to a one-to-one join relationship between the tables corresponding to the source vertex and the destination vertex of the edge may be used to simplify a multi-root query transformation and generate more efficient transformed queries. In some database systems, joins created in a database schema may be initially modeled as many-to-one joins in order to robustly handle chasm traps and/or fan traps in the absence of more detailed knowledge of the join relationships among the tables in a database. Some implementations, enable users to mark the join between two tables within a worksheet as a one-to-one join. In chasm trap and fan trap schemas, a query generation/transformation workflow may create subqueries in order to prevent over-counting. Recognizing one-to-one joins may prevent or reduce the need for the breakdown into these subqueries, so less queries are sent to the database and performance (e.g., speed and/or power consumption) of a database interface may be enhanced.

A chain of transformations may be applied to address a variety of challenges in a modular way. A query visualization service provides transparency into the query transformations that are applied by the system.

The systems and techniques described herein may offer advantages over prior systems for interrogating databases. For example, chasm traps and fan traps may be detected and queries may be seamlessly transformed to avoid over-counting of measures in the presence of these database schema hazards. For example, the systems and techniques may provide robust and accurate query results over a wide variety of database schema with little overhead for data modeling. For example, these systems and techniques may provide query modularity and query optimizations by using a chain of query transformers that may optimize the query early in the query transformation process. For example, these systems and techniques may provide transparency of the query transformations by providing a query visualizer to help users understand the details of query planning. For example, these systems and techniques may simplify operation of a database interface requiring little data modeling to enable robust query performance.

FIG. 1 is a diagram of an example of a join graph 100 representing tables in a database. As used herein, the term table refers to a collection of data stored in a database that is organized in one or more columns. A table is a logical data structure that may correspond to, for example, a physical table that is stored in the database as it appears to a user; a view, which is the result of a query on the database that reflects data stored in the database; or a worksheet. In the example of FIG. 1, the join graph 100 includes vertices (110, 112, 114, 116, 118, 120, 122, 124, 126, 128, and 130) corresponding to respective tables in the database (T1, T2, T3, T4, T5, T6, T7, T8, T9, T10, and T11). The arrows, representing directed edges of the join graph 100, go in the direction from many-to-one join.

Let $T(m\_k)$ be the kth measure in a table T, $T(a\_k)$ be the kth attribute in a table T, and $T(p\_k)$ denote the primary key in table T. Let "sum $T(m\_k)$" represent applying aggregation of a "sum" formula to the measure "$T(m\_k)$". The "root" tables in the join graph 100 are the tables with no incoming edges (e.g., T1, T2, and T3). A database interface may allow for the organizing of this collection of tables and joins in an entity called "Worksheet" and a user typically queries over a worksheet. The join graph 100 may be part of a data model for the data stored in theses tables of the database.

Consider a collection of tables in a database with schema like the one depicted in FIG. 1. For example, a database interface may include a keyword-based search engine, and the grouping columns and aggregation in the query may be inferred based on the properties of the columns involved in the query. For example, "sum T1(m_1) T4(a_1)" may be expressed in a structured query language (e.g., similar to SQL) as: "SELECT sum(T1(m_1)), T4(a_1) FROM T1, T4 WHERE T1(f_k)=T4(p_k) GROUP BY T4(a_1)". T1(f_k) is the foreign key to table T4, and T4(p_k) is the primary key of table T4.

Various challenges that are possible with queries on such a schema are described below.

Chasm Trap

Figure 2:
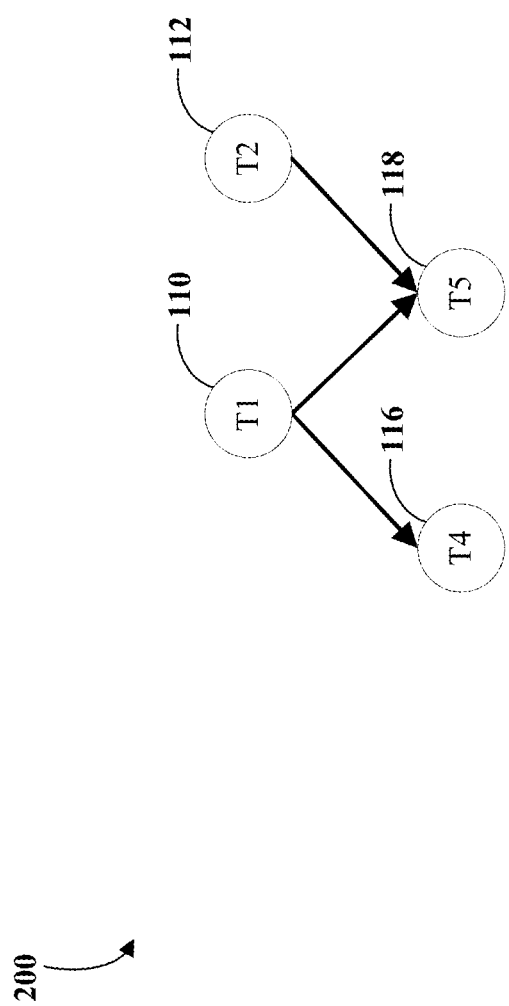
FIG. 2 is a diagram of an example of a connected subgraph of a join graph representing tables in a database.

FIG. 2 is a diagram of an example of a connected subgraph 200 of a join graph representing tables in a database. In this example, the connected subgraph 200 is a subgraph of the join graph 100 of FIG. 1 that includes the vertices (110, 112, 116, and 118) respectively corresponding to the tables (T1, T2, T4, and T5) and the directed edges connecting these vertices.

Consider a search query Q like: "sum T1(m_1) sum T2(m_1) T4(a_1) T5(a_1)" in which there are two measures, T1(m_1) and T2(m_1), and two attributes, T4(a_1) and T5(a_1). For example, the connected subgraph 200 of FIG. 2 is a relevant schema for this query. This query is called a "chasm trap" query with two fact tables T1 and T2 and two dimension tables T4 and T5. This query may be broken down as:

Q1: "sum T1(m_1) T4(a_1) T5(a_1) T5(p_k)"
Q2: "sum T2(m_1) T5(a_1) T5(p_k)"
Join (Q1, Q2): "sum Q1(m_1) sum Q2(m_1) Q1(a_1) Q2(a_1)"

Note that the above breakdown may serve to prevent over-counting of T1(m_1) and T2(m_1) that would otherwise happen if aggregation is applied after all the joins are applied.

Fan Trap

Figure 3:
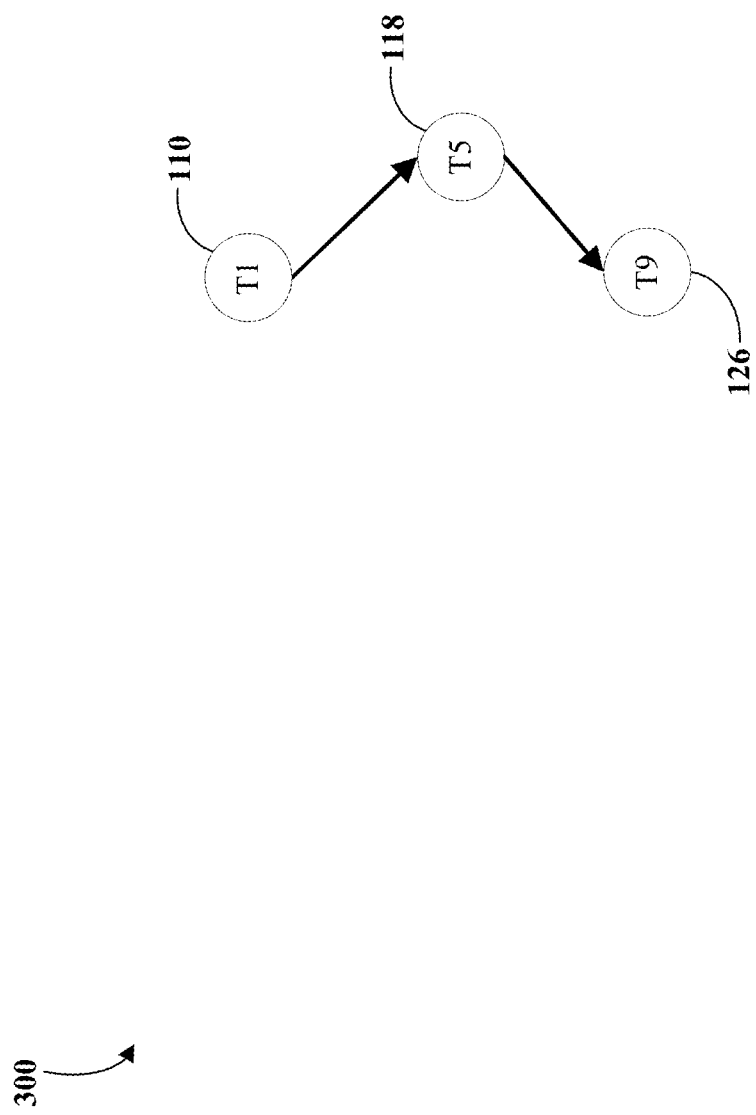
FIG. 3 is a diagram of an example of a connected subgraph of a join graph representing tables in a database.

FIG. 3 is a diagram of an example of a connected subgraph 300 of a join graph representing tables in a database. In this example, the connected subgraph 300 is a subgraph of the join graph 100 of FIG. 1 that includes the vertices (110, 118, and 126) respectively corresponding to the tables (T1, T5, and T9) and the directed edges connecting these vertices.

Consider a search query Q like: "sum T1(m_1) sum T5(m_1) T9(a_1)" in which there are two measures T1(m_1) and T2(m_1) and an attribute T9(a_1). For example, the connected subgraph 300 of FIG. 3 is a relevant schema for this query. This query may be broken down as:

Q1: "sum T1(m_1) T5(p_k) T9(a_1)"
Q2: "sum T5(m_1) T5(p_k)"
Join (Q1, Q2): "sum Q1(m_1) sum Q2(m_1) Q1(a_1)"

This query is called a "fan trap" query because there is a measure T5(m_1) that is going to be over-counted if the aggregation is applied after joining all the tables. Hence, the above breakdown may serve to prevent over-counting.

Attribution Dimension

Figure 4:
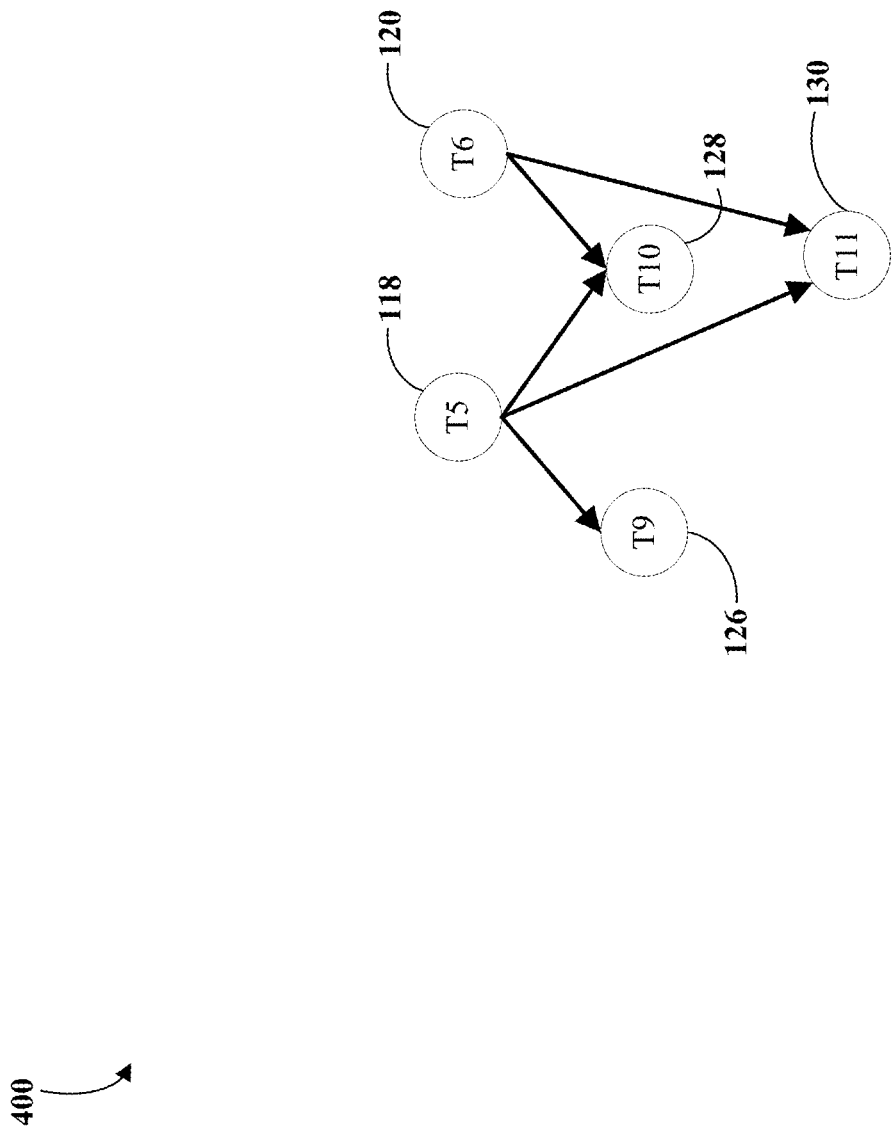
FIG. 4 is a diagram of an example of a connected subgraph of a join graph representing tables in a database.

FIG. 4 is a diagram of an example of a connected subgraph 400 of a join graph representing tables in a database. In this example, the connected subgraph 400 is a subgraph of the join graph 100 of FIG. 1 that includes the vertices (118, 120, 126, 128, and 130) respectively corresponding to the tables (T5, T6, T9, T10, and T11) and the directed edges connecting these vertices.

Consider a query Q like: "T9(a_1) sum T6(m_1)". For example, the connected subgraph 400 of FIG. 4 is a relevant schema for this query. In order to correctly compute "sum T6(m_1)" for each value of T9(a_1), primary keys for shared dimension tables, T10(p_k) and T11(p_k), may be included in the query. Here, T10 and T11 are called "attribution dimension" tables because they help correctly compute and attribute measures from the root tables like T6(m_1) to the dimension tables like T9(a_1) that are not shared with all the roots of the query.

A query generation algorithm may be implemented to automatically handle chasm and fan traps and auto-infer joins to solve the problem of "attribution" of measures to dimension tables.

Rule-Based Query Handling

A seemingly simple query can have many interesting scenarios that may be handled based on a series of rules. Listed below are some such rules:

1) Query can have interesting combination of chasm and fan traps.

2) Query can have aggregate/non-aggregate functions that may be decomposed in a certain way. For example, a chasm trap query can have aggregate functions like "unique count" that may be broken down into "SetUnion" in the leaf query and "SetSize" in the root query in order to accurately compute the unique count. This process of breaking down a formula and appropriately composing the formula may be referred to as "Formula Planning".

3) Query can have "row level security" (RLS) rules associated with tables. These rules are filters that filter out rows from a table based on group membership of a user. These rules may be applied to any query on the secured table for a user.

4) Query can have special functions that inherit certain properties of the queries on which they are used. For example, "group functions" have their own grouping columns but may inherit filters from the query in which they are used, and "windowing functions" may inherit their partition columns from the query.

5) Query can have special join rules. For example, join rules could dictate the "outerness of a join" (e.g., RIGHT/LEFT/FULL outer). Similarly, join rules could dictate if additional joins are to be applied.

6) A query can be part of a complex query graph (e.g., it could be operating on the results of other queries saved as views which themselves can depend on other queries). All the queries in this graph may be planned for in an execution plan.

Query Visualization

Query generation may involve a lot of complex rules, and a database interface system may hide this complexity from a user to help make a user experience seamless. A challenge, however, is to explain the query plan in simple terms to a user such that the user knows exactly how it is executed. This transparency may be critical to build trust in the system and help a user detect if a particular query is not handled in a desirable manner. A database interface system may implement a query visualizer to provide this transparency. For example, the query visualizer may allow a user to drill down into the details (e.g., all the details) of a query in as much depth as the user want, so as to make the system transparent.

Figure 5:
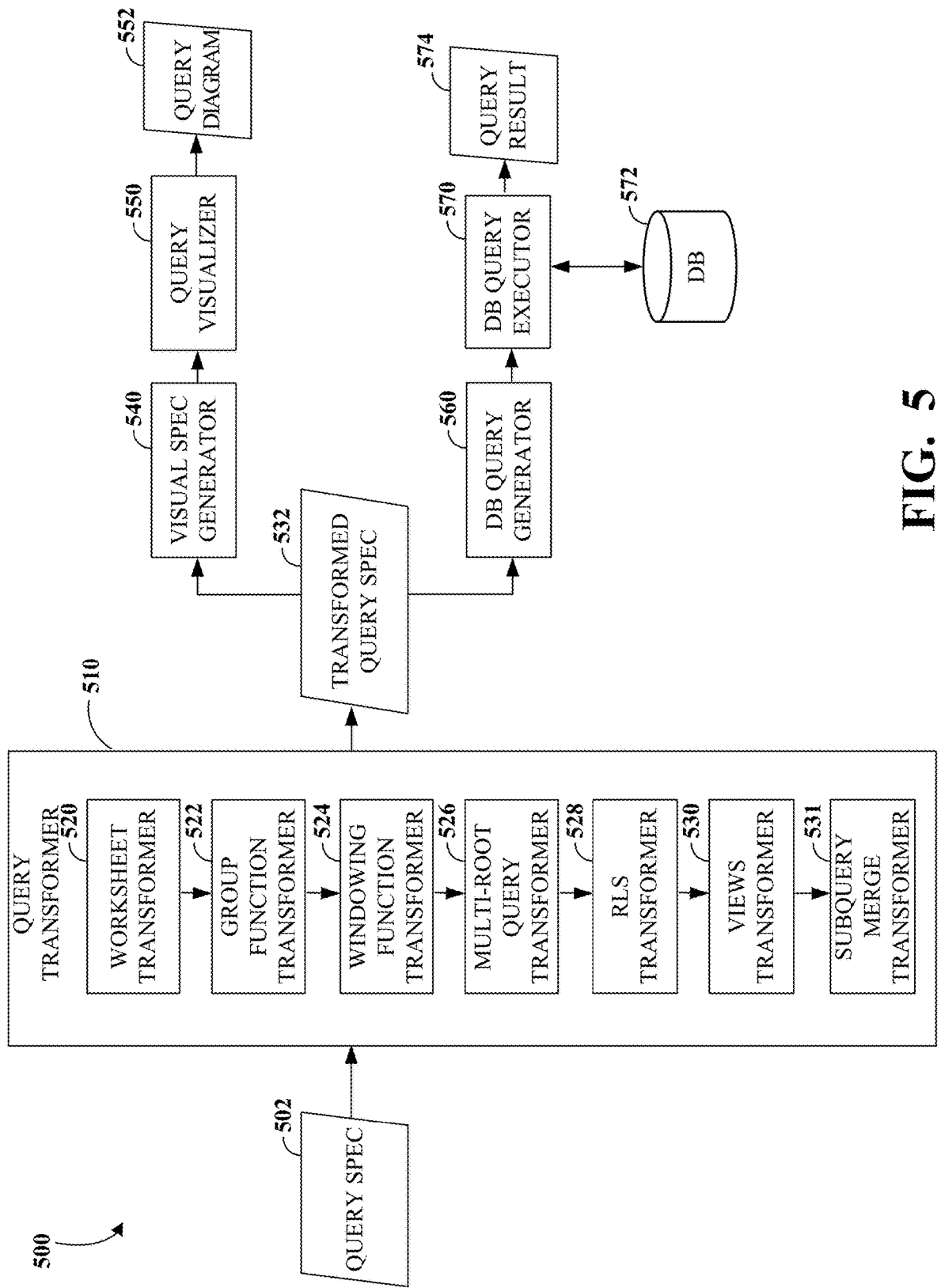
FIG. 5 is a block diagram illustrating an example of a system for transforming and executing a query on a database with visualization of the transformed query.

Query generation is modeled as a series of transformation steps, where an incoming query is slightly transformed based on the properties of the query and the rules of query generation, as illustrated in FIG. 5.

FIG. 5 is a block diagram illustrating an example of a system 500 for transforming and executing a query on a database with visualization of the transformed query. The system 500 includes a query transformer 510 that takes as input a query specification 502, which is a database agnostic representation of a query on logical entities in the system such as Worksheet, Views, or Logical Tables. The query transformer 510 applies a series of transformations to the query specification 502 using a chain of transformers (520, 522, 524, 526, 528, 530 and 531) to obtain a transformed query specification 532 that may be applied to a database 572 and/or presented to a user via a query visualization interface. Each of the series of transformers (520, 522, 524, 526, 528, 530, and 531) may be configured to handle a specific peculiarity of the incoming query, such as the following:

1) A worksheet transformer 520 may be configured to handle the query on a worksheet, resolving the columns in the worksheet to its underlying tables. The worksheet transformer 520 may also apply various properties that a worksheet is configured with, such as "join rules", "joining with additional tables", etc.

2) A group function transformer 522 may be configured to handle queries containing "group functions". Group functions are like sub-queries in themselves whose grouping columns are fixed and can potentially be different from the grouping columns in the query. These functions may inherit the filters from a parent query.

3) A windowing function transformer 524 may be configured to handle queries containing "windowing functions". These functions may inherit their partition columns from a parent query.

4) A multi-root query transformer 526 may be configured to handle queries that have multiple roots (e.g., chasm and fan trap queries). The multi-root query transformer 526 may implement the core of a query generation algorithm, handling various kinds of modeling traps.

5) An RLS transformer 528 may be configured to apply row level security rules.

6) A views transformer 530 may be configured to handle queries that are built upon other sub-queries (in other words, database views).

7) A subquery merge transformer 531 may be configured to merge eligible subqueries of a query specification. For example, the subquery merge transformer 531 may implement the technique 3900 of FIG. 39.

The fully transformed query specification 532 then feeds into the following two components:

1) A visual spec generator 540 may be configured to produce the visual specification of query used by a query visualizer 550 to present a query diagram 552 (e.g., the query diagram 600 of FIG. 6) to visually explain the query to a user.

2) A database query generator 560 may be configured to produce a database-specific query, which is then executed by a database query executor 570 in a corresponding database 572 to produce a query result 574 that may be subsequently presented to users (e.g., as charts, plots, or lists of data).

Figure 6:
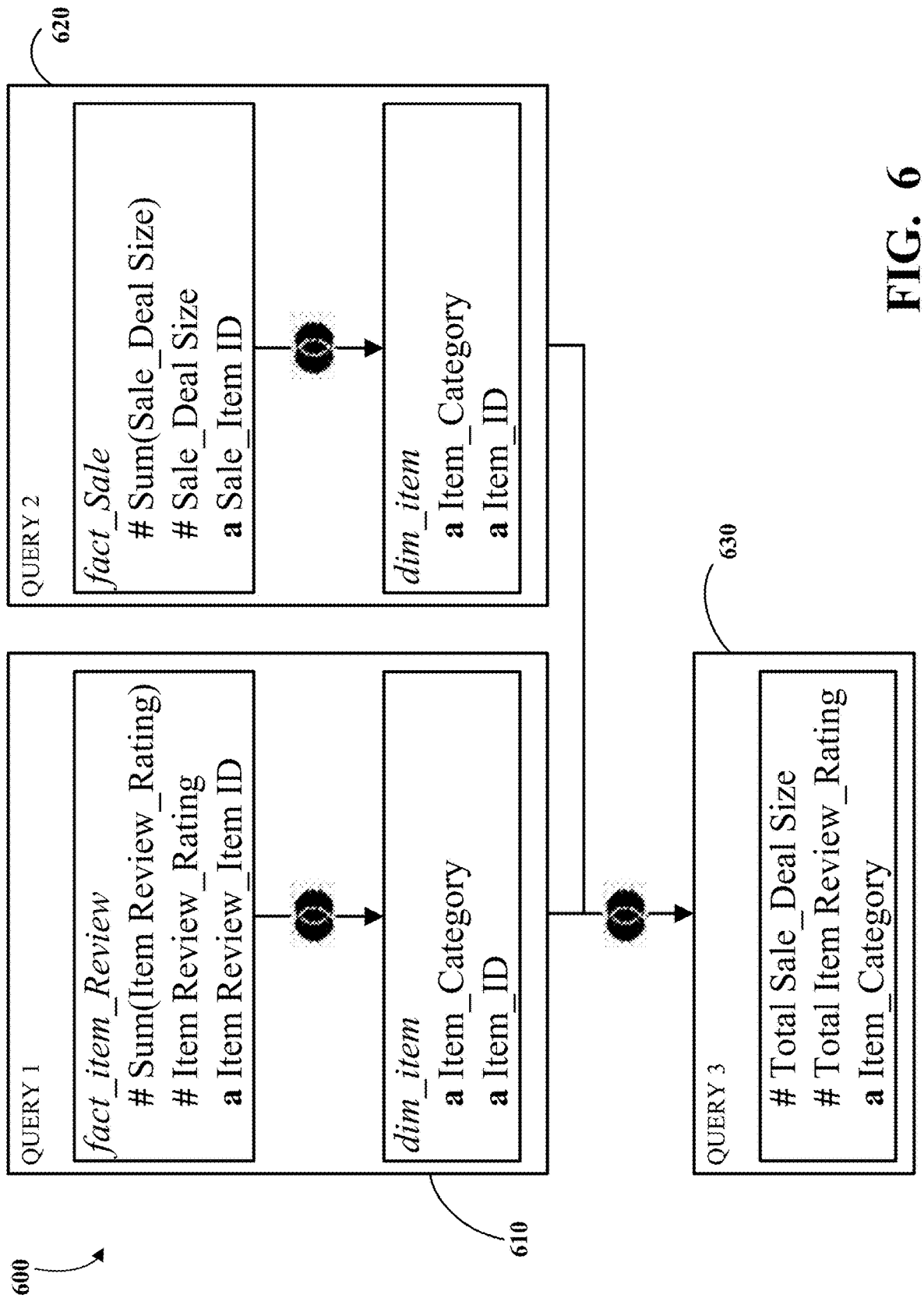
FIG. 6 is an illustration of an example of a query diagram generated for presenting a transformed query to a user for visualization to provide transparency of the transformation.

FIG. 6 is an illustration of an example of a query diagram 600 generated for presenting a transformed query (e.g., the transformed query specification 532) to a user for visualization to provide transparency of the transformation. The query diagram 600 includes a first icon 610 representing a first leaf query, a second icon 620 representing a second leaf query, and a third icon 630 representing a root query that is formed by joining (e.g., using a full-outer join) the results of the first leaf query and the second leaf query.

The core of a query generation algorithm that may be executed inside the multi-root query transformer 526 is described below.

Query Generation Algorithm

For the purpose of discussion of query generation algorithms, consider an example of a worksheet W consisting of tables in a database modeled by the join graph 100 shown in FIG. 1.

Build a Connected Graph

Consider a query Q on the worksheet W. The tables used in the query Q are a subset of all the tables in W. Let the set of tables in W be S and the set of tables in Q be S'. Let the join graph 100 of tables in S be G, and let the join graph of tables in S' be G'. Note that G must be a connected graph, but G' is not necessarily connected because it contains a subset of tables in S. The goal of this step is to connect tables in graph G' by bringing in join tables from G. Without a connected graph, a query could result in cross-joins (i.e., joins between unrelated tables), and that in turn may produce incorrect results.

For example, assume a search query Q: "T2(m_1) T7(a_i)" referencing tables T2 and T7. In order to connect these tables, the tables T3 and T6 may also be included in the query. The resulting subgraph G' may be the connected subgraph 700 of FIG. 7.

Figure 7:
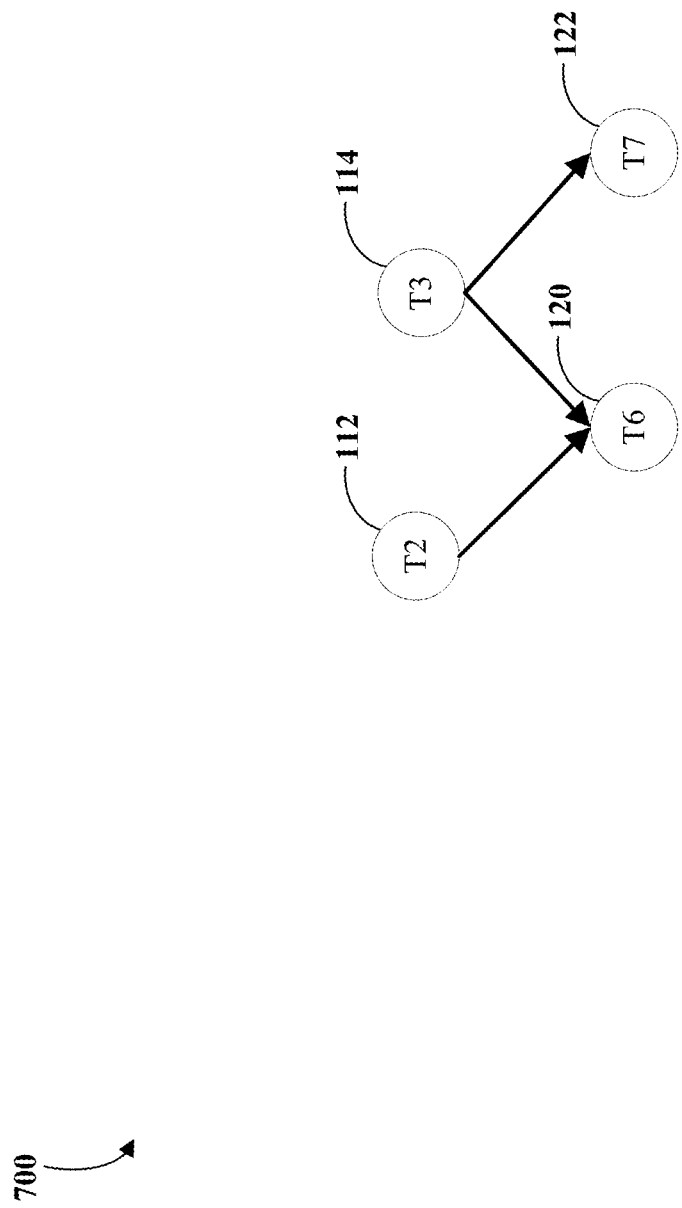
FIG. 7 is a diagram of an example of a connected subgraph of a join graph representing tables in a database.

FIG. 7 is a diagram of an example of a connected subgraph 700 of a join graph representing tables in a database. In this example, the connected subgraph 700 is a subgraph of the join graph 100 of FIG. 1 that includes the vertices (112, 114, 120, and 122) respectively corresponding to the tables (T2, T3, T6, and T7) and the directed edges connecting these vertices. The connected subgraph 700 includes the tables T2 and T7 that are referenced in the query Q and the connected subgraph 700 also includes the tables T3 and T6 in order to connect and thus relate the referenced tables T2 and T7.

There are few cases to consider when building such a connected subgraph G', such as:

If there are multiple paths possible in the query between two tables T1 and T2, then prefer the path that contains tables that are already present in the query. For example, in a query "T1(m_1) T10(a_1) T6(a_1)", the graph G' may be selected as the connected subgraph 800 of FIG. 8.

Figure 8:
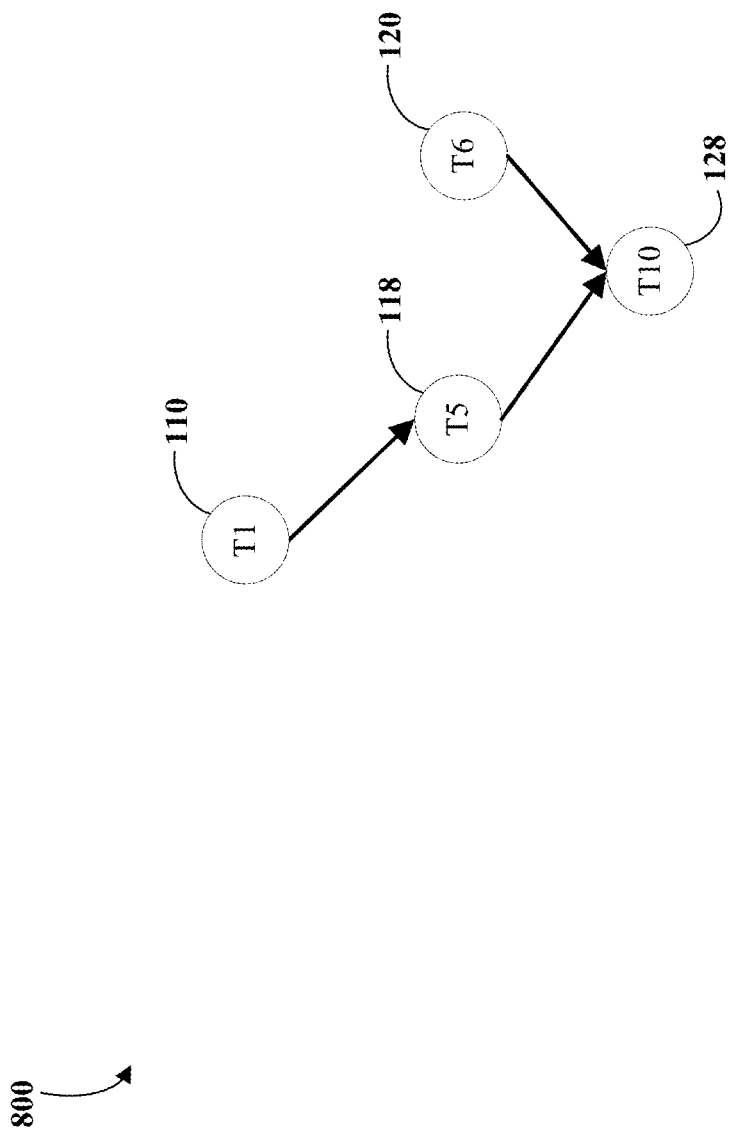
FIG. 8 is a diagram of an example of a connected subgraph of a join graph representing tables in a database.

FIG. 8 is a diagram of an example of a connected subgraph 800 of a join graph representing tables in a database. In this example, the connected subgraph 800 is a subgraph of the join graph 100 of FIG. 1 that includes the vertices (110, 118, 120, and 128) respectively corresponding to the tables (T1, T5, T6, and T10) and the directed edges connecting these vertices. The connected subgraph 800 includes the tables T1, T6, and T10 that are referenced in the query Q, and the connected subgraph 800 also includes the table T5 in order to connect and thus relate the referenced tables.

If there are multiple paths possible in the query between two tables T1 and T2 and none of the paths contains any table already present in the query, then prefer the path that involves a root table. For example, in a query "T1(m_1) T7(a_1)" the graph G' is as may be selected as the connected subgraph 900 of FIG. 9. For example, the table vertex selection process may be biased to select root tables of the join graph 100 to complete paths between tables referenced in the query.

Figure 9:
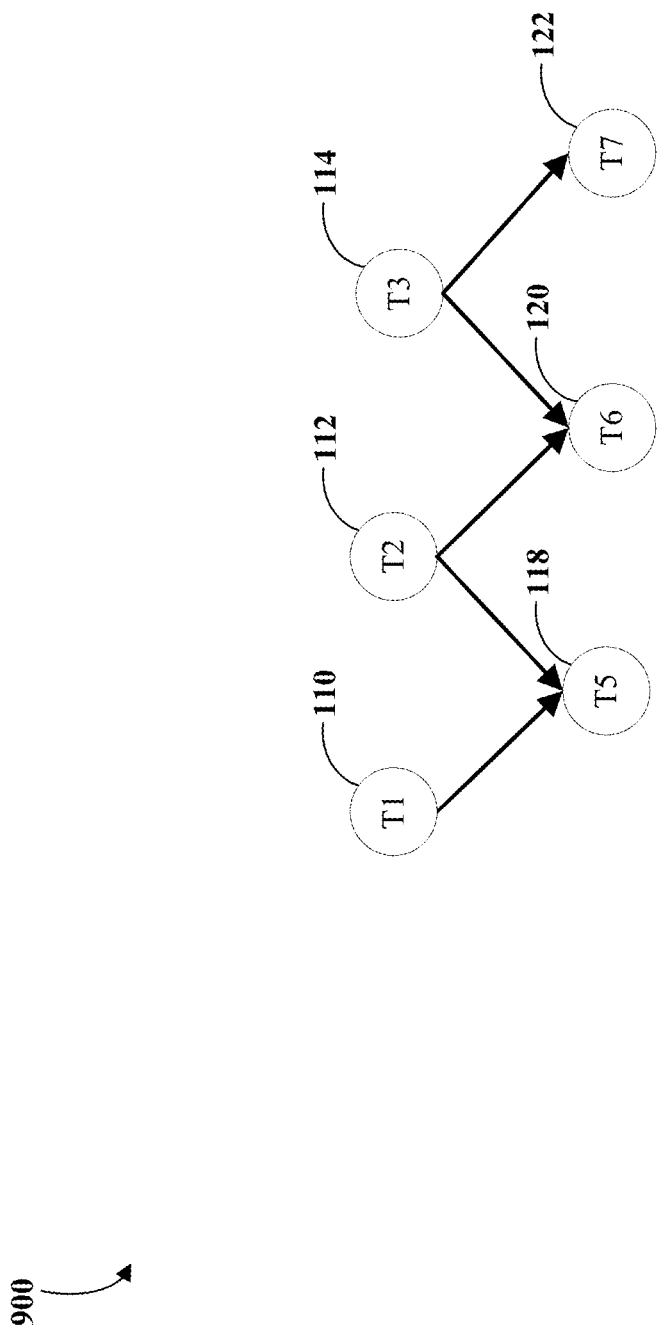
FIG. 9 is a diagram of an example of a connected subgraph of a join graph representing tables in a database.

FIG. 9 is a diagram of an example of a connected subgraph 900 of a join graph representing tables in a database. In this example, the connected subgraph 900 is a subgraph of the join graph 100 of FIG. 1 that includes the vertices (110, 112, 114, 118, 120, and 122) respectively corresponding to the tables (T1, T2, T3, T5, T6, and T7) and the directed edges connecting these vertices. The connected subgraph 900 includes the tables T1 and T7 that are referenced in the query, and the connected subgraph 900 also includes the tables T2, T3, T5, and T6 in order to connect and thus relate the referenced tables.

Add Attribution Dimension Tables

In some cases, it may be useful to add additional tables to the connected graph G' built in the previous step. Here are some rules governing those cases: Let there be a root table T in graph G' which is directly connected to a non-shared dimension table T whose attributes/measures are present in the query Q. If there are other root tables in the connected graph G' that share one or more attribution dimension tables with T in join graph G, then include all those dimension tables in the connected graph G' for which there are non-overlapping paths from the root nodes that share the dimension table. For example, in a query "T1(m_1) T6(a_1)" the connected graph from the previous step is the connected subgraph 1000 of FIG. 1.

Figure 10:
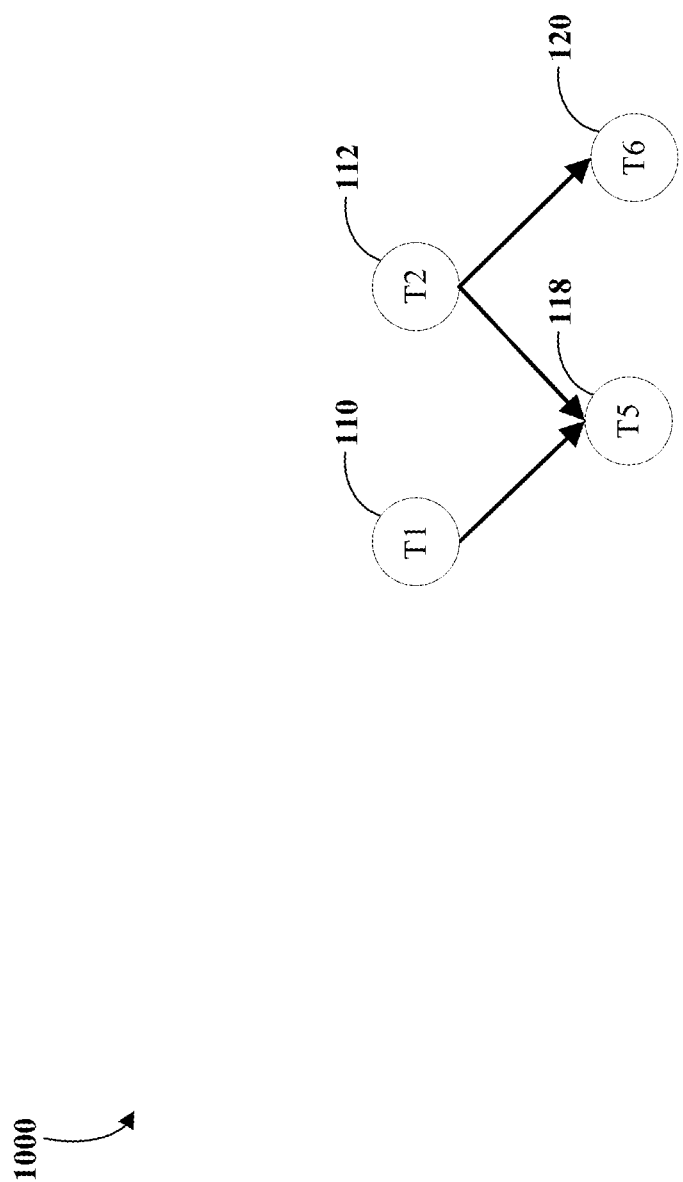
FIG. 10 is a diagram of an example of a connected subgraph of a join graph representing tables in a database.

FIG. 10 is a diagram of an example of a connected subgraph 1000 of a join graph representing tables in a database. In this example, the connected subgraph 1000 is a subgraph of the join graph 100 of FIG. 1 that includes the vertices (110, 112, 118, and 120) respectively corresponding to the tables (T1, T2, T5, and T6) and the directed edges connecting these vertices. The connected subgraph 1000 includes the tables T1 and T6 that are referenced in the query, and the connected subgraph 1000 also includes the tables T2 and T5 in order to connect and thus relate the referenced tables.

Figure 11:
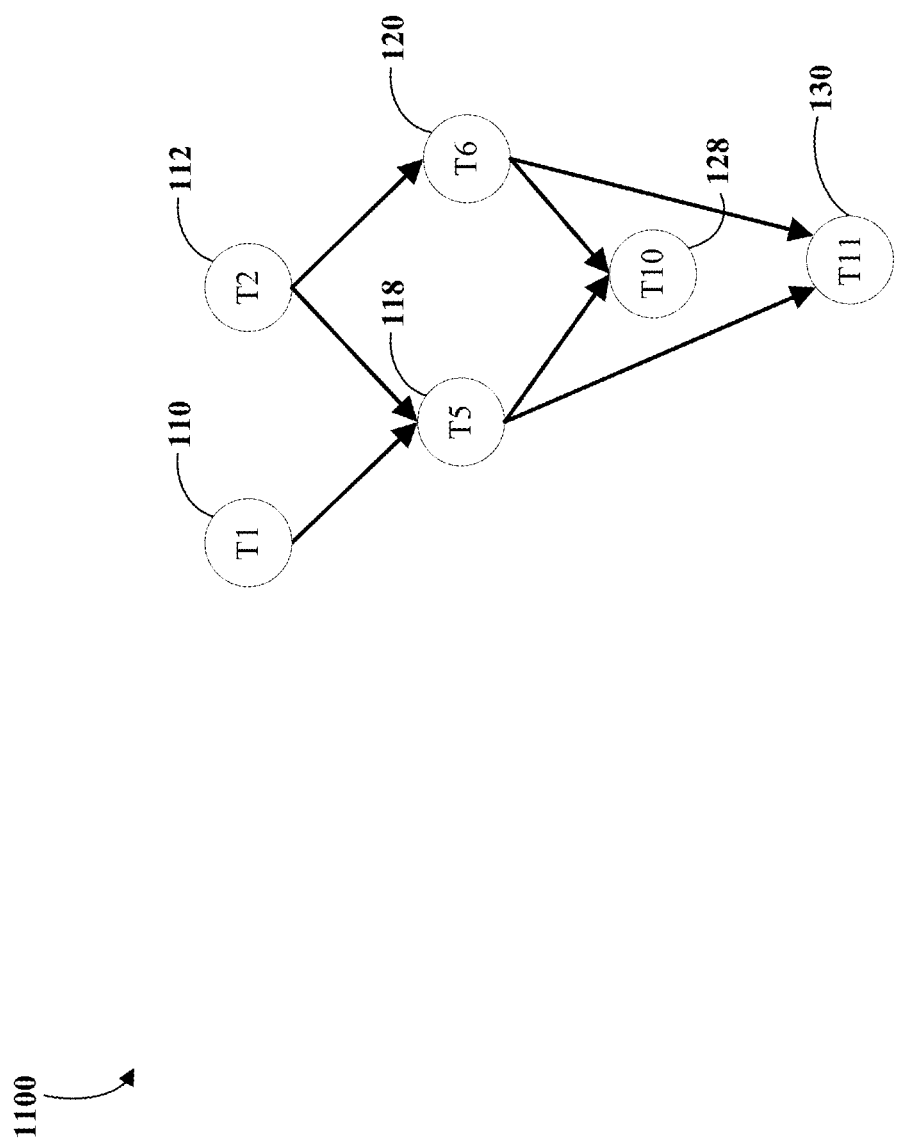
FIG. 11 is a diagram of an example of a connected subgraph of a join graph representing tables in a database.

This connected subgraph 1000 may then be augmented to the connected subgraph 1100 of FIG. 11 because of the presence of a non-shared dimension table T6 in the query.

FIG. 11 is a diagram of an example of a connected subgraph 1100 of a join graph representing tables in a database. In this example, the connected subgraph 1100 is a subgraph of the join graph 100 of FIG. 1 that includes the vertices (110, 112, 118, 120, 128, and 130) respectively corresponding to the tables (T1, T2, T5, T6, T10, and T11) and the directed edges connecting these vertices. The connected subgraph 1100 includes the tables T1 and T6 that are referenced in the query, and the connected subgraph 1100 also includes the tables T2 and T5 in order to connect and thus relate the referenced tables and also includes the shared attribution dimension tables T10 and T11 of the root tables T1 and T2. T10 has the non-overlapping paths from the root nodes of T1→T5→T10 and T2→T6→T10. T11 has the non-overlapping paths from the root nodes of T1→T5→T11 and T2→T6→T11. T9 is not included in the connected subgraph 1100 because all paths from the root nodes T1 and T2 overlap at T5→T9.

Identify the Number of Leaf Queries

There are two types of tables in the connected subgraph G', each one of which takes part in a leaf query of its own where it is the root of that leaf query. These tables are:

Any table T in the graph G' that contains a measure.

Any root table T in the graph G'.

Let this set of tables be S. For example, in a query "T1(m_1) T5(m_1) T5(a_1) T2(a_1) T4(a_1)" with a corresponding connected subgraph that is connected subgraph 200 of FIG. 2, S contains tables {T1, T2, T5} because T1 and T2 are the root tables and T5 contains a measure. A separate leaf query Q_k may be generated for each table T in S where T is the root table in query Q_k. This may prevent over-counting the results by avoiding application of many-to-one join prior to computing the aggregation. This point may become clearer in light of the examples provided in the next section.

Build Leaf Queries

A leaf query is constructed for each table T in S. Let the set of all leaf queries be LQ. Here are the steps involved:

1) For each pair of tables in S, identify the shared attribution dimension tables. For example, in a query "T5(a_1) T6(a_1) T7(m_1)" with a connected subgraph G' that is the connected subgraph 1200 of FIG. 12, set S is {T2, T3, T7}, and for each table pair in S the list of shared attribution dimension tables are as follows:

{T2, T3}=>{T6}
{T2, T7}=>{ }
{T3, T7}=>{T7}

Figure 12:
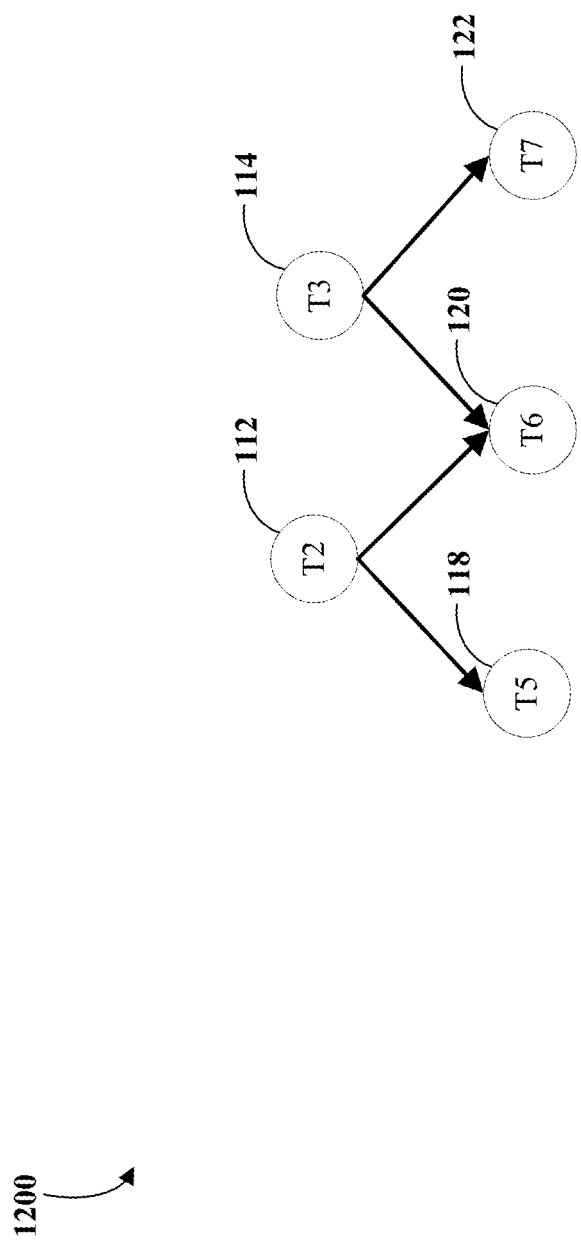
FIG. 12 is a diagram of an example of a connected subgraph of a join graph representing tables in a database.

FIG. 12 is a diagram of an example of a connected subgraph 1200 of a join graph representing tables in a database. In this example, the connected subgraph 1200 is a subgraph of the join graph 100 of FIG. 1 that includes the vertices (112, 114, 118, 120, and 122) respectively corresponding to the tables (T2, T3, T5, T6, and T7) and the directed edges connecting these vertices. The connected subgraph 1200 includes the tables T5, T6, and T7 that are referenced in the query, and the connected subgraph 1200 also includes the tables T2 and T3 in order to connect and thus relate the referenced tables.

2) Include the primary key columns from the shared dimension tables identified in the previous step as grouping columns (note that this is irrespective of any other attribute column already present in the query from the shared dimension). Including the primary key columns may enable correct attribution in the presence of other non-shared attribution dimensions in the query. For example, T6(p_k) and T7(p_k) are included in the query in the example above.

3) Build a leaf query for each table in S including all the necessary primary key columns from the shared dimension tables identified in the previous step along with any attributes present in the query as grouping columns. The leaf queries constructed from the example above are below, where Q(T) corresponds to a leaf query with root a table T:

Q(T2): "T5(a_1) T6(a_1) T6(p_k)"
Q(T3): "T6(a_1) T6(p_k) T7(p_k)"
Q(T7): "T7(m_1) T7(p_k)"

Join Leaf Queries

An execution plan of a multi-root query Q (e.g., a chasm/fan trap query) results in a hierarchical query graph Y with a single root and multiple leaves. The root of this graph Y represents the final result of Q, and leaf nodes represent the queries on base tables. Each non-leaf and non-root node in the query graph Y represents the results of the join of two queries.

Figure 13:
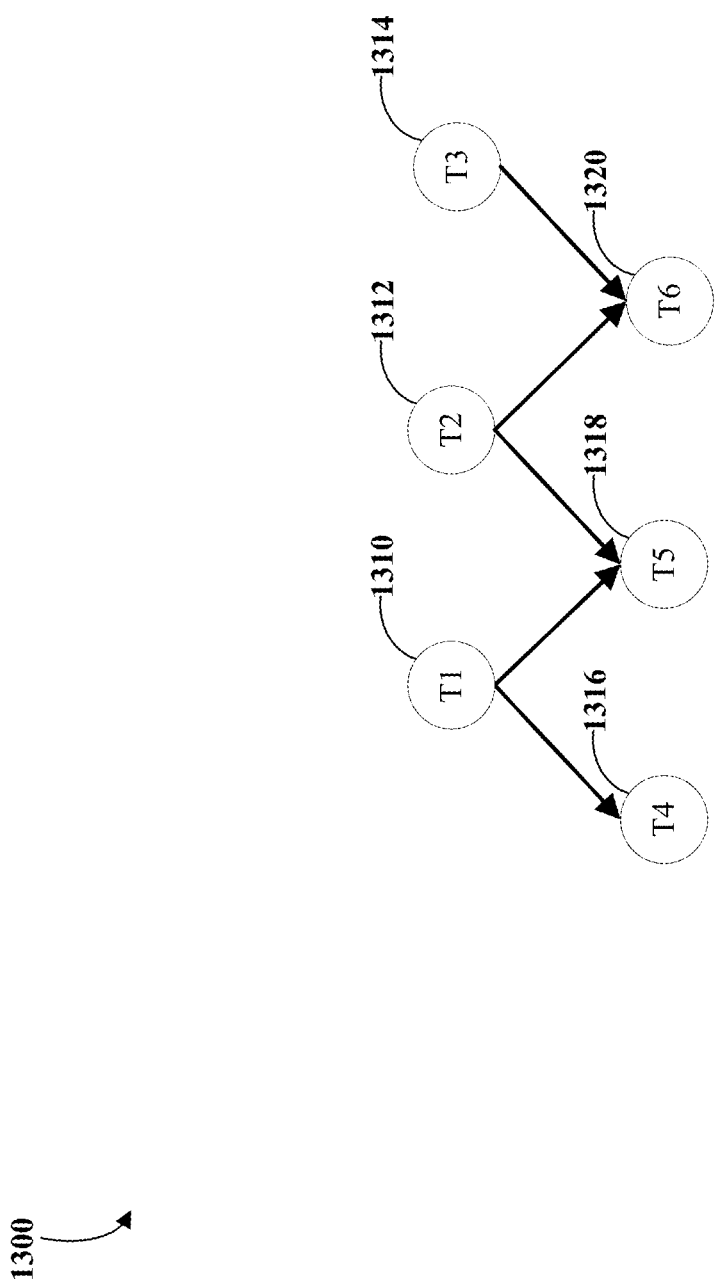
FIG. 13 is a diagram of an example of a join graph representing tables in a database.

FIG. 13 is a diagram of an example of a join graph 1300 representing tables in a database. In the example of FIG. 13, the join graph 1300 includes vertices (1310, 1312, 1314, 1316, 1318, and 1320) corresponding to respective tables in the database (T1, T2, T3, T4, T5, and T6). The arrows, representing directed edges of the join graph 1300, go in the direction from many-to-one join.

Figure 14:
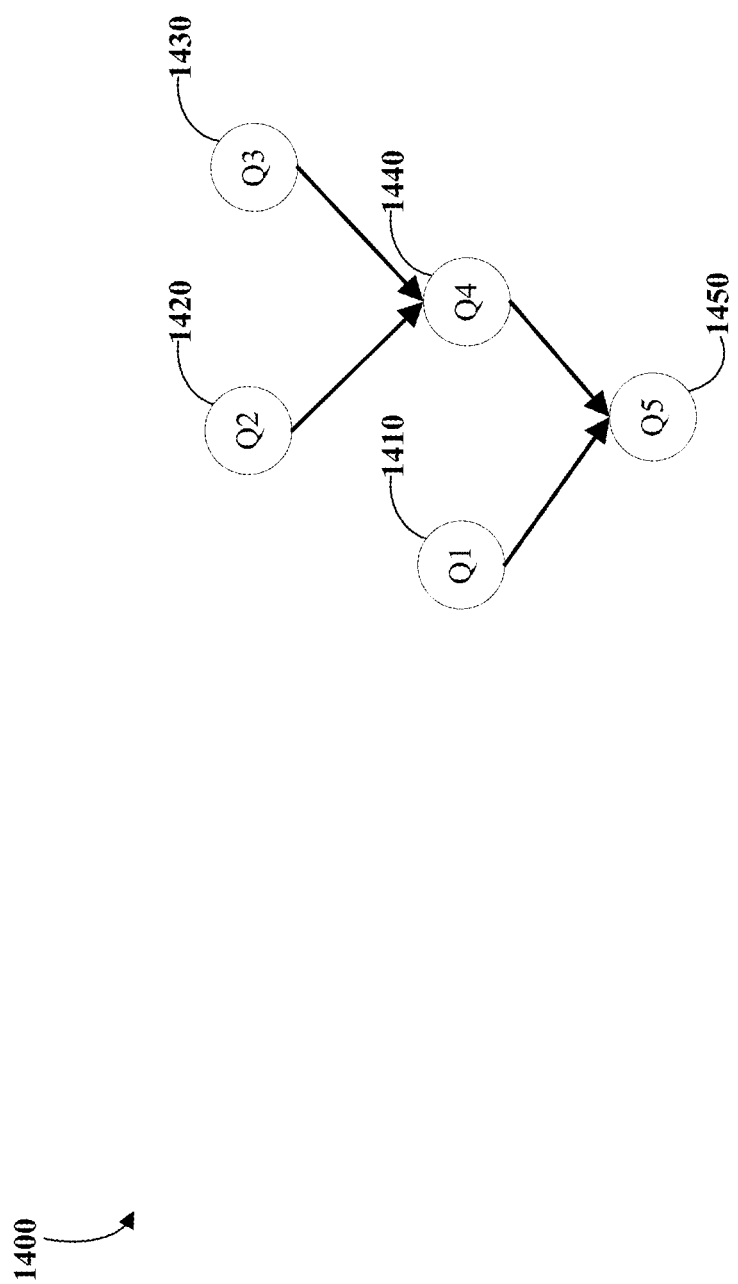
FIG. 14 is a diagram of an example of a query graph that is a tree with a root corresponding to a transformed query based on an input query.

FIG. 14 is a diagram of an example of a query graph 1400 that is a tree with a root corresponding to a transformed query based on an input query. The query graph 1400 includes leaf vertices (1410, 1420, and 1430) that correspond respectively to multiple leaf queries (Q1, Q2, and Q3); a vertex 1440 corresponding to Q4, which is a join of results from the queries of its child vertices (1420 and 1430); and a root vertex 1450 corresponding to Q5, which is a join of all the results of the queries of the query graph 1400. The query graph 1400 includes directed edges corresponding to many-to-one joins of query results.

Consider the example schema of the join graph 1300 of FIG. 13. Let there be a query Q on this graph: "T1(m_1) T2(m_1) T3(m_1) T5(a_1)". The inverted query graph for this query may be the query graph 1400 of FIG. 14. In this example, the leaf queries are:

Q1: "T1(m_1) T5(a_1)"
Q2: "T2(m_1) T5(a_1) T6(p_k)"
Q3: "T3(m_1) T6(p_k)"

Join Query:

Q4: Full-outer join of Q2 and Q3 producing "T2(m_1) T3(m_1) T5(a_1)"

Root Query:

Q5: Full-outer join of Q1 and Q4 producing the desired output "T1(m_1) T2(m_1) T3(m_1) T5(a_1)"

Note that, in the query graph 1400, it is important that the join is done between Q2 and Q3 and not Q1 and Q2, because the latter case may result in an over-count of T1(m_1) due to non-join key T6(p_k) between T1 and T2 is not present in the final root query Q5 and will get dropped eventually, which may result in an over-count of T1(m_1). In other words, Q2 and Q3 are perfectly joinable (more on this later), but Q1 and Q2 are not perfectly joinable.

A few concepts that are important for the purpose of a join algorithm are explained below.

Perfect Joinability

Two nodes in a query graph are perfectly joinable if their join does not lead to over-counting of any of the involved measures. Consider the following illustrative example. Let there be two tables T1 and T2. Let S be the set of shared attribute columns between T1 and T2 that is used to join them. Let NS_1 be the set of attribute columns in T1 that is not shared with T2. Let NS_2 be the set of attribute columns in T2 that is not shared with T1. Let T1(m_1) and T2(m_1) be the measures in T1 and T2, respectively. Let there be two sub-queries Q1 and Q2, the results of which are to be joined together.

Q1: T1(m_1){NS_1}{S}
Q2: T2(m_1){NS_2}{S}

Q1 and Q2 are perfectly joinable iff {S} is not empty and any one of the following conditions hold:

1) Both NS_1 and NS_2 are an empty set, that is, all the attribute columns in Q1 and Q2 are also shared between them and are used in the join.

2) If NS_1 and/or NS_2 are non-empty, then all of their columns should be present in the root query.

Consider the case where NS_1 is not empty and some of its attributes are not present in the root query of the graph. In such a case it would lead to over-counting of T2(m_1). Similarly, if NS_2 is not empty and some of its attributes are not present in the root query, the join may lead to over-counting of T1(m_1).

Splitting a Query

Let there be a set of queries where some of the queries have shared attributes but none of them are perfectly joinable. In such a case, a way to make the queries perfectly joinable is to split one of the queries that has overlapping attribute(s) with at least one other query. For example, consider a query Q: "T2(a_1) T5(m_1) T6(m_1)". The initial leaf queries in this case are:

Q1: "T2(a_1) T5(p_k) T6(p_k)"
Q2: "T5(m_1) T5(p_k)"
Q3: "T6(m_1) T6(p_k)"

Notice that none of the queries are perfectly joinable because:

Q2 and Q3 do not have any common attributes.
NS_1 contains T6(p_k) when joining Q1 and Q2, and NS_1 contains T5(p_k) when joining Q1 and Q3. Both T6(p_k) and T5(p_k) are not present in the root query, which makes both the joins imperfect.

In order to make the queries perfectly joinable, the query Q1 may be split into the following:

Q1_1: T2(a_1) T5(p_k)"
Q1_2: "T2(a_1) T6(p_k)"

Figure 15:
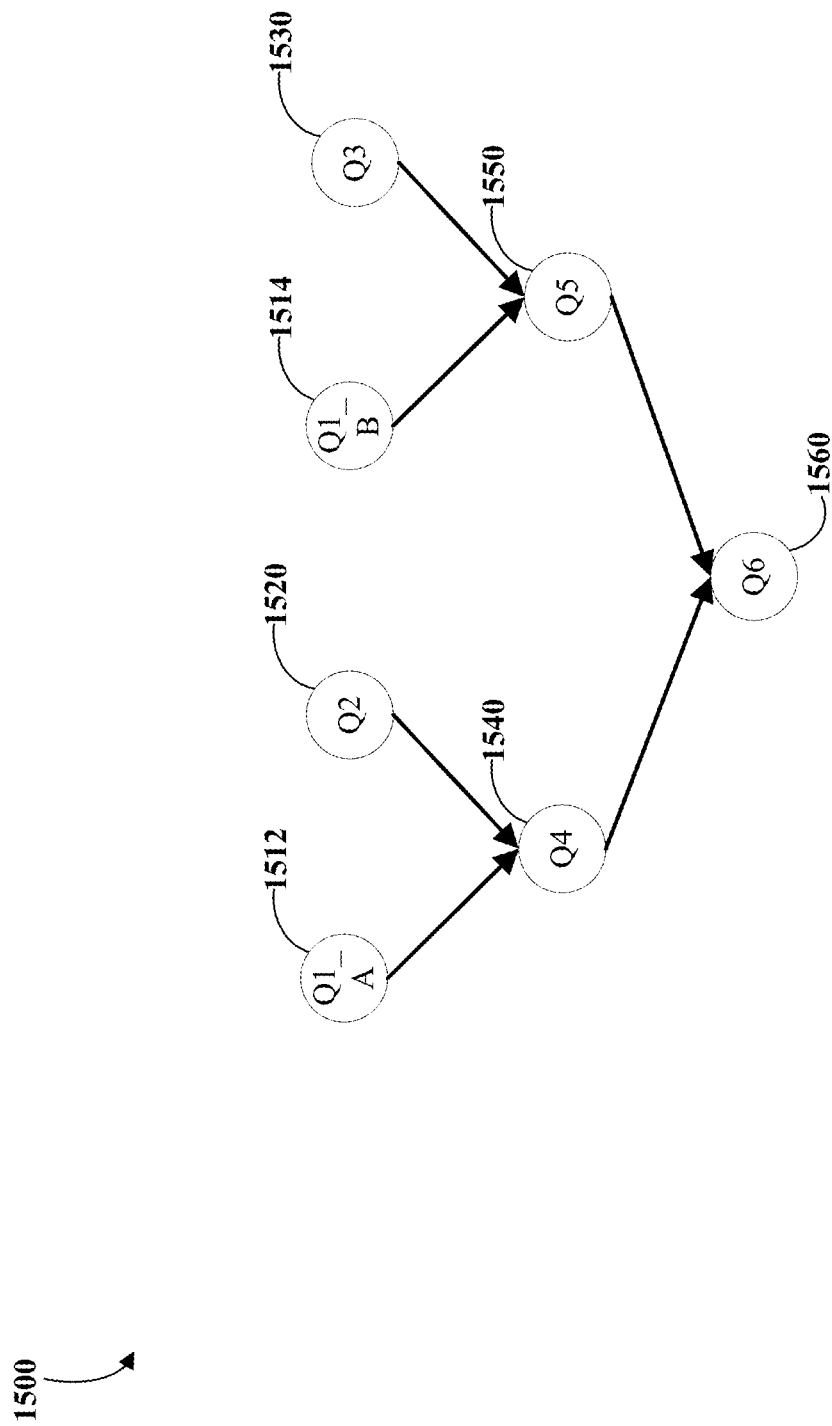
FIG. 15 is a diagram of an example of a query graph representing a transformed query including leaf nodes generated for joinability.

The resulting inverted query graph 1500 is shown in FIG. 15.

Q4: "T5(m_1) T2(a_1)"
Q5: "T6(m_1) T2(a_1)"
Q6: "T5(m_1) T6(m_1) T2(a_1)"

FIG. 15 is a diagram of an example of a query graph 1500 that is a tree with a root corresponding to a transformed query based on an input query, where a leaf query that was not perfectly joinable Q1 has been split to generate two perfectly joinable leaf queries (Q1_A and Q1_B). The query graph 1500 includes queries (Q1_A, Q1_B, Q2, and Q3) based on a set of multiple leaf queries (Q1, Q2, and Q3). The query graph 1500 includes leaf vertices (1512, 1514, 1520, and 1530) that correspond respectively to leaf queries (Q1_A, Q1_B, Q2, and Q3); vertices (1540 and 1550) corresponding respectively to Q4 and Q5, which are a join of results from the queries of their respective child vertices; and a root vertex 1560 corresponding to Q6, which is a join of all the results of the queries of the query graph 1500. The query graph 1500 includes directed edges corresponding to many-to-one joins of query results.

A join algorithm starts with a set S of leaf queries and works in multiple rounds where each round results in the joining of two queries producing a node in the query graph. The algorithm terminates when the size of S reduces to 1 (i.e., there are no more queries left to join). Each round works as follows:

If none of the queries in S are joinable, then perform a cross-join between a pair of queries.

If there is at least one pair of queries in S that are perfectly joinable, then join them.

If none of the queries in S are perfectly joinable with each other but there is at least one pair of queries (Q1, Q2) that have shared attributes between them, then, in such a case, split one of the queries Q1 or Q2 such that the resulting set S has at least one pair that is perfectly joinable.

Preserve the outer-ness of joined results. For example, if a query Q1 joins with the result of a left-outer join J(Q2, Q3) between two other leaf queries Q2 and Q3, then the join itself will be a left-outer join between J(Q2, Q3) and Q1.

Formula Planning

Here is a short note on the nomenclature:

1) Query Root: Table that is a root node in the table graph for a query. For example, in the query "T1(m_1) T4(a_1)", T1 is the root node.

2) Expression Root: Table that is a root node in the table graph for a formula expression (e.g., in the formula "count (T4(a_1))", T4 is the root node).

3) Complex Query: A query that needs to be broken down into multiple sub-queries whose results are then joined together. Chasm/Fan trap queries are examples of complex queries.

4) Root Query: Any complex query is evaluated from the results of multiple sub-queries joined together forming a rooted graph. Roots of this query graph represent the final result.

A formula plan provides the evaluation plan for a formula in a multi-root query. A formula may need to be broken down into component formulas where a subset of these component formulas may need to be pushed down to the leaf queries in a query graph. For example, consider a query Q on Worksheet W: "average(T1(m_1)) sum(T2(m_1)) T5(a_1)". In this query, "average(T1(m_1))" may be broken down into "sum(T1(m_1))" and "count(T1(m_1))" which are then pushed down to the leaf query with the root being T1. These two aggregations may then be divided in the root query to compute the average.

In some implementations, planning for a formula is a three-step process:

1) Breakdown: A formula needs to be broken down if it cannot be computed entirely in the leaf query. Average, variance, standard deviation, and unique count are few examples of formulas that cannot be computed entirely in the leaf query.

2) Push Down: A formula (or its broken-down components) needs to be pushed down to the appropriate leaf query in a query graph. For example, when Average(x) is broken down into Sum(x) and Count(x), these sub-formulas are then pushed down to the leaf query containing tables with the column "x".

3) Composition: A formula in a root query is composed from the broken-/pushed-down sub-formulas. For example, Average(x) is computed from the result of "Sum(x)/Count (x)" by composing Sum(x) and Count(x) as arguments to the Division operation in the root query.

There are multiple cases in which a formula may be broken down:

1) If it is a non-composable formula (e.g., Average, variance, or standard deviation).

2) If it is a multi-root formula like "sum(T1(m_1))+sum (T2(m_1))" which has multiple expression roots such as T1 and T2. Both the sub-formulas sum(T1(m_1)) and sum(T2 (m_1)) are pushed to their respective leaf queries. These are then composed together in the root query (e.g., by adding the results).

3) If it has an aggregation from a dimension table. For example: "sum(T1(m_1))+sum(T5(m_1))" has an aggregation on a measure from a dimension table T5. In this case, the formula may be broken down as per the rules of multi-root query.

Some notable features may include:

1) A query generation algorithm that handles any conceivable query over any conceivable database schema with minimal data modeling, producing accurate results. This includes complex query scenarios such as chasm trap, fan trap, nested chasm trap, etc.

2) A process of query transformation that applies a series of transformations to a query, where each transformer handles sub-scenarios of the main query. This method of transforming an original query through a chain of transformers lends itself well to query modularity and query optimizations by optimizing queries early on in the query transformation process.

3) A query visualizer that helps users visualize the query with ease and helps a user visually understand the details of query planning.

4) Requires little to no special data modeling from users and handles almost all conceivable query scenarios.

Figure 16:
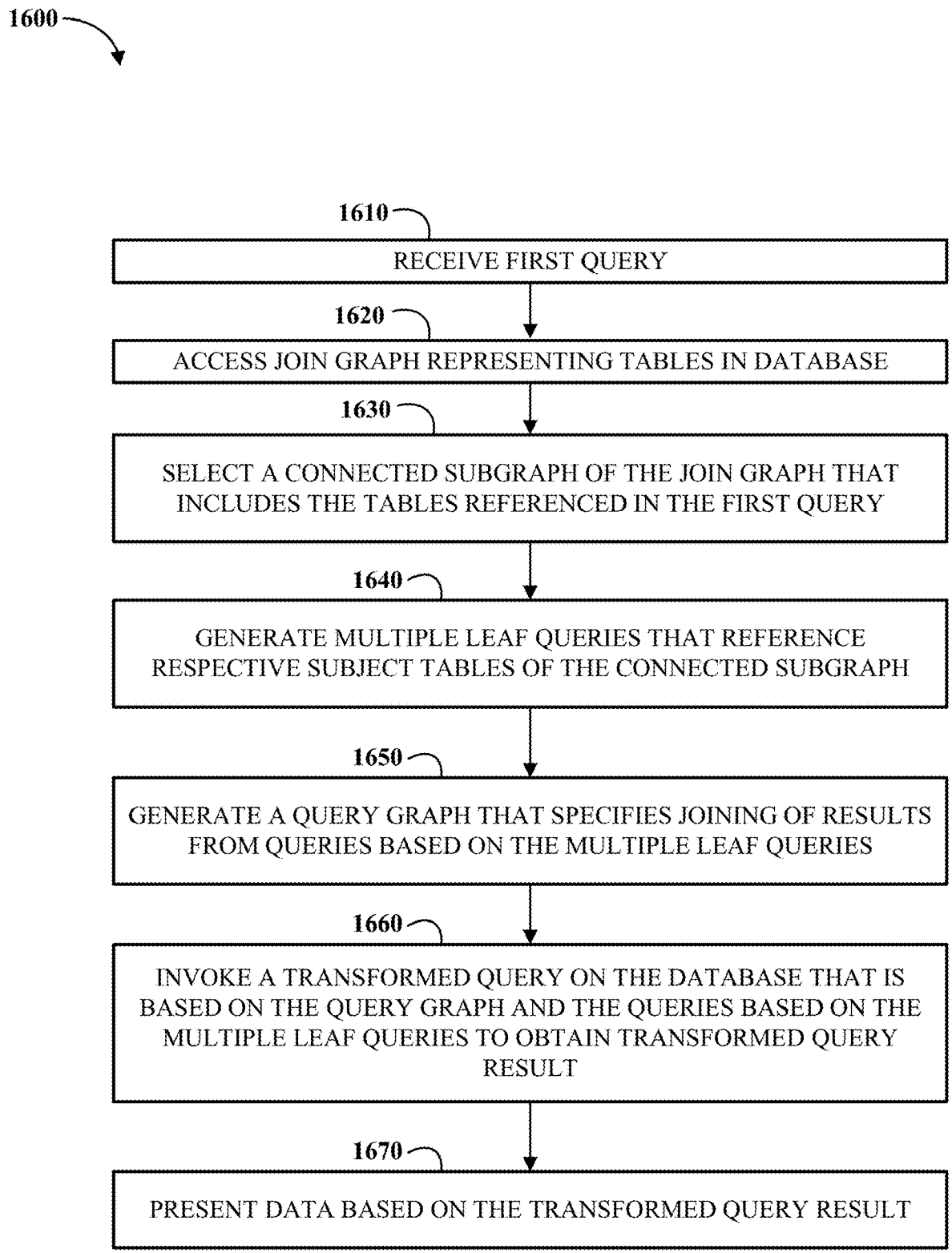
FIG. 16 is a flowchart illustrating an example of a technique for transforming a query based on modeling information about a database schema before invoking the query on the database.

FIG. 16 is a flowchart illustrating an example of a technique 1600 for transforming a query based on modeling information about a database schema before invoking the query on the database. The technique 1600 includes receiving 1610 a first query; accessing 1620 a join graph representing tables in a database; selecting 1630 a connected subgraph of the join graph that includes the tables referenced in the first query; generating 1640 multiple leaf queries that reference respective subject tables of the connected subgraph; generating 1650 a query graph that specifies joining of results from queries based on the multiple leaf queries; invoking 1660 a transformed query on the database that is based on the query graph and the queries based on the multiple leaf queries to obtain a transformed query result; and presenting 1670 data based on the transformed query result. For example, the technique 1600 may be implemented by the query transformer 510 of FIG. 5. For example, the technique 1600 may be implemented by the database analysis server 1830 of FIG. 18. For example, the technique 1600 may be implemented using the computing device 1900 of FIG. 19. For example, the technique 1600 may be used to implement the multi-root query transformer 526 of FIG. 5.

The technique 1600 includes receiving 1610 a first query that references data in two or more of the tables of the database. For example, the first query may represent a question or a command for a database analysis system (e.g., a system including the database analysis server 1830). For example, the first query may be received 1610 by a server that is presenting a user interface (e.g., a webpage) to a user who is located at a remote location via communication messages over an electronic communications network (e.g., a wide area network). For example, the first query may be received 1610 by a server presenting a user interface when a user types in a search bar of the user interface and causes a message including the first query to be transmitted to the server. For example, a user may have entered the first query in the user interface (e.g., a web page) by typing (e.g., using a keyboard) or by speaking (e.g., using a microphone and speech recognition module). In some implementations, the first query is not modified by the server or other device that receives 1610 the first query. In some implementations, receiving 1610 the first query includes performing preliminary transformations on data received from a remote device to convert the query to a proper format for subsequent analysis. For example, receiving 1610 the first query may include receiving a query specification (e.g., the query specification 502) from a remote device (e.g., a user's personal computing device) and applying one or more transformations (e.g., using the worksheet transformer 520, the group function transformer 522, and/or the windowing function transformer 524) to the query specification to determine the first query. The first query may then be passed on for subsequent processing (e.g., passed into the multi-root query transformer 526).

The technique 1600 includes accessing 1620 a first join graph (e.g., the join graph 100 of FIG. 1) representing tables in a database. The first join graph has vertices corresponding to respective tables in the database and directed edges corresponding to many-to-one join relationships. For example, the first join graph may be part of a data-model data structure that describes a logical structure of data stored in the database. For example, the first join graph may be stored in a variety of formats, such as a graph data structure with vertex records that include identifiers (e.g., names and/or pointers) for respective tables stored in the database. In some implementations, the join graph encodes logical relationships of tables in a worksheet (e.g., the worksheet W described above). For example, accessing 1620 the first join graph may include reading a data structure including the first join graph from a memory (e.g., the static memory 1920 or the low-latency memory 1930 of FIG. 19). For example, accessing 1620 the first join graph may include receiving data including the first join graph from a remote device (e.g., the database 572 of FIG. 5 or the external data source 1810 of FIG. 18) in communications received via a communications interface (e.g., the electronic communication unit 1940 of FIG. 19).

The technique 1600 includes selecting 1630 a connected subgraph of the first join graph that includes the two or more tables referenced in the first query. For example, selecting 1630 the connected subgraph may include selecting all the vertices of the join graph corresponding to tables referenced by the first query, and, if necessary, selecting additional tables with corresponding vertices in the join graph to form a connected graph (i.e., ignoring directionality of edges, there is at least one path between any two vertices in the resulting graph). In some implementations, selecting 1630 the connected subgraph includes biasing table selection to select paths that include tables referenced in the first query. For example, if there are multiple paths possible in the query between two tables, then a system may be configured to prefer the path that contains tables that are already present in the first query (e.g., as described in relation to FIG. 8). In some implementations, selecting 1630 the connected subgraph includes biasing table selection to select paths that include root tables of the first join graph. For example, if there are multiple paths possible in the query between two tables and none of the paths contains any table already present in the query, then a system may be configured to prefer the path that involves a root table (e.g., as described in relation to FIG. 9). In some implementations, a minimum number of tables are selected 1630 for inclusion in the connected subgraph in order to form a connected graph that includes all tables referenced in the first query. In some implementations, selecting 1630 the connected subgraph includes selecting one or more additional attribution dimension tables that are shared between two root tables of the connected subgraph (e.g., as described in relation to FIGS. 10 and 11), and more than a minimum number of tables in order to form a connected graph that includes all tables referenced in the first query are selected for including in the connected subgraph. For example, selecting 1630 the connected subgraph may include implementing the technique 1700 of FIG. 17.

The technique 1600 includes generating 1640 multiple leaf queries that reference respective subject tables that are each a root table of the connected subgraph or a table including a measure referenced in the first query. In some implementations, generating at least two of the leaf queries includes inserting a reference to a primary key column for a shared attribution dimension table of the respective subject tables of the at least two of the leaf queries. In some implementations, one of the multiple leaf queries includes a reference to an attribute in a dimension table that is referenced in the first query. For example, the multiple leaf queries may be generated 1640 based on the first query and the connected subgraph as described in relation to FIGS. 2 and 12. In some implementations, generating 1640 the multiple leaf queries may include decomposing a formula of the first query into component formulas and pushing down the component formulas to corresponding leaf queries. For example, the technique 2000 of FIG. 20 may be implemented to decompose a formula of the first query.

In some implementations (not shown explicitly in FIG. 16), the technique 1600 may include splitting one of the multiple leaf queries into leaf queries that are perfectly joinable with a respective leaf query of the multiple leaf queries. The queries based on the multiple leaf queries include the leaf queries resulting from the split. For example, one of the multiple leaf queries may be split as described in relation to FIG. 15.

The technique 1600 includes generating 1650 a query graph that specifies joining of results from queries based on the multiple leaf queries to obtain a transformed query result for the first query. The query graph may have a single root node corresponding to a transformed query result. For example, the query graph may be a tree. In some implementations, the queries based on the multiple leaf queries are simply the multiple leaf queries themselves. In some implementations, the queries based on the multiple leaf queries include leaf queries that result from splitting one of the multiple leaf queries generated 1640 to determine a leaf query that is perfectly joinable with another query of the query graph. For example, the query graph may be generated 1650 as described in relation to FIGS. 13-15. In some implementations, generating 1650 a query graph may include composing a transformed formula in the single root node of the query graph based on results for the component formulas. For example, the technique 2000 of FIG. 20 may be implemented to compose the transformed formula.

The technique 1600 includes invoking 1660 a transformed query on the database that is based on the query graph and the queries based on the multiple leaf queries to obtain the transformed query result. In some implementations, the queries based on the multiple leaf queries are simply the multiple leaf queries themselves. In some implementations, the queries based on the multiple leaf queries include leaf queries that result from splitting one of the multiple leaf queries generated 1640 to determine a leaf query that is perfectly joinable with another query of the query graph. In some implementations, the transformed query may be determined solely based on the query graph and the queries based on the multiple leaf queries. In some implementations, the transformed query may also be determined based on subsequent query transformation applied to query specification based on the query graph and the queries based on the multiple leaf queries. For example, the transformed query that is invoked 1660 may result from passing a query specification based on the query graph and the queries based on the multiple leaf queries through one or more additional subsequent transformations (e.g., using the RLS transformer 528 and/or the views transformer 530). The transformed query (e.g., in a database agnostic syntax) may specify a logical set of operations for accessing and/or processing data available in the database. In some implementations, the transformed query is invoked 1660 by transmitting (e.g., via an electronic communications network) a request or command message including the transformed query to an external database server (e.g., the database 572 of FIG. 5 or the external data source 1810 of FIG. 18) that in turn executes a search specified by the transformed query on the database and returns the transformed query result. In some implementations, the transformed query is invoked 1660 by executing a search specified by the transformed query on the database, which may have data stored or cached locally (e.g., in high-speed volatile memory), to generate the transformed query result locally. For example, the transformed query may be encoded in the same format as the first query. In some implementations, the transformed query may be encoded in a different format than the first query in order to match the syntax requirements of a database server managing the database (e.g., an external database or a locally stored database). For example, the transformed query may be in a defined structured data access language (e.g., Structured Query Language (SQL) or a similar language), and may be determined based on a sequence of tokens of a database syntax of the first query. For example, the transformed query may be in another query format supported by a local or remote database server, and may be determined based on a sequence of tokens of the database syntax of the first query.

The technique 1600 includes presenting 1670 data based on the transformed query result. For example, raw data, summary data, and/or plots or charts of the transformed query result may be presented 1670 in a user interface (e.g., a webpage). In some implementations, a summary and/or visual formatting of the data may be determined based on a configuration record (e.g., including user preferences) of the user interface and/or the transformed query result by a machine learning module (e.g., including a neural network) that is trained to identify relevant aspects of data in the context of one or more databases and use cases, and select an appropriate display format. For example, the data based on the transformed query result may be presented 1670 by transmitting the data as part of the user interface in messages sent via an electronic communications network (e.g., as part of a websocket over a wide area network). In some implementations, the data based on the transformed query result may be presented 1670 in signals passed to a directly connected display for viewing by a user co-located with a computing device implementing the technique 1600.

Although the technique 1600 is shown as a series of operations for clarity, implementations of the technique 1600 or any other technique or algorithm described in connection with the implementations disclosed herein can be performed in various orders or concurrently. Additionally, operations in accordance with this disclosure can be performed with other operations not presented and described herein. Furthermore, one or more aspects of the systems and techniques described herein can be omitted. For example, in some implementations, the operation presenting 1670 data based on the transformed query result may be omitted from the technique 1600.

Figure 17:
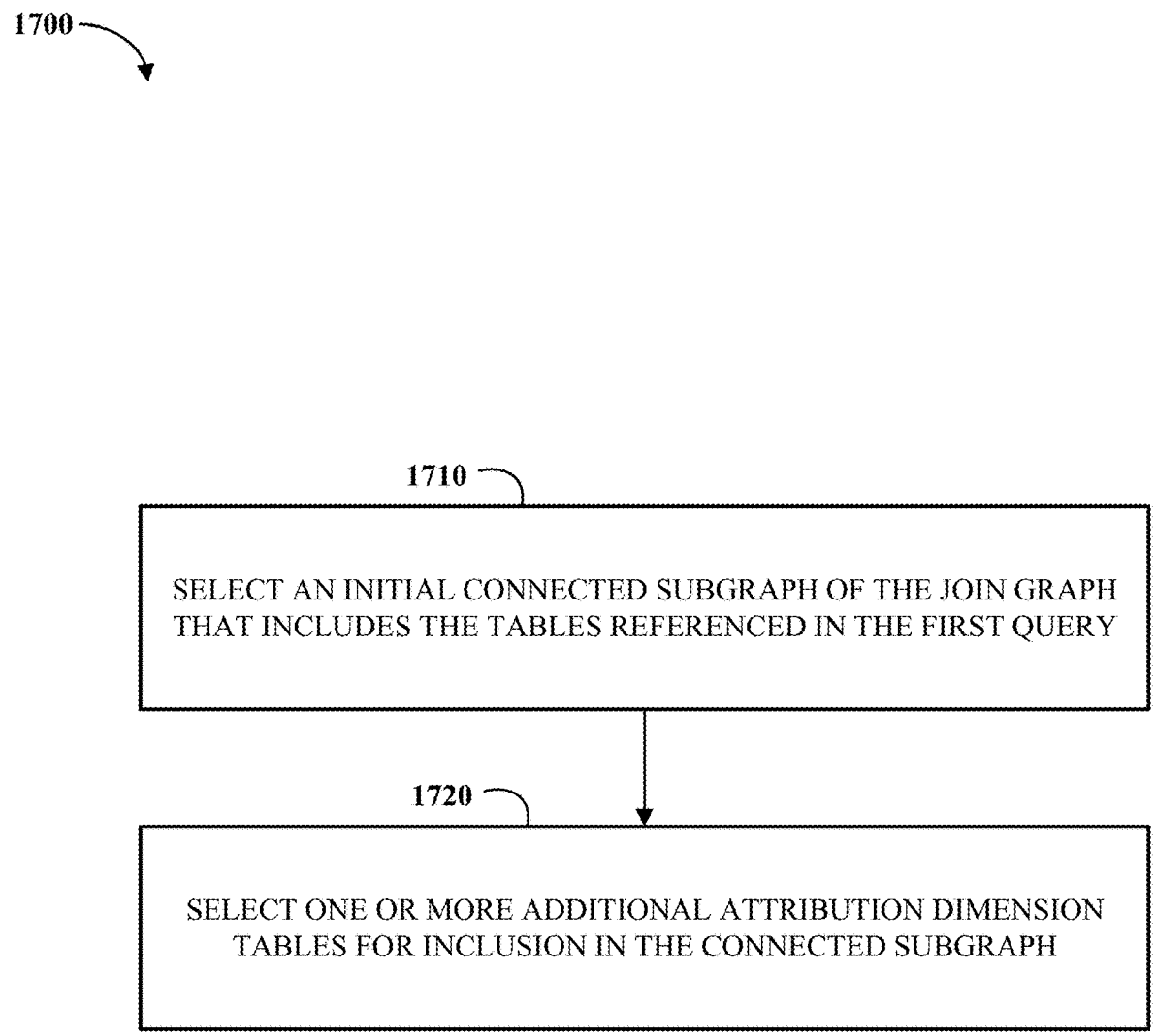
FIG. 17 is a flowchart illustrating an example of a technique for selecting a connected subgraph of a join graph that includes tables referenced in a query.

FIG. 17 is a flowchart illustrating an example of a technique 1700 for selecting a connected subgraph of a join graph that includes tables referenced in a query. The technique 1700 includes selecting 1710 an initial connected subgraph of the first join graph that includes the two or more tables referenced in the first query; and selecting 1720 one or more additional attribution dimension tables for inclusion in the connected subgraph. For example, the technique 1700 may be implemented by the multi-root query transformer 526 of FIG. 5. For example, the technique 1700 may be implemented by the database analysis server 1830 of FIG. 18. For example, the technique 1700 may be implemented using the computing device 1900 of FIG. 19.

The technique 1700 includes selecting 1710 an initial connected subgraph of the first join graph that includes the two or more tables referenced in the first query. For example, selecting 1710 the initial connected subgraph may include selecting all the vertices of the join graph corresponding to tables referenced by the first query, and, if necessary, selecting additional tables with corresponding vertices in the join graph to form a connected graph. In some implementations, selecting 1710 the initial connected subgraph includes biasing table selection to select paths that include tables referenced in the first query. For example, if there are multiple paths possible in the query between two tables, then a system may be configured to prefer the path that contains tables that are already present in the first query (e.g., as described in relation to FIG. 8). In some implementations, selecting 1710 the connected subgraph includes biasing table selection to select paths that include root tables of the first join graph. For example, if there are multiple paths possible in the query between two tables and none of the paths contains any table already present in the query, then a system may be configured to prefer the path that involves a root table (e.g., as described in relation to FIG. 9).

The technique 1700 includes selecting 1720 one or more additional attribution dimension tables for inclusion in the connected subgraph. A first root table of the initial connected subgraph may be directly connected to a non-shared dimension table that is referenced in the first query, and the one or more additional attribution dimension tables are shared between a second root table of the initial connected subgraph and the first root table (e.g., as described in relation to FIGS. 10 and 11). As a result of selecting 1720 one or more additional attribution dimension tables for inclusion, the connected subgraph may include more than a minimum number of tables in order to form a connected graph that includes all tables referenced in the first query.

Figure 18:
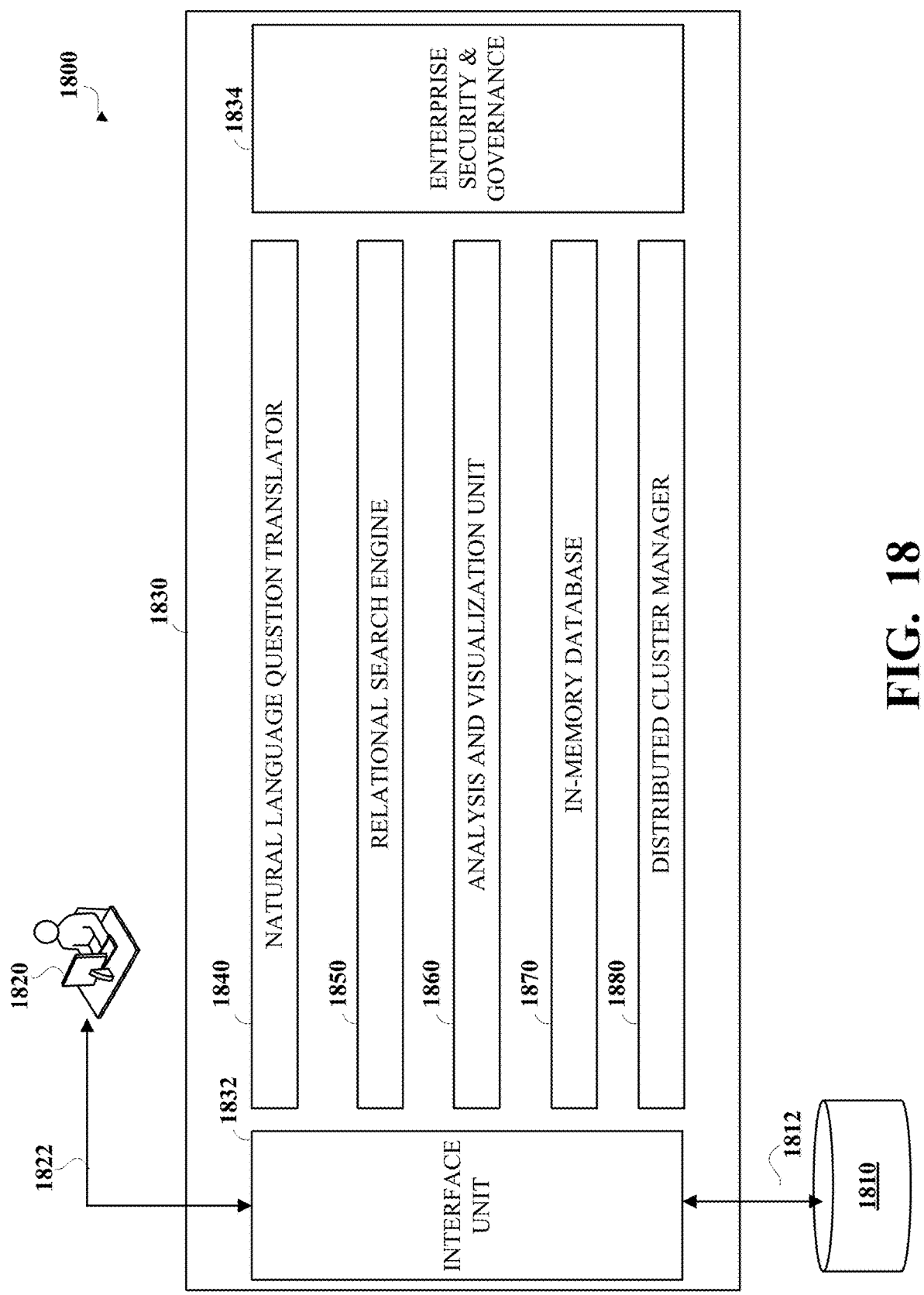
FIG. 18 is a block diagram illustrating an example of a system for providing a search interface for databases that generates a database query based on a string.

FIG. 18 is a block diagram illustrating an example of a system 1800 for providing a search interface for databases that generates a database query based on a string. The system 1800 includes an external data source 1810 (e.g., a relational database), a user device 1820, and a database analysis server 1830. For example, the system 1800 may be implemented in an enterprise computing environment, where the external data source 1810 is an existing database or databases in the enterprise computing environment and the database analysis server 1830 is implemented in one or more servers or using one or more cloud computing providers.

The external data source 1810 may be a structured database system, such as a relational database operating in a relational database management system (RDBMS), which may be an enterprise database. In some embodiments, the external data source 1810 may be an unstructured data source. The external data source 1810 may be implemented on a computing device, such as the computing device 1900 shown in FIG. 19, which may be a server. In some embodiments, the external data source 1810 may be stored on a static data storage device, such as a hard disk. Other external data sources may be used. Although one external data source 1810 is shown for simplicity, multiple external data sources may be used.

The external data source 1810 may communicate with the database analysis server 1830 via an electronic communication medium 1812, which may be a wired or wireless electronic communication medium. For example, the electronic communication medium 1812 may include a local area network (LAN), a wide area network (WAN), a fiber channel network, the Internet, or a combination thereof. The external data source 1810 may include data or content, such as sales data, revenue data, profit data, tax data, shipping data, safety data, sports data, health data, weather data, or the like, or any other data, or combination of data, that may be generated by or associated with a user, an organization, or an enterprise and stored in a database system. For simplicity and clarity, data stored in or received from the external data source 1810 may be referred to herein as enterprise data.

Figure 19:
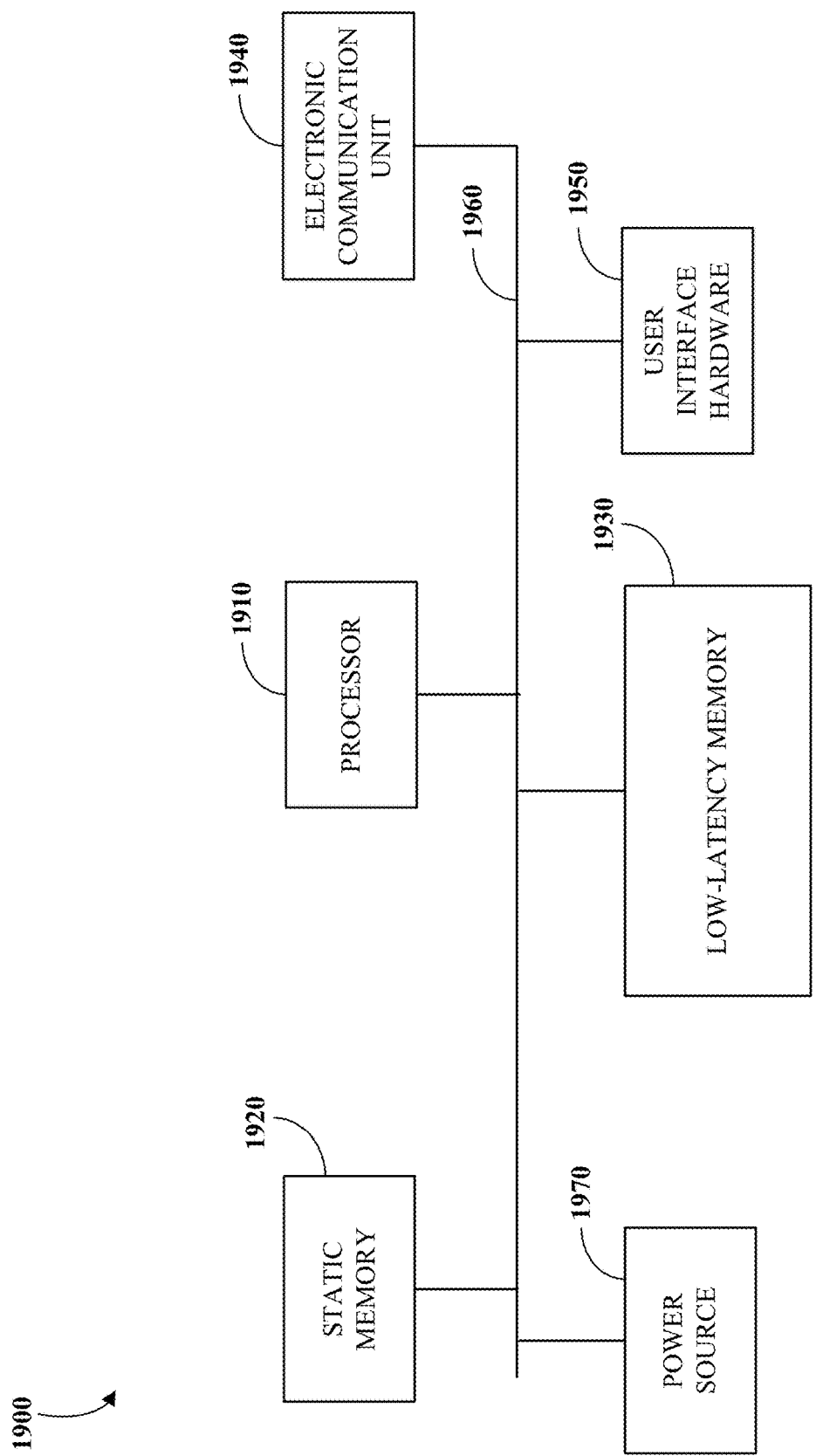
FIG. 19 is a block diagram of an example of a computing device.

The user device 1820 may be a computing device, such as the computing device 1900 shown in FIG. 19. Although one user device 1820 is shown for simplicity, multiple user devices may be used. A user may use the user device 1820 to access the database analysis server 1830. The user device 1820 may comprise a personal computer, computer terminal, mobile device, smartphone, electronic notebook, or the like, or any combination thereof. The user device 1820 may communicate with the database analysis server 1830 via an electronic communication medium 1822, which may be a wired or wireless electronic communication medium. For example, the electronic communication medium 1822 may include a LAN, a WAN, a fiber channel network, the Internet, or a combination thereof.

The database analysis server 1830 may be implemented on a computing device, such as by using one or more of the computing device 1900 shown in FIG. 19. For example, the database analysis server 1830 may be implemented using one or more server devices. In some embodiments, the database analysis server 1830 may be implemented as one or more logical devices in a cloud-based configuration optimized for automatic database analysis. The database analysis server 1830 may store and maintain low-latency data in a low-latency memory device, such as the low-latency memory 1930 shown in FIG. 19, or any other type of data storage medium with relatively fast (low-latency) data access, organized in a low-latency data structure.

As shown in FIG. 18, the database analysis server 1830 includes a database analysis interface unit 1832, an enterprise security and governance unit 1834, a natural language question translator unit 1840, a relational search engine unit 1850, an analysis and visualization unit 1860, an in-memory database 1870, and a distributed cluster manager 1880. Although not expressly shown in FIG. 18, the database analysis interface unit 1832, the enterprise security and governance unit 1834, the analysis and visualization unit 1860, the relational search engine unit 1850, the in-memory database 1870, and the distributed cluster manager 1880 may communicate via an electronic communication medium, such as a computer bus or network. Although the database analysis server 1830 is shown as a single unit, the database analysis interface unit 1832, the enterprise security and governance unit 1834, the natural language question translator unit 1840, the relational search engine unit 1850, the analysis and visualization unit 1860, the in-memory database 1870, and the distributed cluster manager 1880 may be implemented in multiple operatively connected physical units. In some embodiments, one or more of the database analysis interface unit 1832, the enterprise security and governance unit 1834, the natural language question translator unit 1840, the relational search engine unit 1850, the analysis and visualization unit 1860, the in-memory database 1870, and the distributed cluster manager 1880 may be implemented using multiple physical or logical units in a distributed configuration.

The database analysis interface unit 1832 may interface or communicate with one or more external devices or systems, such as the external data source 1810, the user device 1820, or both, via one or more electronic communication mediums, such as the electronic communication medium 1812 or the electronic communication medium 1822. The database analysis interface unit 1832 may implement an application programming interface (API), which may monitor, receive, or both, input signals or messages from the external devices and systems; process received signals or messages; transmit corresponding signals or messages to one or more of the enterprise security and governance unit 1834, the natural language question translator unit 1840, the relational search engine unit 1850, the analysis and visualization unit 1860, the in-memory database 1870, and the distributed cluster manager 1880; receive output signals or messages from one or more of the enterprise security and governance unit 1834, the natural language question translator unit 1840, the relational search engine unit 1850, the analysis and visualization unit 1860, the in-memory database 1870, and the distributed cluster manager 1880; and output, such as transmit or send, the output messages or signals to respective external devices or systems (1810, 1820). The database analysis interface unit 1832 may implement one or more data connectors, which may transfer data between, for example, the low-latency data structure and the external data source 1810, which may include altering, formatting, evaluating, or manipulating the data.

The database analysis interface unit 1832 may receive, or otherwise access, enterprise data from the external data source 1810 and may represent the enterprise data as low-latency data in the low-latency data structure (data population). The database analysis interface unit 1832 may represent the enterprise data from the external data source 1810 as low-latency data in the low-latency data structure.

The data may be organized as tables and columns in the in-memory database 1870 and may be accessed using a structured query language. The data may include values, such as quantifiable numeric values (such as integer or floating-point values), and non-quantifiable values (such as text or image data). Quantifiable data, such as numeric values indicating sizes, amounts, degrees, or the like, may be referred to herein as measures. Non-quantifiable data, such as text values indicating names and descriptions, may be referred to herein as attributes. The data may be organized in tables having rows and columns. A table may organize or group respective aspects of the data. For example, a 'Planets' table may include a list of planets. A table may include one or more columns. A column may describe the characteristics of a discrete aspect of the data in the table. For example, the 'Planets' table may include a 'Planet ID' column, which may describe a numeric value, and a 'Planet' column, which may describe a text value. A record or row of the table may include a respective value corresponding to each column of the table. A column defined as including quantifiable, or numeric, measures may be referred to herein as a measure column. A measure may be a property on which calculations (e.g., sum, count, average, minimum, maximum) may be made. A column defined as including non-quantifiable attributes may be referred to herein as an attribute column. An attribute may be a specification that defines a property of an object. For example, attributes may include text, identifiers, timestamps, or the like. The database analysis interface unit 1832 may consume and/or generate metadata that identifies one or more parameters or relationships for the data, such as based on the enterprise data, and may include the generated metadata in the low-latency data stored in the low-latency data structure. For example, the database analysis interface unit 1832 may identify characteristics of the data, such as attributes, measures, values, unique identifiers, tags, links, column and row keys, or the like, and may include metadata representing the identified characteristics in the low-latency data stored in the low-latency data structure. For example, characteristics of data can automatically be determined by consuming the schema in which the data is stored. Such an analysis can include automatically identifying links or relationships between columns, identifying the meaning of columns (e.g., using column names), and identifying commonly used terms in values (e.g., by indexing values and counting their occurrences). For example, the database analysis interface unit 1832 may be configured to implement the technique 1600 of FIG. 16.

Distinctly identifiable data in the low-latency data stored in the low-latency data structure may be referred to herein as a data portion. For example, the low-latency data stored in the low-latency data structure may be referred to herein as a data portion, a table from the low-latency data stored in the low-latency data structure may be referred to herein as a data portion, a column from the low-latency data stored in the low-latency data structure may be referred to herein as a data portion, a row or record from the low-latency data stored in the low-latency data structure may be referred to herein as a data portion, a value from the low-latency data stored in the low-latency data structure may be referred to herein as a data portion, a relationship defined in the low-latency data stored in the low-latency data structure may be referred to herein as a data portion, metadata describing the low-latency data stored in the low-latency data structure may be referred to herein as a data portion, or any other distinctly identifiable data, or combination thereof, from the low-latency data stored in the low-latency data structure may be referred to herein as a data portion.

The database analysis interface unit 1832 may automatically generate one or more tokens based on the low-latency data, or based on the enterprise data, such as in accordance with data population. A token may be a word, phrase, character, set of characters, symbol, combination of symbols, or the like. A token may represent a data portion in the low-latency data stored in the low-latency data structure. For example, the database analysis interface unit 1832 may automatically generate a token representing the attributes, the measures, the tables, the columns, the values, unique identifiers, tags, links, keys, or any other data portion, or combination of data portions, or a portion thereof. For example, the database analysis interface unit 1832 may generate the token "planet" based on a column of data containing planet names and may generate respective tokens for the planet names in the column. The tokens may be included, such as stored, in the low-latency data stored in the low-latency data structure. The database analysis interface unit 1832 may classify the tokens, which may include storing token classification data in association with the tokens. For example, a token may be classified as an attribute token, a measure token, a value token, or the like.

The database analysis interface unit 1832 may generate a user interface, or one or more portions thereof, for the system 1800 (automatic database analysis interface unit user interface). For example, the database analysis interface unit 1832 may generate instructions for rendering, or otherwise presenting, the user interface, or one or more portions thereof, and may transmit, or otherwise make available, the instructions for rendering, or otherwise presenting, the user interface, or one or more portions thereof, to the user device 1820, for viewing by a user of the user device 1820. For example, the database analysis server 1830 may present the user interface in electronic communication messages (e.g., messages of a web application) transmitted, using the database analysis interface unit 1832, to a user who receives and views the user interface using the user device 1820.

For example, the user interface transmitted by the database analysis interface unit 1832 may include an unstructured search string user input element. The user device 1820 may display the unstructured search string user input element. The user device 1820 may receive input, such as user input, corresponding to the unstructured search string user input element. The user device 1820 may transmit, or otherwise make available, the unstructured search string user input to the database analysis interface unit 1832. The user interface may include other user interface elements, and the user device 1820 may transmit, or otherwise make available, other user input data to the database analysis interface unit 1832.

The database analysis interface unit 1832 may obtain the user input data, such as the unstructured search string, from the user device 1820. The database analysis interface unit 1832 may transmit, or otherwise make available, the user input data to the enterprise security and governance unit 1834, the natural language question translator unit 1840, the relational search engine unit 1850, the analysis and visualization unit 1860, the in-memory database 1870, and the distributed cluster manager 1880, or a combination thereof.

In some embodiments, the database analysis interface unit 1832 may obtain the unstructured search string user input as a sequence of individual characters or symbols, and the database analysis interface unit 1832 may sequentially transmit, or otherwise make available, each character or symbol of the user input data to the enterprise security and governance unit 1834, the natural language question translator unit 1840, the relational search engine unit 1850, the analysis and visualization unit 1860, the in-memory database 1870, and the distributed cluster manager 1880, or a combination thereof.

In some embodiments, the database analysis interface unit 1832 may obtain the unstructured search string user input as a sequence of individual characters or symbols, and the database analysis interface unit 1832 may aggregate the sequence of individual characters or symbols, and may sequentially transmit, or otherwise make available, a current aggregation of the received user input data to the enterprise security and governance unit 1834, the natural language question translator unit 1840, the relational search engine unit 1850, the analysis and visualization unit 1860, the in-memory database 1870, and the distributed cluster manager 1880, or a combination thereof, in response to receiving each respective character or symbol from the sequence.

The enterprise security and governance unit 1834 controls the output to the user from queries based on access rights held by the user. For example, a user may not have access to particular columns or data values in the data. The enterprise security and governance unit 1834 can operate to prevent the return or visualization of insights or result sets to the user that the user does not have permission to view. The enterprise security and governance unit 1834 may apply security at a metadata level through access to columns and tables, or at a data level through row level security. Insights may be based on what the user is authorized to see.

The natural language question translator unit 1840 may be configured to take a string (e.g., natural language text including a question or command) and determine a database query based on the string.

The analysis and visualization unit 1860 may automatically identify one or more insights, which may be data other than data expressly requested by a user, and which may be identified and prioritized, or both, based on probabilistic utility.

The relational search engine unit 1850 may index the tokens, for example, using an inverted index data structure. Indexing the tokens may include generating or maintaining index data structures corresponding to the tokens that are optimized for data retrieval operations. For example, a global index may be maintained across columns to index all of the tokens in the database.

The relational search engine unit 1850 may implement one or more finite state machines. A finite state machine may model or represent a defined set of states and a defined set of transitions between the states. A state may represent a condition of the system represented by the finite state machine at a defined temporal point. A finite state machine may transition from a state (current state) to a subsequent state in response to input. A transition may define one or more actions or operations that the relational search engine unit 1850 may implement.

For example, a finite state machine may represent a current set of received user input data. The relational search engine unit 1850 may generate or instantiate the received user input finite state machine. Instantiating the received user input finite state machine may include entering an empty state, indicating the absence of received user input. The relational search engine unit 1850 may initiate or execute an operation, such as an entry operation, corresponding to the empty state in response to entering the empty state. Subsequently, the relational search engine unit 1850 may receive user input data, and the received user input finite state machine may transition from the empty state to a state corresponding to the received user input data. In some embodiments, the relational search engine unit 1850 may initiate one or more queries in response to transitioning to or from a respective state of a finite state machine.

The relational search engine unit 1850 may instantiate or generate one or more search objects. The relational search engine unit 1850 may initiate a search query by sending a search object to a search constructor (not explicitly shown in FIG. 18). For example, the search constructor may be implemented as part of the analysis and visualization unit 1860, as part of the relational search engine unit, or as a separate unit of the database analysis server 1830. The relational search engine unit 1850 may instantiate, generate, or modify one or more search objects in response to finite state machine transitions. For example, the relational search engine unit 1850 may instantiate a search object in response to a first transition of a finite state machine. The relational search engine unit 1850 may include a first search object instruction in the search object in response to a second transition of the finite state machine. The relational search engine unit 1850 may send the search object including the first search object instruction to the search constructor in response to the second transition of the finite state machine. The relational search engine unit 1850 may include a second search object instruction in the search object in response to a third transition of the finite state machine. The relational search engine unit 1850 may send the search object including the search object instruction, or a combination of the first search object instruction and the second search object instruction, to the search constructor in response to the third transition of the finite state machine. The search object instructions may be represented using any annotation, instruction, text, message, list, pseudo-code, comment, or the like, or any combination thereof that may be converted, transcoded, or translated into structured search instructions for retrieving data from the low-latency data. Translation from a search object instruction to a structured search may be executed against an in-memory database. For example, an unstructured search may be translated to a structured search.

The search constructor may generate, execute, or both, one or more structured search instructions. In some embodiments, the search constructor may generate the structured search instructions using a defined structured data access language, which may be similar to Structured Query Language (SQL), except as described herein or otherwise clear from context. Executing the structured search instructions may include transmitting the structured search instructions to the in-memory database 1870. The search constructor may otherwise control the in-memory database 1870, such as to maintain or modify the low-latency data structure, which may include, for example, joining columns or tables in the low-latency data structure, or aggregating, such as summing, one or more data portions, such as measures, in the low-latency data. The search constructor may receive data responsive to executed structured search instructions, such as from the in-memory database 1870. For simplicity and clarity, a discrete set of structured search instructions may be referred to herein as a query. The search constructor may obtain, or otherwise access, results data, such as from the in-memory database 1870, indicating the data resulting from executing the query on the low-latency data. For example, the search constructor may be configured to implement the technique 1600 of FIG. 16.

Although not shown separately in FIG. 18, the search constructor may include a data visualization unit. For example, the search constructor may include the system 500 of FIG. 5. In some embodiments, the data visualization unit may be a distinct unit, separate from the search constructor. In some embodiments, the database analysis interface unit 1832 may include a user interface unit, and the data visualization unit may be included in the user interface unit.

The data visualization unit, the database analysis interface unit 1832, or a combination thereof, may generate a user interface or one or more portions thereof. For example, the data visualization unit, the database analysis interface unit 1832, or a combination thereof, may obtain the results data indicating the data resulting from executing the query on the low-latency data and may generate user interface elements representing the results data.

The in-memory database 1870 may receive structured search instructions (queries), such as from the search constructor, and may access, manipulate, retrieve, or any combination thereof, the low-latency data from the low-latency data structure in accordance with, or in response to, the structured search instructions, which may include executing the structured search instructions.

Although shown as a single unit in FIG. 18, the in-memory database 1870 may be implemented in a distributed configuration. For example, the in-memory database 1870 may include multiple in-memory database instances. Each in-memory database instance may utilize one or more distinct resources, such as processing or low-latency memory resources, that differ from the resources utilized by the other in-memory database instances. In some embodiments, the in-memory database instances may utilize one or more shared resources, such as resources utilized by two or more in-memory database instances.

The in-memory database 1870 may identify an in-memory database instance as a query coordinator. The query coordinator may generate a query plan based on the received structured search instructions. The query plan may include query execution instructions for executing the received query by the one or more of the in-memory database instances. The query coordinator may distribute, or otherwise make available, the respective portions of the query execution instructions to the corresponding in-memory database instances.

The respective in-memory database instances may receive the corresponding query execution instructions from the query coordinator. The respective in-memory database instances may execute the corresponding query execution instructions to obtain, process, or both, data (intermediate results data) from the low-latency data. The respective in-memory database instances may output, or otherwise make available, the intermediate results data, such as to the query coordinator.

The query coordinator may execute a respective portion of query execution instructions (allocated to the query coordinator) to obtain, process, or both, data (intermediate results data) from the low-latency data. The query coordinator may receive, or otherwise access, the intermediate results data from the respective in-memory database instances. The query coordinator may combine, aggregate, or otherwise process, the intermediate results data to obtain results data.

In some embodiments, obtaining the intermediate results data by one or more of the in-memory database instances may include outputting the intermediate results data to, or obtaining the intermediate results data from, one or more other in-memory database instances, in addition to, or instead of, obtaining the intermediate results data from the low-latency data.

The in-memory database 1870 may output, or otherwise make available, the results data to the search constructor.

The distributed cluster manager 1880 manages the operative configuration of the system 1800, including the configuration and distribution of one or more of the database analysis interface unit 1832, the enterprise security and governance unit 1834, the natural language question translator unit 1840, the relational search engine unit 1850, the analysis and visualization unit 1860, and the in-memory database 1870 in a distributed configuration. For example, the distributed cluster manager 1880 may instantiate one or more of the database analysis interface unit 1832, the enterprise security and governance unit 1834, the natural language question translator unit 1840, the relational search engine unit 1850, the analysis and visualization unit 1860, and the in-memory database 1870 on one or more physical devices or may allocate one or more resources, such as processors, to one or more of the database analysis interface unit 1832, the enterprise security and governance unit 1834, the natural language question translator unit 1840, the relational search engine unit 1850, the analysis and visualization unit 1860, and the in-memory database 1870.

The distributed cluster manager 1880 may generate and maintain automatic database analysis system configuration data, such as in one or more tables, identifying the operative configuration of the system 1800. For example, the distributed cluster manager 1880 may automatically update the automatic database analysis system configuration data in response to an operative configuration event, such as a change in availability or performance for a physical or logical unit of the system 1800. One or more of the database analysis interface unit 1832, the enterprise security and governance unit 1834, the natural language question translator unit 1840, the relational search engine unit 1850, the analysis and visualization unit 1860, and the in-memory database 1870 may access the automatic database analysis system configuration data, such as to identify intercommunication parameters or paths.

FIG. 19 is a block diagram of an example of a computing device 1900. One or more aspects, features, or elements of systems for query transformation for database schema may be implemented using the computing device 1900. The computing device 1900 includes a processor 1910, static memory 1920, low-latency memory 1930, an electronic communication unit 1940, user interface hardware 1950, a bus 1960, and a power source 1970. Although shown as a single unit, any one or more elements of the computing device 1900 may be integrated into any number of separate physical units. For example, the low-latency memory 1930 and the processor 1910 may be integrated in a first physical unit, and the user interface hardware 1950 may be integrated in a second physical unit. Although not shown in FIG. 19, the computing device 1900 may include other units, or elements, such as an enclosure or one or more sensors.

The computing device 1900 may be a stationary computing device, such as a personal computer (PC), a server, a workstation, a minicomputer, or a mainframe computer; or a mobile computing device, such as a mobile telephone, a personal digital assistant (PDA), a laptop, or a tablet PC.

The processor 1910 may include any device or combination of devices capable of manipulating or processing a signal or other information, including optical processors, quantum processors, molecular processors, or a combination thereof. The processor 1910 may be a central processing unit (CPU), such as a microprocessor, and may include one or more processing units, which may respectively include one or more processing cores. The processor 1910 may include multiple interconnected processors. For example, the multiple processors may be hardwired or networked, including wirelessly networked. In some implementations, the operations of the processor 1910 may be distributed across multiple physical devices or units that may be coupled directly or across a network. In some implementations, the processor 1910 may include a cache, or cache memory, for internal storage of operating data or instructions. The processor 1910 may include one or more special-purpose processors, one or more digital signal processors (DSPs), one or more microprocessors, one or more controllers, one or more microcontrollers, one or more integrated circuits, one or more Application Specific Integrated Circuits, one or more Field Programmable Gate Arrays, one or more programmable logic arrays, one or more programmable logic controllers, firmware, one or more state machines, or any combination thereof.

The processor 1910 may be operatively coupled with the static memory 1920, the low-latency memory 1930, the electronic communication unit 1940, the user interface hardware 1950, the bus 1960, the power source 1970, or any combination thereof. The processor may execute, which may include controlling the static memory 1920, the low-latency memory 1930, the electronic communication unit 1940, the user interface hardware 1950, the bus 1960, the power source 1970, or any combination thereof, to execute instructions, programs, code, applications, or the like, which may include executing one or more aspects of an operating system, and which may include executing one or more instructions to perform one or more aspects, features, or elements described herein, alone or in combination with one or more other processors.

The static memory 1920 is coupled to the processor 1910 via the bus 1960 and may include non-volatile memory, such as a disk drive, or any form of non-volatile memory capable of persistent electronic information storage, such as in the absence of an active power supply. Although shown as a single block in FIG. 19, the static memory 1920 may be implemented as multiple logical or physical units.

The static memory 1920 may store executable instructions or data, such as application data, an operating system, or a combination thereof, for access by the processor 1910. The executable instructions may be organized into programmable modules or algorithms, functional programs, codes, code segments, or combinations thereof to perform one or more aspects, features, or elements described herein. The application data may include, for example, user files, database catalogs, configuration information, or a combination thereof. The operating system may be, for example, a desktop or laptop operating system; an operating system for a mobile device, such as a smartphone or tablet device; or an operating system for a large device, such as a mainframe computer.

The low-latency memory 1930 is coupled to the processor 1910 via the bus 1960 and may include any storage medium with low-latency data access including, for example, DRAM modules such as DDR SDRAM, Phase-Change Memory (PCM), flash memory, or a solid-state drive. Although shown as a single block in FIG. 19, the low-latency memory 1930 may be implemented as multiple logical or physical units.

The low-latency memory 1930 may store executable instructions or data, such as application data, for low-latency access by the processor 1910. The executable instructions may include, for example, one or more application programs that may be executed by the processor 1910. The executable instructions may be organized into programmable modules or algorithms, functional programs, codes, code segments, and/or combinations thereof to perform various functions described herein. For example, the executable instructions may include instructions to identify a column of utility, generate an exploration query based on a search query, generate an insight based on a result of the exploration query, and transmit an insight for display on a user device. An exploration query may be based on an analysis of lower level data of a hierarchically structured data based on probabilistic utility. The lower level data may be referred to as a drill path. A drill path may be a type of exploration query for grouping by a column of utility. An exploration query may be automatically generated by identifying and prioritizing the lower level data based on probabilistic utility. Analyzing an exploration query may include refining attributes to identify utility data by identifying columns (i.e., groups of attributes) and further analyzing those columns by automatically identifying and prioritizing the data based on probabilistic utility to automatically generate a data set for each exploration query. The generated data set may be referred to as an exploration result set.

The low-latency memory 1930 may be used to store data that is analyzed or processed using the systems or methods described herein. For example, storage of some or all of the data in the low-latency memory 1930 instead of the static memory 1920 may improve the execution speed of the systems and methods described herein by permitting access to data more quickly by an order of magnitude or greater (e.g., nanoseconds instead of microseconds).

The electronic communication unit 1940 is coupled to the processor 1910 via the bus 1960. The electronic communication unit 1940 may include one or more transceivers. The electronic communication unit 1940 may, for example, provide a connection or link to a network via a network interface. The network interface may be a wired network interface, such as Ethernet, or a wireless network interface. For example, the computing device 1900 may communicate with other devices via the electronic communication unit 1940 and the network interface using one or more network protocols, such as Ethernet, Transmission Control Protocol/Internet Protocol (TCP/IP), power line communication (PLC), Wi-Fi, infrared, ultraviolet (UV), visible light, fiber optic, wire line, general packet radio service (GPRS), Global System for Mobile communications (GSM), code-division multiple access (CDMA), or other suitable protocols.

The user interface hardware 1950 may include any unit capable of interfacing with a human user, such as a virtual or physical keypad, a touchpad, a display, a touch display, a speaker, a microphone, a video camera, a sensor, a printer, or any combination thereof. For example, the user interface hardware 1950 may be used to view and interact with a user interface (e.g., webpage) that is received using the electronic communication unit 1940 after being presented by a remote server in network communications messages. The user interface hardware 1950 may include a display; a positional input device, such as a mouse, touchpad, touchscreen, or the like; a keyboard; or any other human and machine interface device. The user interface hardware 1950 may be coupled to the processor 1910 via the bus 1960. In some implementations, the user interface hardware 1950 can include a display, which can be a liquid crystal display (LCD), a cathode-ray tube (CRT), a light emitting diode (LED) display, an organic light emitting diode (OLED) display, an active matrix organic light emitting diode (AMOLED) display, or other suitable display. In some implementations, the user interface hardware 1950 may be part of another computing device (not shown).

The bus 1960 is coupled to the static memory 1920, the low-latency memory 1930, the electronic communication unit 1940, the user interface hardware 1950, and the power source 1970. Although a single bus is shown in FIG. 19, the bus 1960 may include multiple buses, which may be connected, such as via bridges, controllers, or adapters.

The power source 1970 provides energy to operate the computing device 1900. The power source 1970 may be a general-purpose alternating-current (AC) electric power supply, or a power supply interface, such as an interface to a household power source. In some implementations, the power source 1970 may be a single-use battery or a rechargeable battery to allow the computing device 1900 to operate independently of an external power distribution system. For example, the power source 1970 may include a wired power source; one or more dry cell batteries, such as nickel-cadmium (NiCd), nickel-zinc (NiZn), nickel metal hydride (NiMH), lithium-ion (Li-ion); solar cells; fuel cells; or any other device capable of powering the computing device 1900.

Figure 20:
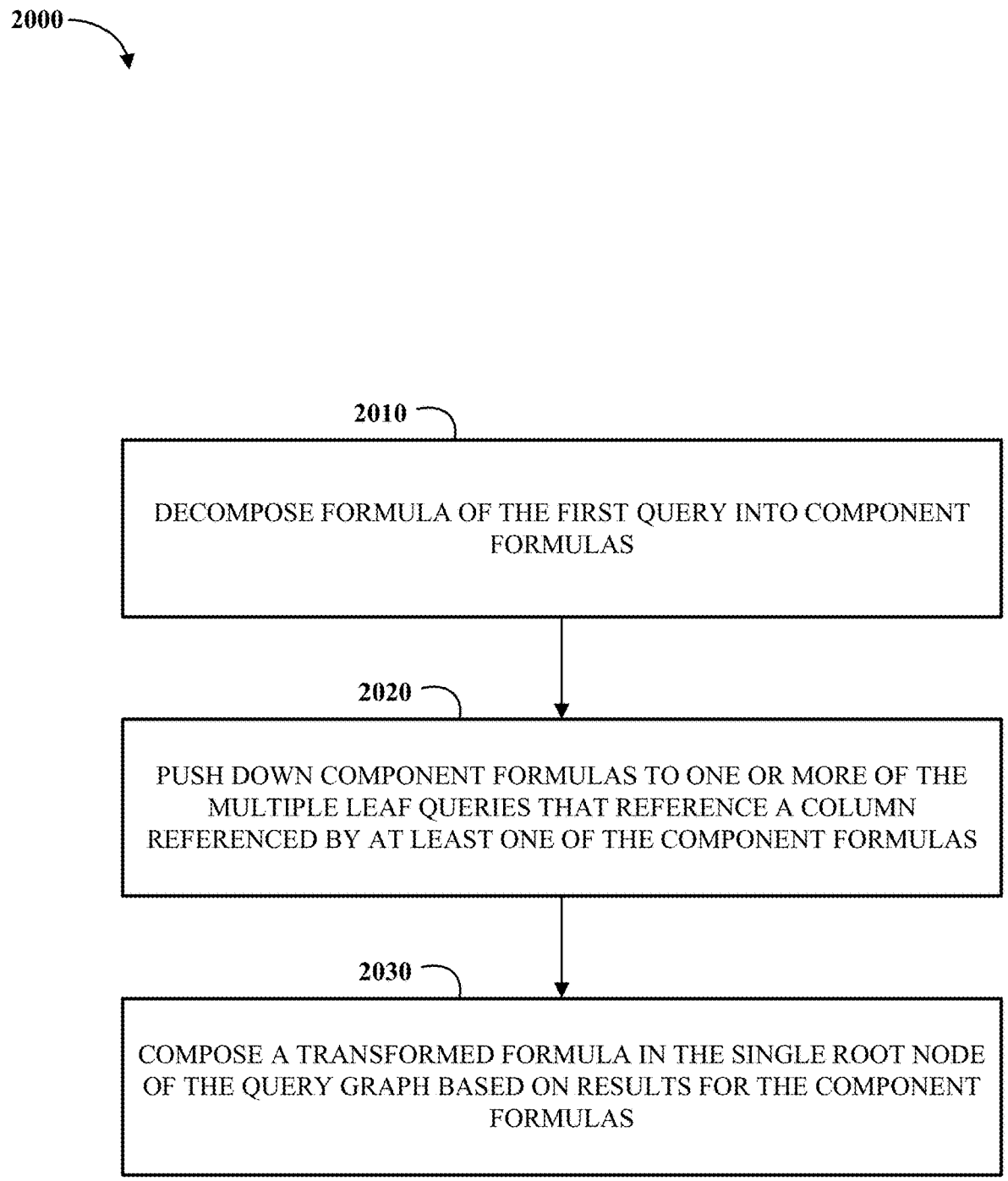
FIG. 20 is a flowchart illustrating an example of a technique for formula transformation.

FIG. 20 is a flowchart illustrating an example of a technique 2000 for formula transformation. The technique 2000 includes decomposing 2010 a formula of the first query into component formulas; pushing down 2020 the component formulas to one or more of the multiple leaf queries; and composing 2030 a transformed formula in the single root node of the query graph based on results for the component formulas. For example, the technique 2000 may be implemented by the multi-root query transformer 526 of FIG. 5. For example, the technique 2000 may be implemented by the database analysis server 1830 of FIG. 18. For example, the technique 2000 may be implemented using the computing device 1900 of FIG. 19.

The technique 2000 includes decomposing 2010 a formula of the first query into component formulas. For example, the formula may be a non-composable formula (e.g., average, variance, or standard deviation). For example, the formula "average(T1(m_1))" may be decomposed 2010 into the component formulas "sum(T1(m_1))" and "count (T1(m_1))". For example, the formula may have multiple expression roots (i.e., the formula references multiple tables in the database). For example, the formula may include an aggregation on a measure from a dimension table.

The technique 2000 includes pushing down 2020 the component formulas to one or more of the multiple leaf queries that reference a column referenced by at least one of the component formulas. For example, the component formulas may be pushed down 2020 to a respective leaf query for their expression root table. In some implementations, the component formulas may be pushed down 2020 when the multiple leaf queries for a first query are generated 1640.

The technique 2000 includes composing 2030 a transformed formula in the single root node of the query graph based on results for the component formulas. For example, the component formulas for the formula "average(T1 (m_1))" may be composed 2030 in the root node (e.g., root vertex 1450 of FIG. 14 or root vertex 1560 of FIG. 15) of the query graph as "sum(T1(m_1))/count(T1(m_1))".

Enhancement Based on Identification of One-to-One Join Relationships

For example, when the user types query text into a database interface, the query text may be converted into a query specification (e.g., the query specification 502). This query specification may then be sent through a series of transformers in a query transformer (e.g., the query transformer 510) that converts this query specification to an accurate SQL query. That SQL query may be sent to a database and the results may be displayed back to the user. This section describes implementations that enable the skipping or simplification of steps in a multi-root query transformer (e.g., the multi-root query transformer 526) when a fan trap schema or chasm trap schema no longer needs special handling to avoid over-counting because of the presence of one or more one-to-one joins. In a one-to-one join relationship between two tables in a database schema, one record in a table is associated with one and only one record in another table.

In some prior database systems, users were unable to model schemas with one-to-one joins. Instead these systems assume all join relationships represented in a data model could be many-to-one, which may lead to complex query handling, which may cause a performance impact, when no such handling was necessary.

Some implementations described herein enable a user to mark a join as a one-to-one join if the user knows that each row in the source table has exactly one corresponding row in the destination table. With this designation, queries on the schema can avoid creating extra subqueries and improve performance significantly.

For example, fan traps may occur when the user creates a query with an aggregation on a dimension table. The root table may have a many-to-one join to the dimension table, so over-counting can occur if the aggregation is not done in a separate subquery from the join. This over-counting does not need to happen if the root table and the destination table are at the same grain.

Chasm traps occur when the user creates a query with multiple root tables connected to the same dimension table. The root tables may have many-to-one joins to the dimension tables, so each root may need its own subquery in order to prevent over-counting. Again, over-counting is not actually a problem if these tables are at the same grain.

For fan traps, the creation of a subquery for the aggregation in a dimension table may be skipped when that dimension table is only connected to roots by one-to-one joins. The one-to-one join relationship ensures that the root and dimension are at the same grain, so over-counting will not happen by keeping the join and the aggregation in the same query. For chasm traps, the creation of subqueries may be skipped when the roots are known to be connected to the dimension table with one-to-one joins. In one-to-one joins, the direction of the join does not matter and can be reversed. Using this property, the direction of joins of a join graph may be reversed in such a way that we reduce the number of roots in the query and avoid the generation potential chasm trap subqueries.

In some prior database systems, all logical relationships between tables in a data model are assumed to be many-to-one joins, meaning that the direction matters. Systems and techniques described in relation to FIGS. 21-35 enable the (optional) identification of logical relationships between tables of a database as one-to-one joins. Using this information about the logical relationships, the direction of one-to-one joins may be reversed without affecting the outcome of the query. These changes of join direction can be used to potentially avoid chasm and fan trap queries and send less subqueries to a database.

For example, these systems may enable users to choose one-to-one as a join type and persist this choice in and metadata store. For example, these systems may enable conversion of chasm trap queries to non-chasm trap queries where applicable. For example, these systems may enable conversion fan trap queries to non-fan trap queries where applicable. For example, these systems may enable speed-up execution of queries on chasm trap and fan trap schemas when there is a one-to-one join subgraph.

If two tables are joined by a one-to-one join, then it may be as if these tables came from the same table that have been split down the middle. These split tables may be recombined in order to avoid complex queries. Though it helps to visualize the algorithm like this, during implementation, the two tables are kept separate in the database and logically combined during an intermediate step of a complex/multi-root query transformation (e.g., implemented by the multi-root transformer 526), since the database itself may have no information regarding the combined table. There are two special handlings based on indications of one-to-one join relationships in a data model for the database that may be implemented, one to avoid chasm traps and one to avoid fan traps.

Figure 21:
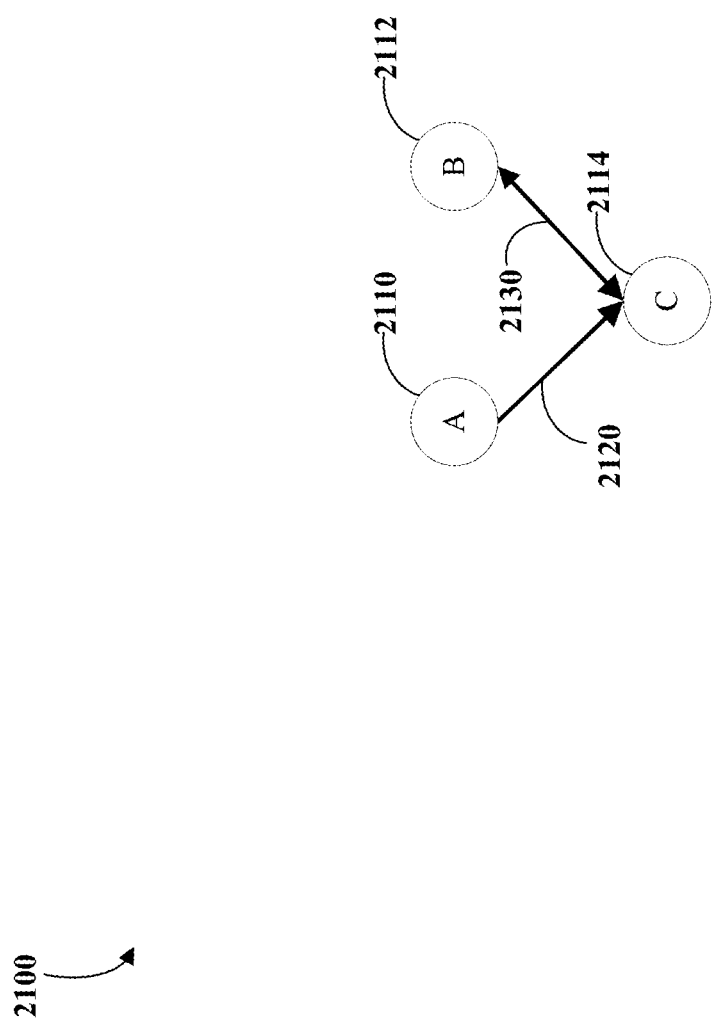
FIG. 21 is a diagram of an example of a connected subgraph of a join graph representing tables in a database.

FIG. 21 is a diagram of an example of a connected subgraph 2100 of a join graph representing tables in a database. For example, the connected subgraph 2100 may have been selected 1630 from the join graph (e.g., the join graph 100) for the database based on an input query by the multi-root transformer 526 as part of implementing the technique 1600 of FIG. 16 or the technique 3200 of FIG. 32. In this example, the connected subgraph 2100 includes the vertices (2110, 2112, and 2114) respectively corresponding to the tables (A, B, and C) and the directed edges (2120 and 2130) connecting these vertices. The directed edge 2120 corresponds to a many-to-one join with the source vertex 2110 and the destination vertex 2114. The directed edge 2130 has the source vertex 2112 and the destination vertex 2114 (i.e., it runs down). However, the data model for the database also includes an indication that the directed edge 2130 corresponds to a one-to-one join, thus the directed edge 2130 is illustrated as bidirectional.

Figure 22:
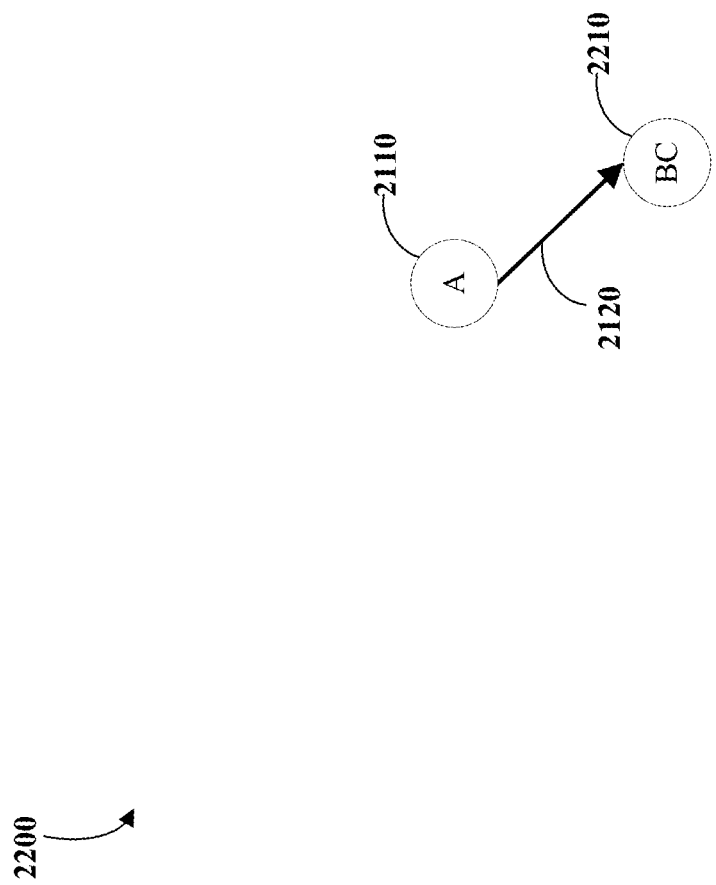
FIG. 22 is a diagram of an example of a modified subgraph of a join graph representing tables in a database, in which vertices connected by a directed edge corresponding to a one-to-one join have been merged.

FIG. 22 is a diagram of an example of a modified subgraph 2200 of a join graph representing tables in a database, in which vertices connected by a directed edge corresponding to a one-to-one join have been merged to logically combine the corresponding tables for the purpose of query transformation. In this example, the modified subgraph 2200 includes the vertices (2110 and 2210) respectively corresponding to the tables (A and BC) and the directed edge (2120) connecting these vertices.

The connected subgraph 2100 of FIG. 21 depicts a chasm trap schema, with the directed edge 2130 (B-C) indicated as corresponding to a one-to-one join. This means that B and C may be logically combined into a single table BC, and the resulting modified subgraph 2200 no longer has multiple roots, so the chasm trap may be avoided.

One property of one-to-one joins that can be used to avoid chasm traps in implementation is that they can be reversed without affecting the outcome. Since the two tables are fully intersecting, whichever table is the source does not make a difference in the query, but does change how many roots the query has. Given the original schema, the direction of the directed edge 2130, corresponding to the B-C join, may be reversed (i.e., source vertex and destination vertex switched) to obtain the modified subgraph 2300 of FIG. 23.

Figure 23:
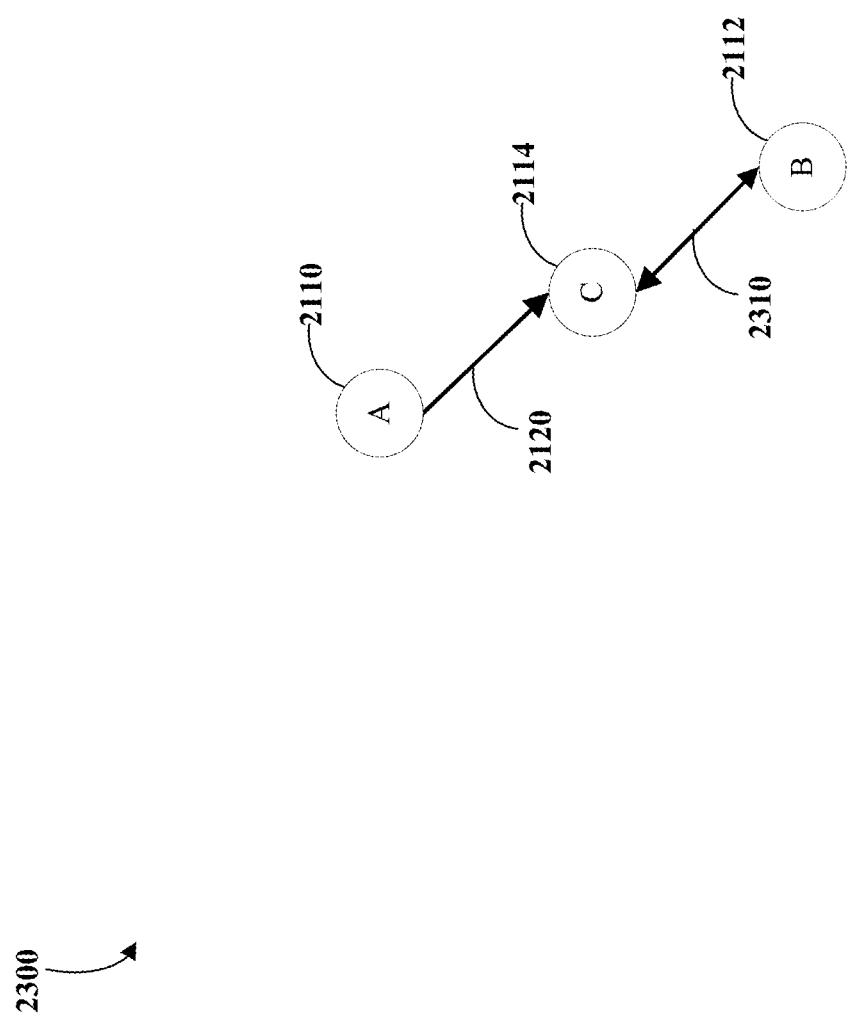
FIG. 23 is a diagram of an example of a modified subgraph of a join graph representing tables in a database, in which a directed edge corresponding to a one-to-one join has been reversed.

FIG. 23 is a diagram of an example of a modified subgraph 2300 of the join graph representing tables in a database, in which a directed edge 2310 corresponding to a one-to-one join has been reversed. In this example, the modified subgraph 2300 includes the vertices (2110, 2112, and 2114) respectively corresponding to the tables (A, B, and C) and the directed edges (2120 and 2310) connecting these vertices. The directed edge 2310 has been determined from the directed edge 2130 of the connected subgraph 2100 by reversing the direction of the directed edge 2130 (which is depicted as flipping the connected vertices vertically).

The modified subgraph 2300 now has one root (the vertex 2110) instead of two and no longer needs chasm trap handling. Since chasm trap leaf queries are inner joined and one-to-one joins are essentially inner joins, the results will not be changed by this reversal of the directed edge 2130 corresponding to a one-to-one join.

Figure 24:
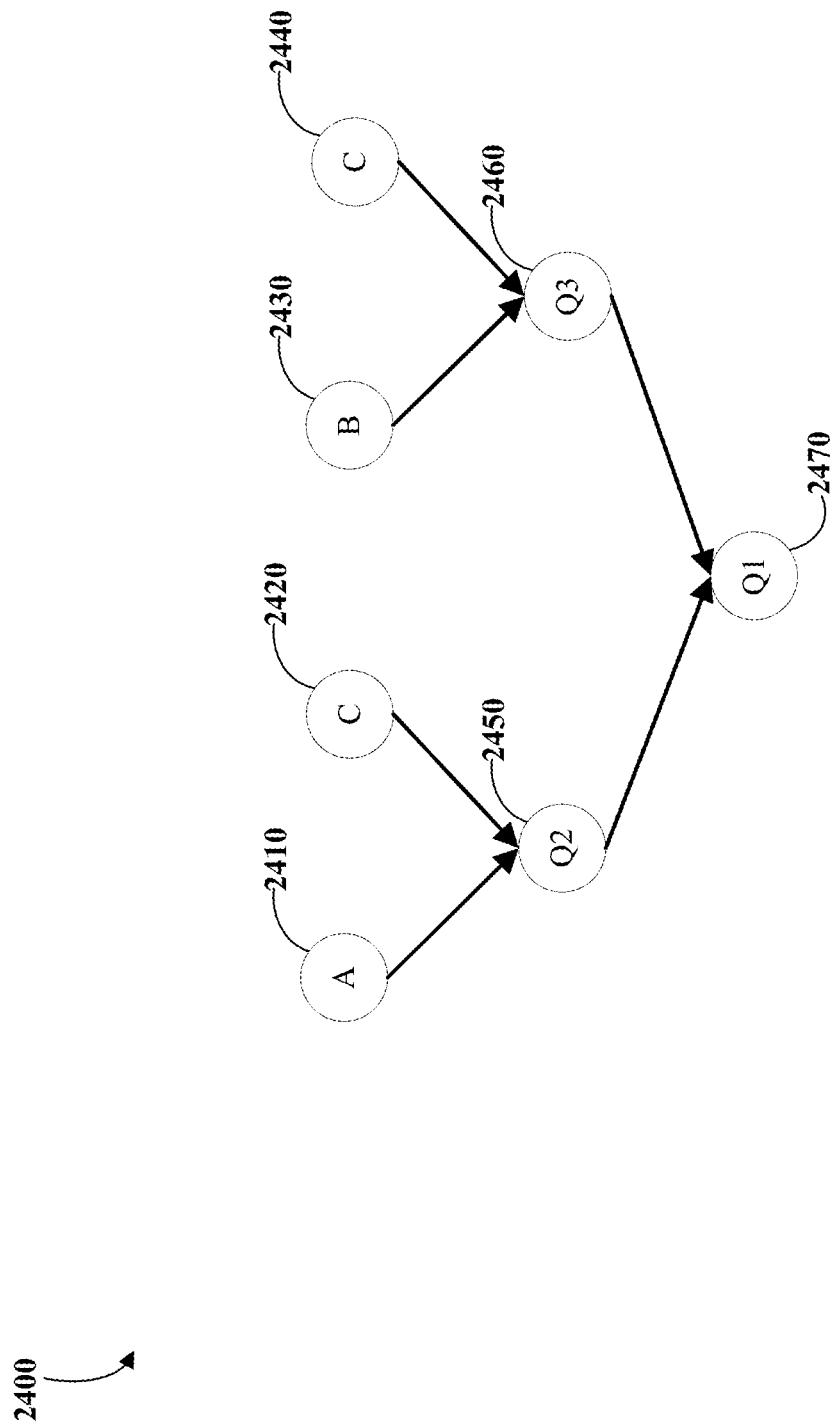
FIG. 24 is a diagram of an example of a query graph that is a tree with a root corresponding to a transformed query based on an input query.

FIG. 24 is a diagram of an example of a query graph 2400 that is a tree with a root corresponding to a transformed query based on an input query. The query graph 2400 is generated 1650 based on the connected subgraph 2100 of FIG. 21, as described in relation to the technique 1600 of FIG. 16. The query graph 2400 includes leaf vertices (2410, 2420, 2430, and 2440) that correspond respectively to tables (A, C, B, and C); a vertex 2450 corresponding to Q2, which is a leaf query on a join of the tables of its child vertices (2410 and 2420); a vertex 2460 corresponding to Q3, which is a leaf query on a join of the tables of its child vertices (2430 and 2440); and a root vertex 2470 corresponding to Q1, which is a join of all the results of the queries of the query graph 2400. The query graph 2400 includes directed edges corresponding to many-to-one joins of query results.

Figure 25:
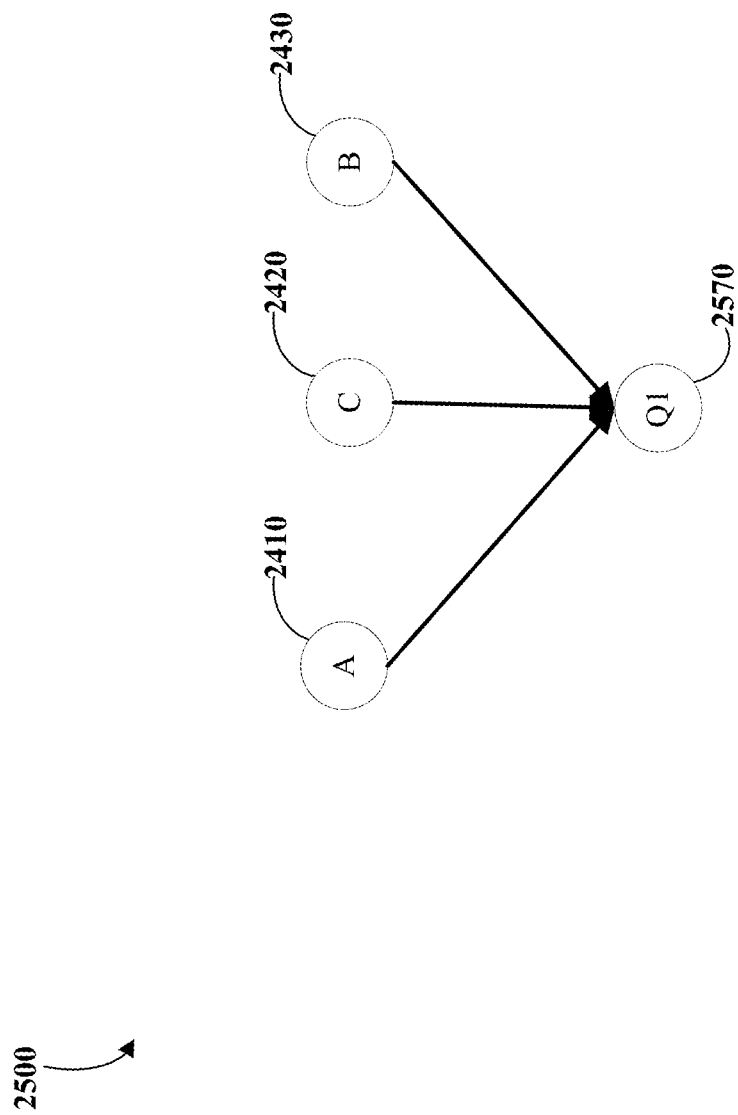
FIG. 25 is a diagram of an example of a query graph representing a transformed query that is generated based on a modified subgraph, in which a directed edge has been reversed based on an indication that the directed edge corresponds to a one-to-one join.

FIG. 25 is a diagram of an example of a query graph 2500 representing a transformed query that is generated based on a modified subgraph 2300, in which a directed edge 2310 has been reversed based on an indication that the directed edge corresponds to a one-to-one join. The query graph 2500 is generated 3250 based on the modified subgraph 2300 of FIG. 23, as described in relation to the technique 3200 of FIG. 32. The query graph 2500 includes leaf vertices (2410, 2420, and 2430) that correspond respectively to tables (A, C, and B); and a root vertex 2570 corresponding to Q1, which is leaf query on a join of all the tables of the graph 2500. The query graph 2500 includes directed edges corresponding to many-to-one joins of query results.

Before reversal of the directed edge 2310 (with chasm trap handling as described in relation to the technique 1600 of FIG. 16), the resulting transformed query has two leaf queries (2450 and 2460). After reversal of the directed edge 2310 (with chasm trap handling as described in relation to the technique 3200 of FIG. 32), the resulting transformed query has one leaf query (2570), which may lead to a reduction in the complexity of the transformed query. The join of B and C may have the same grain as just B, so that the query graph 2500 (e.g., a query tree) will still not result in over-counting when the transformed query is invoked on the database.

Figure 26:
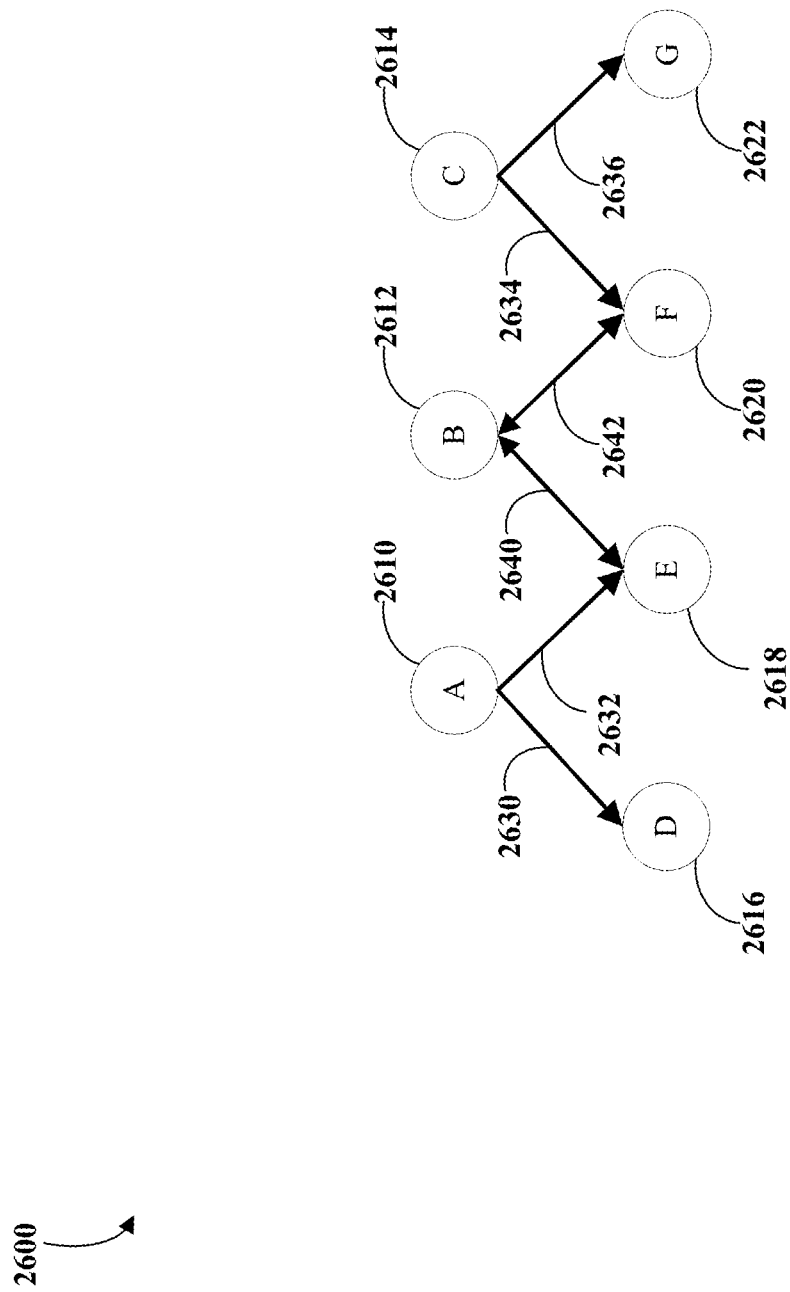
FIG. 26 is a diagram of an example of a connected subgraph of a join graph representing tables in a database.

FIG. 26 is a diagram of an example of a connected subgraph 2600 of a join graph representing tables in a database. For example, the connected subgraph 2600 may have been selected 1630 from the join graph (e.g., the join graph 100) for the database based on an input query by the multi-root transformer 526 as part of implementing the technique 1600 of FIG. 16 or the technique 3200 of FIG. 32. In this example, the connected subgraph 2600 includes the vertices (2610, 2612, 2614, 2616, 2618, 2620, and 2622) respectively corresponding to the tables (A, B, C, D, E, F, and G) and the directed edges (2630, 2632, 2634, 2636, 2640, and 2642) connecting these vertices. The directed edge 2630 corresponds to a many-to-one join with the source vertex 2610 and the destination vertex 2616. The directed edge 2632 corresponds to a many-to-one join with the source vertex 2610 and the destination vertex 2618. The directed edge 2634 corresponds to a many-to-one join with the source vertex 2614 and the destination vertex 2620. The directed edge 2636 corresponds to a many-to-one join with the source vertex 2614 and the destination vertex 2622. The directed edge 2640 has the source vertex 2612 and the destination vertex 2618 (i.e., it runs down). The directed edge 2642 has the source vertex 2612 and the destination vertex 2620 (i.e., it runs down). However, the data model for the database also includes an indication that the directed edge 2640 corresponds to a one-to-one join and the directed edge 2642 corresponds to a one-to-one join, thus the directed edges 2640 and 2642 are illustrated as bidirectional.

Figure 27:
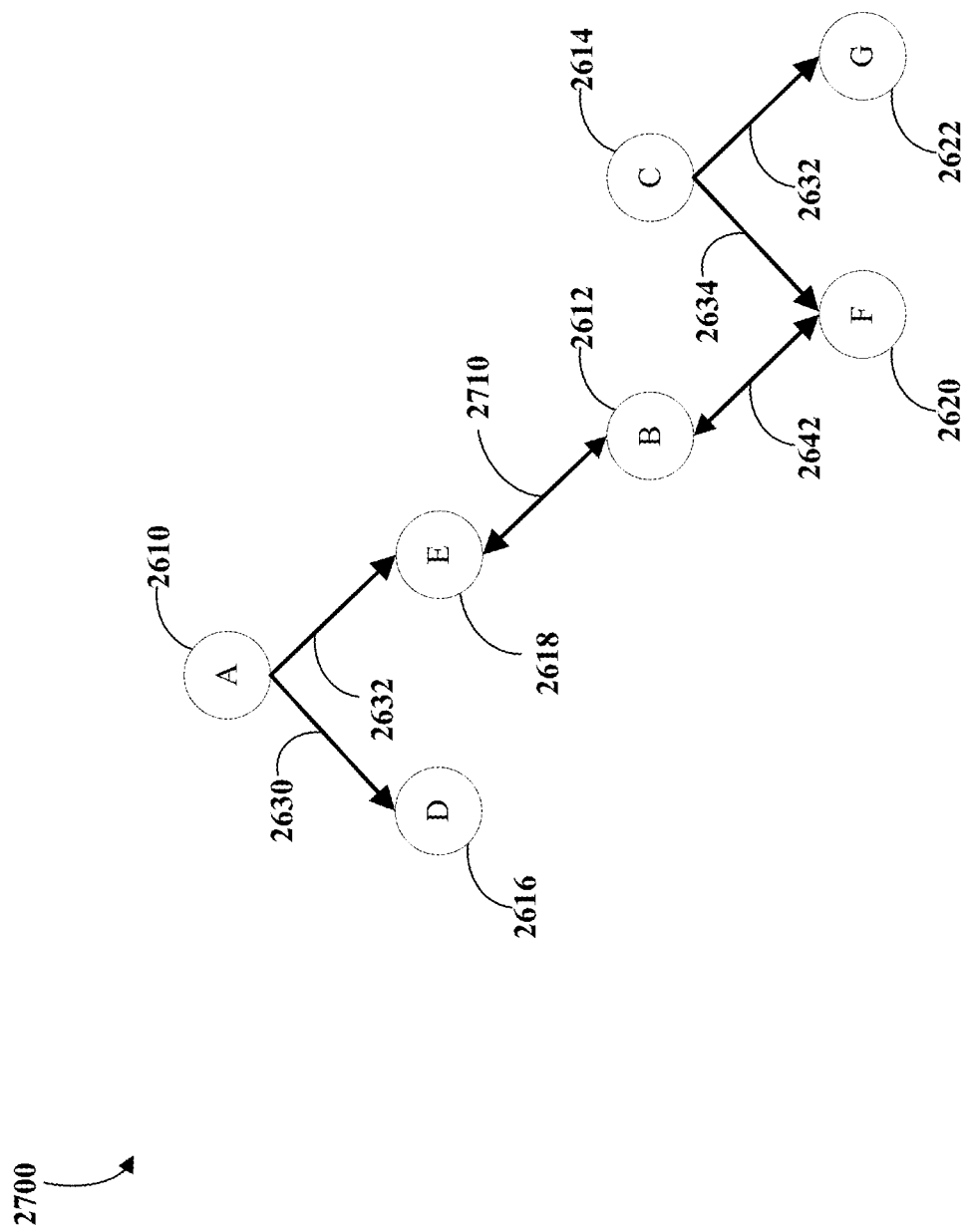
FIG. 27 is a diagram of an example of a modified subgraph of a join graph representing tables in a database, in which a directed edge corresponding to a one-to-one join has been reversed.

FIG. 27 is a diagram of an example of a modified subgraph 2700 of a join graph representing tables in a database, in which a directed edge 2710 corresponding to a one-to-one join has been reversed. In this example, the modified subgraph 2700 includes the vertices (2610, 2612, 2614, 2616, 2618, 2620, and 2622) respectively corresponding to the tables (A, B, C, D, E, F, and G) and the directed edges (2630, 2632, 2634, 2636, 2710, and 2642) connecting these vertices. The connected subgraph 2600 of FIG. 26 has been modified by reversing the direction of the directed edge 2640 to obtain the modified subgraph 2700. The directed edge 2710 that now connects the source vertex 2618 and the destination vertex 2612 results from reversing the direction of the directed edge 2640, which is indicated to correspond to a one-to-one join.

In some implementations, a technique for modifying a connected subgraph based on an input query includes:

1.) selecting one or more (e.g., all) connected subgraphs of the connected subgraph that include only edges that correspond to a one-to-one join (e.g., as determined based on an indication in a logical data model of the database); and 2.) for at least one (e.g., for each) of the selected connect subgraphs with only one-to-one join edges, iteratively reversing one or more directed edges of the selected connected subgraph, including the directed edge identified by the indication, to reduce a number of root tables in the selected connected subgraph. For example, the edges may be iteratively reversed until the selected subgraph has one root or the minimum number of necessary roots. In some cases it may not be possible to reduce the number of roots in one of the selected connected subgraphs, in which case that selected connected subgraph may be skipped.

For example, this technique may be applied to modify the connected subgraph 2600 of FIG. 26 to obtain the modified subgraph 2700 of FIG. 27. In this example, the edge corresponding to the B-E join has been reversed and reduced the number of roots in the query by one. A and C are necessary roots, so the modified subgraph 2700 is complete.

Figure 28:
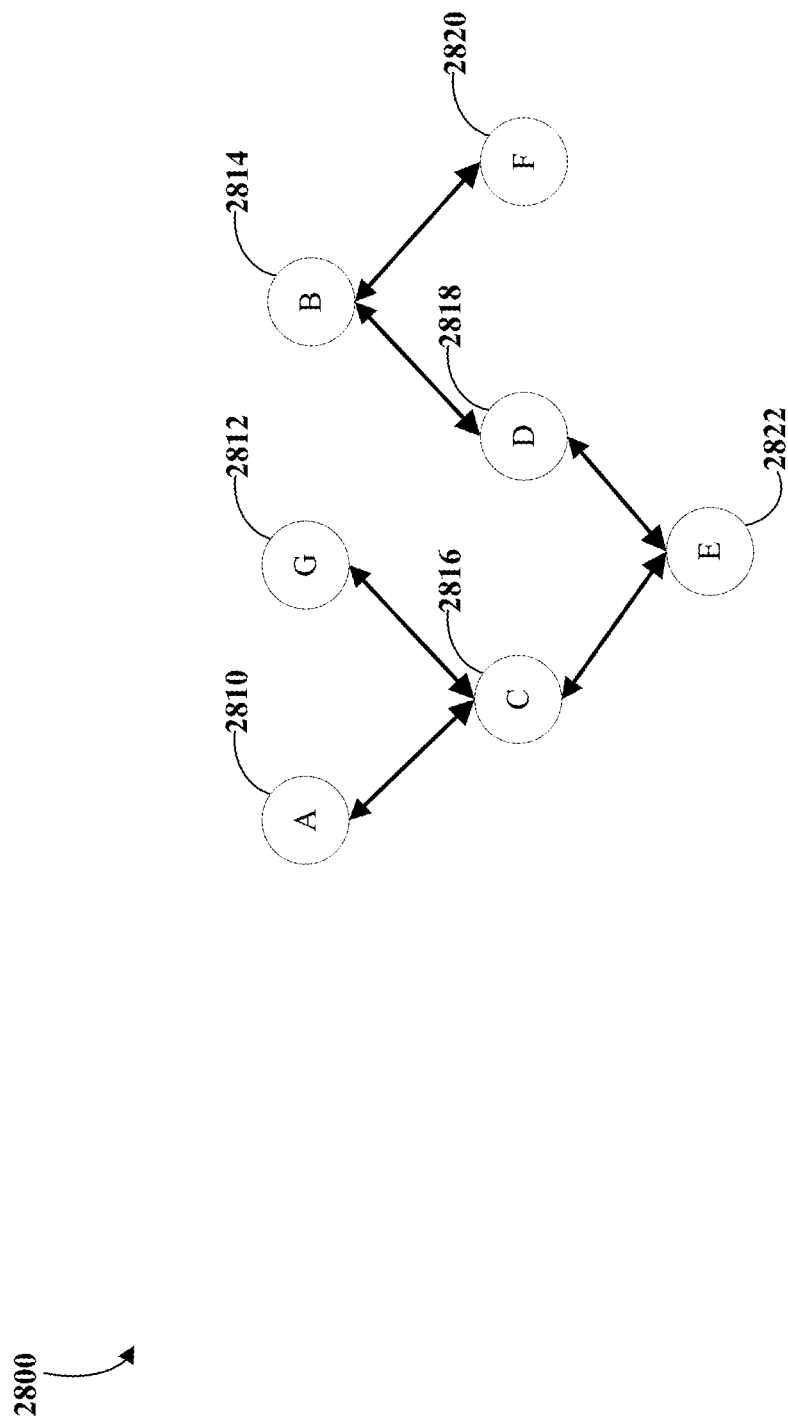
FIG. 28 is a diagram of an example of a connected subgraph of a join graph representing tables in a database, in which all the edges correspond to one-to-one joins.

FIG. 28 is a diagram of an example of a connected subgraph 2800 of a join graph representing tables in a database, in which all the edges correspond to one-to-one joins. For example, the connected subgraph 2800 may have been selected 1630 from the join graph (e.g., the join graph 100) for the database based on an input query by the multi-root transformer 526 as part of implementing the technique 1600 of FIG. 16 or the technique 3200 of FIG. 32. In this example, the connected subgraph 2800 includes the vertices (2810, 2812, 2814, 2816, 2818, 2820, and 2822) respectively corresponding to the tables (A, G, B, C, D, F, and E) and the directed edges connecting these vertices. A data model for the database includes an indication that all of the directed edges of the connected subgraph 2800 correspond to one-to-one joins.

For example, using the property of one-to-one joins that the direction of the join can be reversed and return the same results, the number of roots in the connected subgraph 2800 may be reduced (e.g., minimized) to avoid chasm trap queries. The first step is to find all reversible join paths in the join graph. In some implementation the database keeps a denorm table based on the direction of the join. If the join direction is changed then this denorm table cannot be used. Minimizing roots by reversing join direction and hence reducing the number of chasm traps may still improve efficiency of the resulting transformed query, because the cost of sub-queries may be higher than denorm invalidation. However, because of this denorm cost, a technique may be employed that attempts to reduce (e.g., minimize) the number of denorms that are invalidated by the modification of the connected subgraph 2800 by finding the shortest join paths to reverse first.

To find reversible join paths, the joins paths between all roots and the shared dimension tables that are shared between roots. Since the shared dimension table has another root, reversing this join path will eliminate one root of the graph. In the example of FIG. 28, there are two shared dimensions tables between the three root tables:

C, between A and G

E, between A and B and between G and B

For example, the list of reversible join paths found is [A-C, G-C, A-C-E, G-C-E, B-D-E].

The second step reverses one or more of the join paths (e.g., until a minimal number of roots is achieved in the modified subgraph). In some implementations, a join path is reversed if:

The root of the join path is still a root. This prevents reversing A-C-E after reversing A-C has already eliminated A as a root.

The destination of the join path would not become a root as a result of the join path reversal. This prevents reversing G-C after already reversing A-C, because then C would become a root and the number of roots would not be reduced. In this example, the reversible join paths A-C and G-C-E are reversed end up with the modified subgraph 2900 of FIG. 29.

Figure 29:
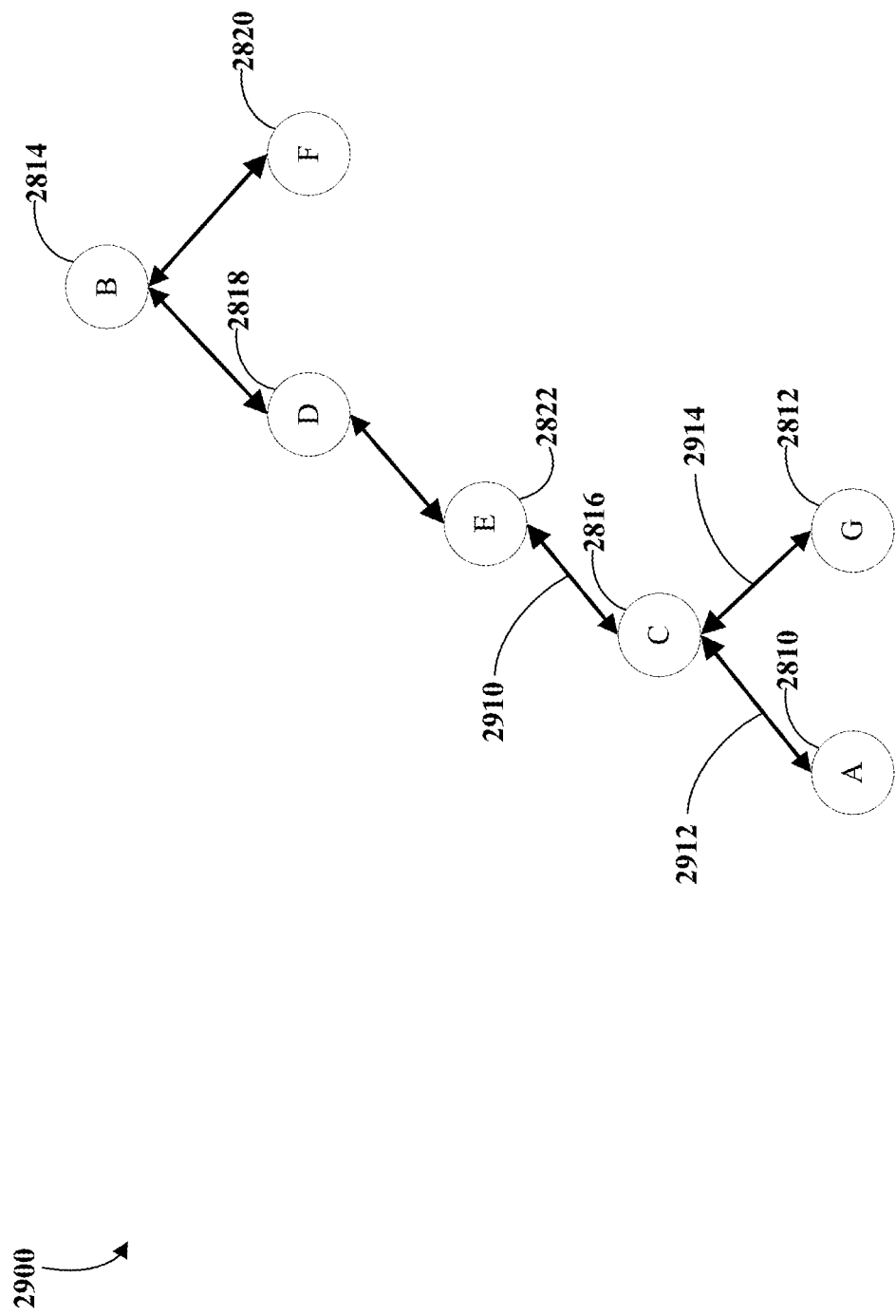
FIG. 29 is a diagram of an example of a modified subgraph of a join graph representing tables in a database, in which one or more directed edges along one or more reversible join paths have been reversed.

FIG. 29 is a diagram of an example of a modified subgraph 2900 of a join graph representing tables in a database, in which one or more directed edges along one or more reversible join paths have been reversed. In this example, the modified subgraph 2900 includes the vertices (2810, 2812, 2814, 2816, 2818, 2820, and 2822) respectively corresponding to the tables (A, G, B, C, D, F, and E) and the directed edges connecting these vertices. The directed edges of the modified subgraph 2900 include directed edges (2910, 2912, and 2914), which are determined by reversing the direction of the directed edges along reversible join paths of the connected subgraph 2800 to reverse those reversible join paths and reduce the number of root tables.

Fan Trap

Figure 30:
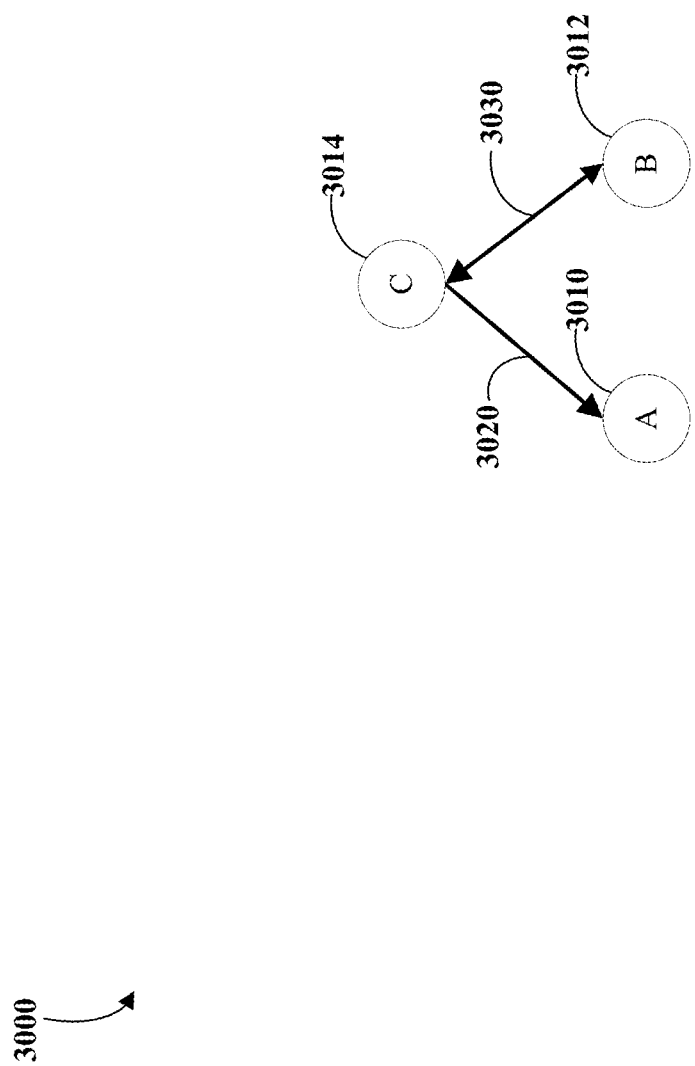
FIG. 30 is a diagram of an example of a connected subgraph of a join graph representing tables in a database.

FIG. 30 is a diagram of an example of a connected subgraph 3000 of a join graph representing tables in a database. For example, the connected subgraph 3000 may have been selected 1630 from the join graph (e.g., the join graph 100) for the database based on an input query by the multi-root transformer 526 as part of implementing the technique 1600 of FIG. 16 or the technique 3200 of FIG. 32. In this example, the connected subgraph 3000 includes the vertices (3010, 3012, and 3014) respectively corresponding to the tables (A, B, and C) and the directed edges (3020 and 3030) connecting these vertices. The directed edge 3020 corresponds to a many-to-one join with the source vertex 3014 and the destination vertex 3010. The directed edge 3030 has the source vertex 3014 and the destination vertex 3012 (i.e., it runs down). However, the data model for the database also includes an indication that the directed edge 3030 corresponds to a one-to-one join, thus the directed edge 3030 is illustrated as bidirectional.

The connected subgraph 3000 corresponds to a fan trap query (e.g., the query has aggregation on B), with the directed edge 3030 (C-B) corresponding to a one-to-one join. Again, C and B can be logically combined to a single table BC by merging the vertex 3012 with the vertex 3014, which is the root of the query, to obtain the modified subgraph 3100 of FIG. 31. There is no longer an aggregate dimension in the query, so the fan trap is avoided.

Figure 31:
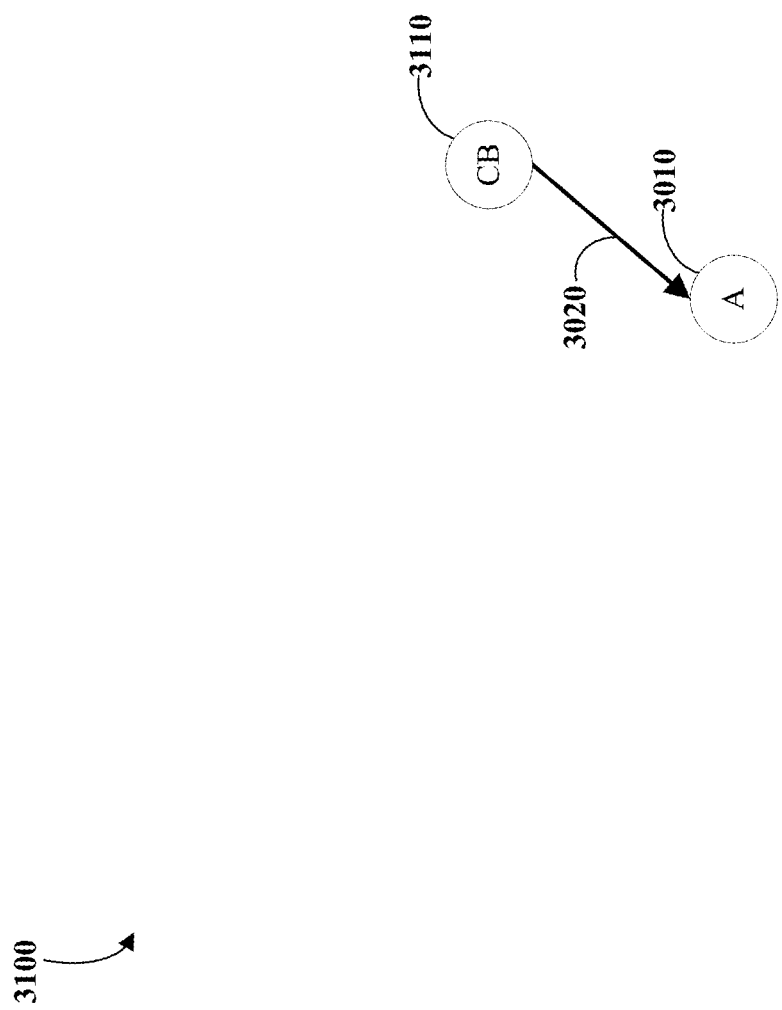
FIG. 31 is a diagram of an example of a modified subgraph of a join graph representing tables in a database, in which vertices connected by a directed edge corresponding to a one-to-one join have been merged.

FIG. 31 is a diagram of an example of a modified subgraph 3100 of a join graph representing tables in a database, in which vertices connected by a directed edge corresponding to a one-to-one join have been merged. In this example, the modified subgraph 3100 includes the vertices (3010 and 3110) respectively corresponding to the tables (A and BC) and the directed edge (3020) connecting these vertices.

If a user provides data indicating to the system that a join between a fact table and a dimension table is a one-to-one join, then it is known that these tables are at the same grain. In some implementations, the dimension table may be added to a list of ignored fan trap roots if all joins from a root table to the dimension table are one-to-one joins. For example, in the multi-root query transformer 526, a query that uses an aggregate dimension table from the list of ignored fan trap roots is not split into two queries because over-counting is not possible.

Figure 32:
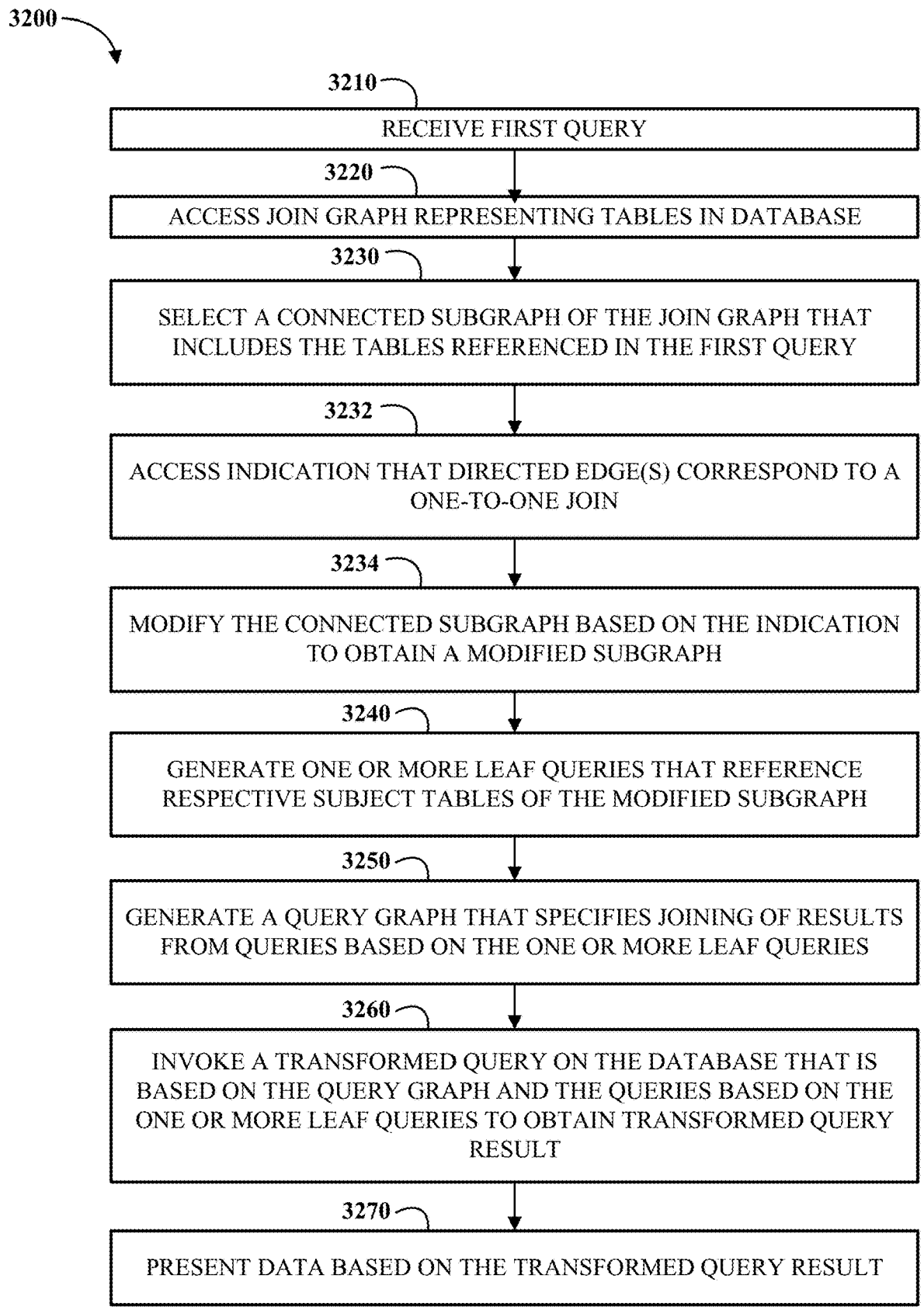
FIG. 32 is a flowchart illustrating an example of a technique for transforming a query based on modeling information about a database schema before invoking the query on the database.

FIG. 32 is a flowchart illustrating an example of a technique 3200 for transforming a query based on modeling information about a database schema before invoking the query on the database. The technique 3200 includes receiving 3210 a first query that references data in two or more of the tables of a database; accessing 3220 a first join graph representing tables in the database; selecting 3230 a connected subgraph of the first join graph that includes the two or more tables referenced in the first query; accessing 3232 an indication that a directed edge of the connected subgraph corresponds to a one-to-one join; modifying 3234 the connected subgraph based on the indication to obtain a modified subgraph, wherein the modified subgraph has less root tables than the connected subgraph; generating 3240 one or more leaf queries that reference respective subject tables that are each a root table of the modified subgraph or a table including a measure referenced in the first query; generating 3250 a query graph that specifies joining of results from queries based on the one or more leaf queries to obtain a transformed query result for the first query, wherein the query graph has a single root node corresponding to the transformed query result; invoking 3260 a transformed query on the database that is based on the query graph and the queries based on the one or more leaf queries to obtain the transformed query result; and presenting 3270 data based on the transformed query result. For example, the technique 3200 may be implemented by the query transformer 510 of FIG. 5. For example, the technique 3200 may be implemented by the database analysis server 1830 of FIG. 18. For example, the technique 3200 may be implemented using the computing device 1900 of FIG. 19. For example, the technique 3200 may be used to implement the multi-root query transformer 526 of FIG. 5.

The technique 3200 includes receiving 3210 a first query that references data in two or more of the tables of the database. For example, the first query may represent a question or a command for a database analysis system (e.g., a system including the database analysis server 1830). For example, the first query may be received 3210 by a server that is presenting a user interface (e.g., a webpage) to a user who is located at a remote location via communication messages over an electronic communications network (e.g., a wide area network). For example, the first query may be received 3210 by a server presenting a user interface when a user types in a search bar of the user interface and causes a message including the first query to be transmitted to the server. For example, a user may have entered the first query in the user interface (e.g., a web page) by typing (e.g., using a keyboard) or by speaking (e.g., using a microphone and speech recognition module). In some implementations, the first query is not modified by the server or other device that receives 3210 the first query. In some implementations, receiving 3210 the first query includes performing preliminary transformations on data received from a remote device to convert the query to a proper format for subsequent analysis. For example, receiving 3210 the first query may include receiving a query specification (e.g., the query specification 502) from a remote device (e.g., a user's personal computing device) and applying one or more transformations (e.g., using the worksheet transformer 520, the group function transformer 522, and/or the windowing function transformer 524) to the query specification to determine the first query. The first query may then be passed on for subsequent processing (e.g., passed into the multi-root query transformer 526).

The technique 3200 includes accessing 3220 a first join graph (e.g., the join graph 100 of FIG. 1) representing tables in the database. The first join graph has vertices corresponding to respective tables in the database and directed edges corresponding to join relationships. For example, the first join graph may be part of a data-model data structure that describes a logical structure of data stored in the database. For example, the first join graph may be stored in a variety of formats, such as a graph data structure with vertex records that include identifiers (e.g., names and/or pointers) for respective tables stored in the database. In some implementations, the join graph encodes logical relationships of tables in a worksheet (e.g., the worksheet W described above). For example, accessing 3220 the first join graph may include reading a data structure including the first join graph from a memory (e.g., the static memory 1920 or the low-latency memory 1930 of FIG. 19). For example, accessing 3220 the first join graph may include receiving data including the first join graph from a remote device (e.g., the database 572 of FIG. 5 or the external data source 1810 of FIG. 18) in communications received via a communications interface (e.g., the electronic communication unit 1940 of FIG. 19).

The technique 3200 includes selecting 3230 a connected subgraph of the first join graph that includes the two or more tables referenced in the first query. For example, selecting 3230 the connected subgraph may include selecting all the vertices of the join graph corresponding to tables referenced by the first query, and, if necessary, selecting additional tables with corresponding vertices in the join graph to form a connected graph (i.e., ignoring directionality of edges, there is at least one path between any two vertices in the resulting graph). In some implementations, selecting 3230 the connected subgraph includes biasing table selection to select paths that include tables referenced in the first query. For example, if there are multiple paths possible in the query between two tables, then a system may be configured to prefer the path that contains tables that are already present in the first query (e.g., as described in relation to FIG. 8). In some implementations, selecting 3230 the connected subgraph includes biasing table selection to select paths that include root tables of the first join graph. For example, if there are multiple paths possible in the query between two tables and none of the paths contains any table already present in the query, then a system may be configured to prefer the path that involves a root table (e.g., as described in relation to FIG. 9). In some implementations, a minimum number of tables are selected 3230 for inclusion in the connected subgraph in order to form a connected graph that includes all tables referenced in the first query. In some implementations, selecting 3230 the connected subgraph includes selecting one or more additional attribution dimension tables that are shared between two root tables of the connected subgraph (e.g., as described in relation to FIGS. 10 and 11), and more than a minimum number of tables in order to form a connected graph that includes all tables referenced in the first query are selected for including in the connected subgraph. For example, selecting 3230 the connected subgraph may include implementing the technique 1700 of FIG. 17.

The technique 3200 includes accessing 3232 an indication that a directed edge of the connected subgraph corresponds to a one-to-one join. For example, the indication may indicate that one or more directed edges of the connected subgraph correspond to respective one-to-one joins. In some implementations, the indication includes a list of directed edges in the join graph that correspond to respective one-to-one joins. For example, a join graph may represent join relationships, including many-to-one and one-to-one joins, as directed edges. For example, the indication may be applied as an override to default many-to-one join interpretation of directed edge data structure in the join graph data structure. For example, the indication may be a list of one-to-one join relationships that references corresponding directed edges of the join graph using pointers or other identifiers (e.g., a GUID) of a directed edge. In some implementations, an indication that a directed edge corresponds to a one-to-one join may be stored as part of a data structure (e.g., a Boolean flag in directed edge record) in the join graph representing the directed edge. For example, a data structure representing a directed edge in the join graph may include a source vertex identifier, a destination vertex identifier, and an indication (e.g., stored as a Boolean flag or an integer) of whether the directed edge correspond to a one-to-one join relationship between the tables corresponding to the source vertex and the destination vertex. In some implementations, the indication includes a data structure in a data model representing tables in the database. For example, the database model (e.g., including a worksheet) may be specific to and or tailored for the use of a particular user or group of users, while other users may access data in the database using different database models. In some implementations, indication includes a data structure in a schema of the database. For example, an indication in a schema of the database may apply to all users of the database. For example, the indication may be generated using the technique 3500 of FIG. 35. For example, accessing 3232 the indication may include reading a data structure including the indication from a memory (e.g., the static memory 1920 or the low-latency memory 1930 of FIG. 19). For example, accessing 3232 the indication may include receiving data including the indication from a remote device (e.g., the database 572 of FIG. 5 or the external data source 1810 of FIG. 18) in communications received via a communications interface (e.g., the electronic communication unit 1940 of FIG. 19).

The technique 3200 includes modifying 3234 the connected subgraph based on the indication to obtain a modified subgraph. In some implementations, the modified subgraph has less root tables than the connected subgraph. For example, reducing the number of root tables in the connected subgraph before generating a query based on this subgraph for the first query may reduce the complexity of a transformed query determined to avoid double counting errors in the presence of potential chasm traps of the database schema, which may improve performance of a database interface accessing data in the database based on the first query. For example, modifying 3234 the connected subgraph based on the indication to obtain the modified subgraph may include reversing the direction of a directed edge identified by the indication (e.g., as described in relation to FIG. 23, FIG. 27, and/or FIG. 29). For example, modifying 3234 the connected subgraph based on the indication to obtain the modified subgraph may include implementing the technique 3300 of FIG. 33. For example, modifying 3234 the connected subgraph based on the indication to obtain the modified subgraph may include implementing the technique 3400 of FIG. 34. For example, modifying 3234 the connected subgraph based on the indication to obtain the modified subgraph may include merging two vertices of the connected subgraph that are connected by the directed edge identified by the indication (e.g., as described in relation to FIG. 22). In some implementations, the connected subgraph may be modified 3234 based on the indication to obtain the modified subgraph in order to avoid or reduce processing to handle a potential fan trap of the database schema. For example, modifying 3234 the connected subgraph based on the indication to obtain the modified subgraph may include merging two vertices of the connected subgraph that are connected by the directed edge identified by the indication (e.g., as described in relation to FIG. 31).

The technique 3200 includes generating 3240 one or more leaf queries that reference respective subject tables that are each a root table of the modified subgraph or a table including a measure referenced in the first query. In some implementations, generating at least two of the leaf queries includes inserting a reference to a primary key column for a shared attribution dimension table of the respective subject tables of the at least two of the leaf queries. In some implementations, one of the one or more leaf queries includes a reference to an attribute in a dimension table that is referenced in the first query. For example, the one or more leaf queries may be generated 3240 based on the first query and the modified subgraph as described in relation to FIGS. 2 and 12. In some implementations, generating 3240 the one or more leaf queries may include decomposing a formula of the first query into component formulas and pushing down the component formulas to corresponding leaf queries. For example, the technique 2000 of FIG. 20 may be implemented to decompose a formula of the first query.

In some implementations (not shown explicitly in FIG. 32), the technique 3200 may include splitting one of the one or more leaf queries into leaf queries that are perfectly joinable with a respective leaf query of the one or more leaf queries. The queries based on the one or more leaf queries include the leaf queries resulting from the split. For example, one of the one or more leaf queries may be split as described in relation to FIG. 15.

The technique 3200 includes generating 3250 a query graph that specifies joining of results from queries based on the one or more leaf queries to obtain a transformed query result for the first query. For example, the query graph may have a single root node corresponding to the transformed query result. For example, the query graph may be a tree. In some implementations, the queries based on the one or more leaf queries are simply the one or more leaf queries themselves. In some implementations, the queries based on the one or more leaf queries include leaf queries that result from splitting one of the one or more leaf queries generated 3240 to determine a leaf query that is perfectly joinable with another query of the query graph. For example, the query graph may be generated 3250 as described in relation to FIGS. 13-15. In some implementations, generating 3250 a query graph may include composing a transformed formula in the single root node of the query graph based on results for the component formulas. For example, the technique 2000 of FIG. 20 may be implemented to compose the transformed formula.

The technique 3200 includes invoking 3260 a transformed query on the database that is based on the query graph and the queries based on the one or more leaf queries to obtain the transformed query result. In some implementations, the queries based on the one or more leaf queries are simply the one or more leaf queries themselves. In some implementations, the queries based on the one or more leaf queries include leaf queries that result from splitting one of the one or more leaf queries generated 3240 to determine a leaf query that is perfectly joinable with another query of the query graph. In some implementations, the transformed query may be determined solely based on the query graph and the queries based on the one or more leaf queries. In some implementations, the transformed query may also be determined based on subsequent query transformation applied to query specification based on the query graph and the queries based on the one or more leaf queries. For example, the transformed query that is invoked 3260 may result from passing a query specification based on the query graph and the queries based on the one or more leaf queries through one or more additional subsequent transformations (e.g., using the RLS transformer 528 and/or the views transformer 530). The transformed query (e.g., in a database agnostic syntax) may specify a logical set of operations for accessing and/or processing data available in the database. In some implementations, the transformed query is invoked 3260 by transmitting (e.g., via an electronic communications network) a request or command message including the transformed query to an external database server (e.g., the database 572 of FIG. 5 or the external data source 1810 of FIG. 18) that in turn executes a search specified by the transformed query on the database and returns the transformed query result. In some implementations, the transformed query is invoked 3260 by executing a search specified by the transformed query on the database, which may have data stored or cached locally (e.g., in high-speed volatile memory), to generate the transformed query result locally. For example, the transformed query may be encoded in the same format as the first query. In some implementations, the transformed query may be encoded in a different format than the first query in order to match the syntax requirements of a database server managing the database (e.g., an external database or a locally stored database). For example, the transformed query may be in a defined structured data access language (e.g., Structured Query Language (SQL) or a similar language), and may be determined based on a sequence of tokens of a database syntax of the first query. For example, the transformed query may be in another query format supported by a local or remote database server, and may be determined based on a sequence of tokens of the database syntax of the first query.

The technique 3200 includes presenting 3270 data based on the transformed query result. For example, raw data, summary data, and/or plots or charts of the transformed query result may be presented 3270 in a user interface (e.g., a webpage). In some implementations, a summary and/or visual formatting of the data may be determined based on a configuration record (e.g., including user preferences) of the user interface and/or the transformed query result by a machine learning module (e.g., including a neural network) that is trained to identify relevant aspects of data in the context of one or more databases and use cases, and select an appropriate display format. For example, the data based on the transformed query result may be presented 3270 by transmitting the data as part of the user interface in messages sent via an electronic communications network (e.g., as part of a websocket over a wide area network). In some implementations, the data based on the transformed query result may be presented 3270 in signals passed to a directly connected display for viewing by a user co-located with a computing device implementing the technique 3200.

Although the technique 3200 is shown as a series of operations for clarity, implementations of the technique 3200 or any other technique or algorithm described in connection with the implementations disclosed herein can be performed in various orders or concurrently. Additionally, operations in accordance with this disclosure can be performed with other operations not presented and described herein. Furthermore, one or more aspects of the systems and techniques described herein can be omitted. For example, in some implementations, the operation presenting 3270 data based on the transformed query result may be omitted from the technique 3200.

Figure 33:
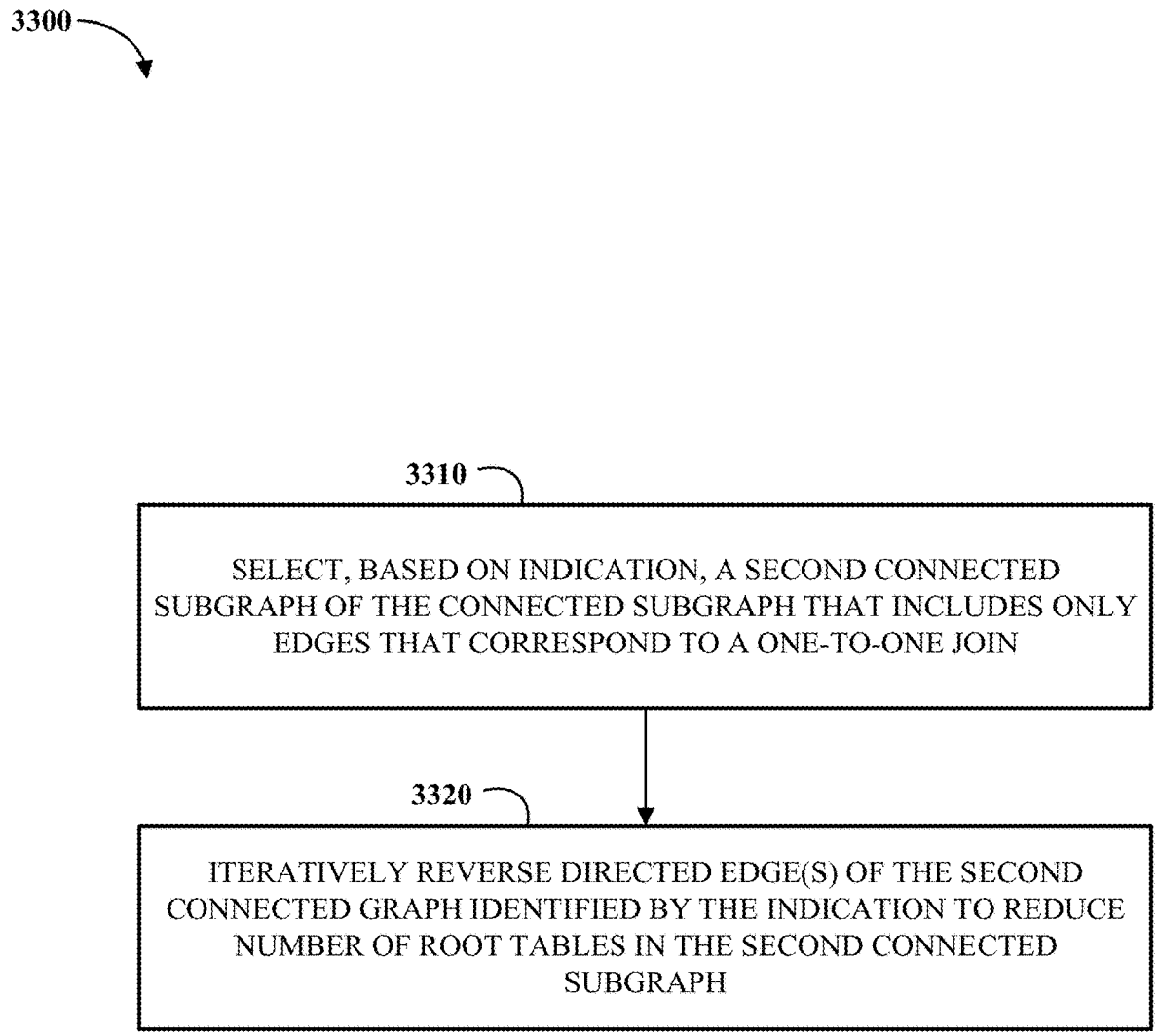
FIG. 33 is a flowchart illustrating an example of a technique for modifying a connected subgraph of a join graph representing tables in a database.

FIG. 33 is a flowchart illustrating an example of a technique 3300 for modifying a connected subgraph of a join graph representing tables in a database. The technique 3300 includes selecting 3310, based on the indication, a second connected subgraph of the connected subgraph that includes only edges that correspond to a one-to-one join; and iteratively reversing 3320 one or more directed edges of the second connected subgraph, including the directed edge identified by the indication, to reduce a number of root tables in the second connected subgraph. For example, the technique 3300 may be implemented by the query transformer 510 of FIG. 5. For example, the technique 3300 may be implemented by the database analysis server 1830 of FIG. 18. For example, the technique 3300 may be implemented using the computing device 1900 of FIG. 19. For example, the technique 3300 may be used to implement the multi-root query transformer 526 of FIG. 5.

The technique 3300 includes selecting 3310, based on the indication, a second connected subgraph of the connected subgraph that includes only edges that correspond to a one-to-one join. For example, the second connected subgraph may be selected 3310 as described in relation to FIG. 26 and FIG. 27.

The technique 3300 includes iteratively reversing 3320 one or more directed edges of the second connected subgraph, including the directed edge identified by the indication, to reduce a number of root tables in the second connected subgraph. For example, the one or more directed edges of the second connected subgraph may be iteratively reversed 3320 as described in relation to FIG. 26 and FIG. 27.

Figure 34:
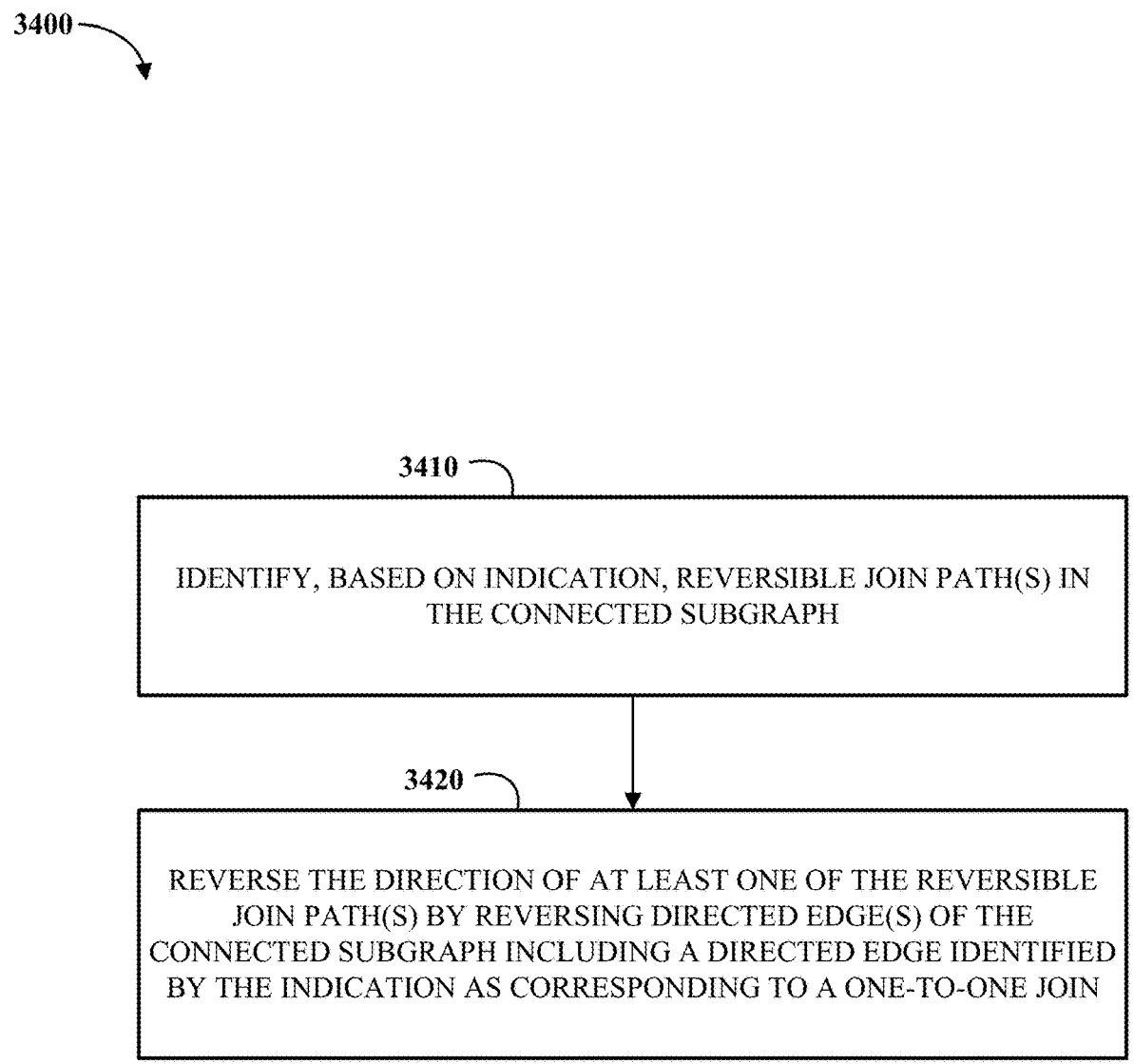
FIG. 34 is a flowchart illustrating an example of a technique for modifying a connected subgraph of a join graph representing tables in a database using reversible join paths in the connected subgraph.

FIG. 34 is a flowchart illustrating an example of a technique 3400 for modifying a connected subgraph of a join graph representing tables in a database using reversible join paths in the connected subgraph. The technique 3400 includes identifying 3410, based on the indication, one or more reversible join paths in the connected subgraph. The one or more reversible joins paths may each connect a source vertex corresponding to a root table of the connected subgraph to a destination vertex corresponding to a shared dimension table of the connected subgraph that is shared with another root table of the connected subgraph; and reversing 3420 the direction of at least one of the one or more reversible join paths by reversing one or more directed edges of the connected subgraph that are identified by the indication as corresponding to a one-to-one join. For example, the technique 3400 may be implemented by the query transformer 510 of FIG. 5. For example, the technique 3400 may be implemented by the database analysis server 1830 of FIG. 18. For example, the technique 3400 may be implemented using the computing device 1900 of FIG. 19. For example, the technique 3400 may be used to implement the multi-root query transformer 526 of FIG. 5.

The technique 3400 includes identifying 3410, based on the indication, one or more reversible join paths in the connected subgraph. For example, the one or more reversible joins paths may each connect a source vertex corresponding to a root table of the connected subgraph to a destination vertex corresponding to a shared dimension table of the connected subgraph that is shared with another root table of the connected subgraph. For example, the one or more reversible join paths in the connected subgraph may be identified 3410, based on the indication, as described in relation to FIG. 28.

The technique 3400 includes reversing 3420 the direction of at least one of the one or more reversible join paths by reversing one or more directed edges of the connected subgraph that are identified by the indication as corresponding to a one-to-one join. In some implementations, reversing 3420 the direction of the at least one of the one or more reversible join paths includes checking that the root table of the at least one of the one or more reversible join paths is still a root table of the modified subgraph; and/or checking that the shared dimension table corresponding to the destination vertex of the at least one of the one or more reversible join paths would not become a root table of the modified subgraph. For example, the direction of at least one of the one or more reversible join paths may be reversed 3420 as described in relation to FIG. 29.

Metadata Modeling

In some implementations, one-to-one joins may be applied as overrides to default relationships (e.g., many-to-one joins) within a worksheet. For example, an indication of a one-to-one join relationship between tables in a database may be treated similar to join type overrides. In some implementations, this property is set at the one-to-one relationship level, which may be implemented as changes to a database schema to specify a relationship as one-to-one through tql. Having the property at the worksheet level may satisfy use cases where the identification one-to-one joins may be helpful.

For example, a set called oneToOneJoins may be added to LogicalTableContent and in a worksheet proto. The set oneToOneJoins may contain the LogicalRelationship GUIDs of joins within a worksheet that are one-to-one joins. For example, set oneToOneJoins may be sent to a user interface (e.g., provided by the interface unit 1832) of database in a JSON (JavaScript Object Notation) format through a/metadata/details API (application programming interface) and received from the user interface with user updates through a/metadata/save API.

Figure 35:
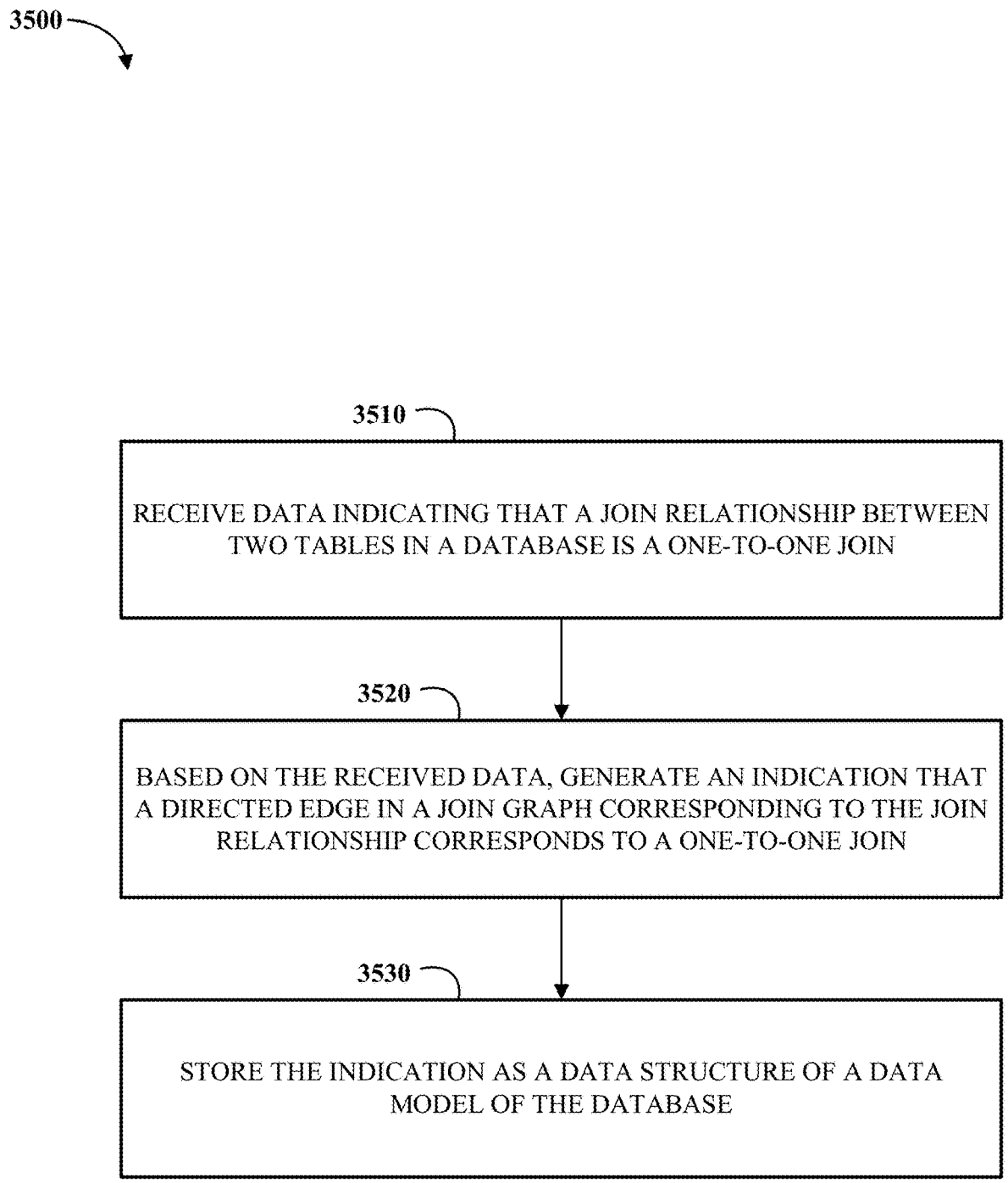
FIG. 35 is a flowchart illustrating an example of a technique for generating an indication that one or more directed edges of a join graph representing tables in a database correspond to a one-to-one join.

FIG. 35 is a flowchart illustrating an example of a technique 3500 for generating an indication that one or more directed edges of a join graph representing tables in a database correspond to a one-to-one join. The technique 3500 includes receiving 3510 data indicating that a join relationship between two tables in a database is a one-to-one join; based on the received data, generating 3520 an indication that a directed edge in a join graph corresponding to the join relationship corresponds to a one-to-one join; and storing 3530 the indication as a data structure of a data model of the database. For example, the technique 3500 may be implemented by the database analysis server 1830 of FIG. 18. For example, the technique 3500 may be implemented using the computing device 1900 of FIG. 19.

The technique 3500 includes receiving 3510 data indicating that a join relationship between two tables in a database is a one-to-one join (e.g., a fully intersecting join in which every row in the source table matches to exactly one row in the destination table, i.e., both tables are of the same grain). For example, the received 3510 data may be based on user input entered into a user interface (e.g., provided by the interface unit 1832) of for database. For example, the received 3510 data may be used to configure a data model (e.g., including a worksheet) for the database. For example, the data may be received 3510 by a server that is presenting a user interface (e.g., a webpage) to a user who is located at a remote location via communication messages over an electronic communications network (e.g., a wide area network). For example, the data may be received 3510 by a server presenting a user interface when a user types in a text field of the user interface and causes a message including the received 3510 data to be transmitted to the server. For example, a user may have entered the data in the user interface (e.g., a web page) by typing (e.g., using a keyboard) or by speaking (e.g., using a microphone and speech recognition module), and/or by interacting with an icon (e.g., using a mouse or a touchscreen).

For example, a user interface of a database interface system may support an "Edit Join Type" modal that appears in a "Joins Within this Worksheet" section, there could be a checkbox for 1:1 Joins with a link to documentation on this feature. This checkbox may populate a one-to-one joins set in a logical data model with the GUID of the associated logical relationship. For example, this one-to-one joins set can be read from a store with a /metadata/details call for the worksheet and sent back to the user interface with a /metadata/save call.

The technique 3500 includes, based on the received data, generating 3520 an indication that a directed edge in a join graph corresponding to the join relationship corresponds to a one-to-one join. For example, the generated 3520 indication may include an entry in a list of directed edges in a join graph for the database that correspond to one-to-one joins. For example, an entry in the list of one-to-one joins may include a pointer or another identifier of a data structure in the join graph that encodes the directed edge corresponding to the one-to-one join. In some implementations, the generated 3520 indication may include a Boolean flag or other data field (e.g., an unsigned integer) that is included in a data structure in the join graph that encodes the directed edge corresponding to the one-to-one join.

The technique 3500 includes storing 3530 the indication as a data structure of a data model of the database. For example, the indication may be stored 3530 as part of the join graph data structure that includes a representation of the directed edge that corresponds to the one-to-one join. For example, the indication may be stored 3530 as list including an identifier of the directed edge, where the list may be stored separately from the join graph data structure of the data model and may serve as an override to a default relationship (e.g., many-to-one join) associated with directed edges of the join graph. For example the list of one-to-one joins associated with a join graph may be empty by default.

In some implementations (not shown in FIG. 35), the generated 3520 indication may be stored as a data structure in the schema of the database. Thus, the indication may be shared by all users of the database. For example, let one-to-one join be a database schema level detail that users can specify when creating the join through tql. This way, the feature is not limited to join overrides within a worksheet, but can be applied to a join between two tables system wide.

Query Generation Based on Merger of Subqueries

In the an example of a query generation workflow, a parsed natural language query is sent through a series of transformers that modifies the original query and creates subqueries to ensure correct results from the database. The workflow includes a transformer at the end of this series of transforms that combines similar subqueries, sends less queries to the database, and ultimately speeds up performance.

When a user types a string in a query text interface bar, it is converted into a QuerySpec. This QuerySpec is then sent through a series of transformers in the query generation workflow that converts this QuerySpec to an accurate SQL query. That SQL query is sent to a database (e.g., an SQL database) and the results are displayed back to the user. The system adds a transformer at the end of the Query generation workflow that optimizes the query and improves performance in the system.

Some database interface systems may experience slowness and even timeouts when executing certain types of queries, such as queries with group_* functions, versus queries with aggregate formulas, versus all queries, and queries on aggregate worksheets. The types of queries described above may create multiple subqueries by transformers in the query generation workflow such as a PinnedMeasureTransformer or an AggregateWorksheetTransformer. Often times, several of the generated subqueries are very similar and could be consolidated into a single subquery.

Some of the systems and methods described herein may optimize the types of queries described above before sending them to the database, to speed up performance by the database and decrease the likelihood of a timeout occurring during execution. For example, a final transformer in the a query generation workflow may analyze a QuerySpec and identify subqueries that are candidates for merging with the following criteria: (A) two subqueries are mergeable if they share: (1.) The same join graph, meaning the root tables and the join types between those tables are the same, and (2.) the same grouping columns. (B) Additionally, a query is not able to be merged if it: (1.) has a having filter (e.g., a filter on an aggregate expression), (2.) is not a leaf table, (3.) Is expected to be in the results returned by an underlying database, (4.) has a windowing function, (5.) has an aggregate distinct function, or (6.) affects the number of groups in the final query. The final transformer may then consolidate the mergeable subqueries into a single subquery to reduce the number of subqueries invoked against the underlying database for the QuerySpec.

Figure 36:
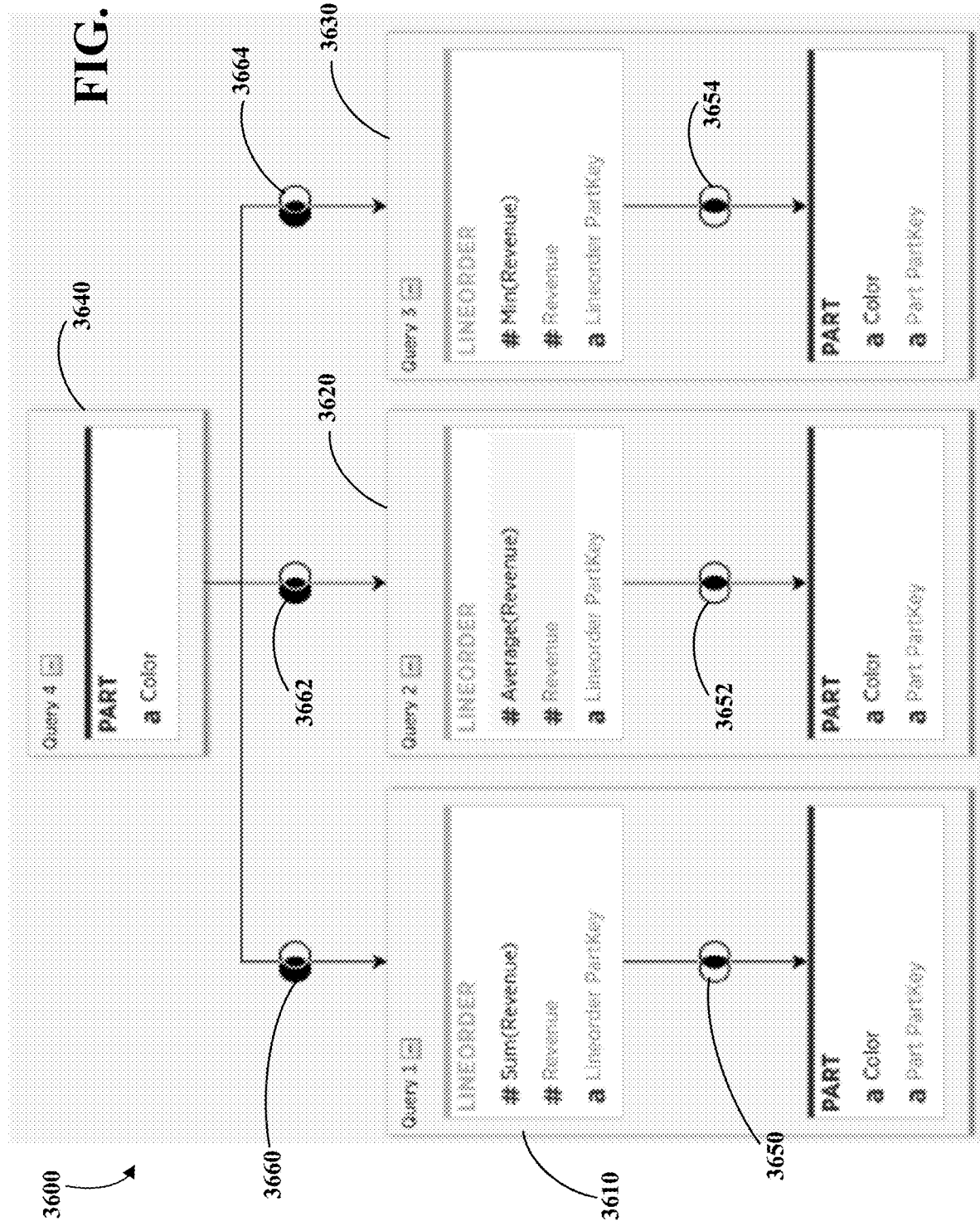
FIG. 36 is a diagram of an example of a query graph for illustrating a use case for transformation of a query by merging subqueries that are pinned measure queries.

FIG. 36 is a diagram of an example of a query graph 3600 for illustrating a use case for transformation of a query by merging subqueries that are pinned measure queries. Consider the query:

group_sum(revenue, color) group_average(revenue, color) group_min(revenue, color)

Each pinned measure formula will make a separate pinned measure query to the database, even though each of these queries have the same grouping and only differ in the aggregation. This query may be encoded by the query graph 3600. The query graph 3600 includes a first subquery 3610 corresponding to the group_sum, a second subquery 3620 corresponding to the group_average, a third subquery 3630 corresponding to the group_min, and an anchor query 3640 that combines the results. Each of the subqueries (3610, 3620, and 3630) includes an inner join (3650, 3652, and 3654) that is used to implement the grouping (i.e., by part color) that is common to all three of these three subqueries (3610, 3620, and 3630). The three subqueries (3610, 3620, and 3630) all have the same join graph since they all access the same two tables (a Lineorder table and a Part table) that are related by an inner join. access The results of these three subqueries (3610, 3620, and 3630) are merged into the anchor query using there left outer joins (3660, 3662, and 3664).

By default, when a system applies the query encoded by the query graph 3600 to a database, the database receives three queries that perform some aggregation of revenue grouped by color and joins those three queries with an anchor query for the final result. Thus, there is an opportunity for optimization that consolidates those three queries (3610, 3620, and 3630) into one query that performs all three aggregations at once because they are grouped the same way.

Figure 37:
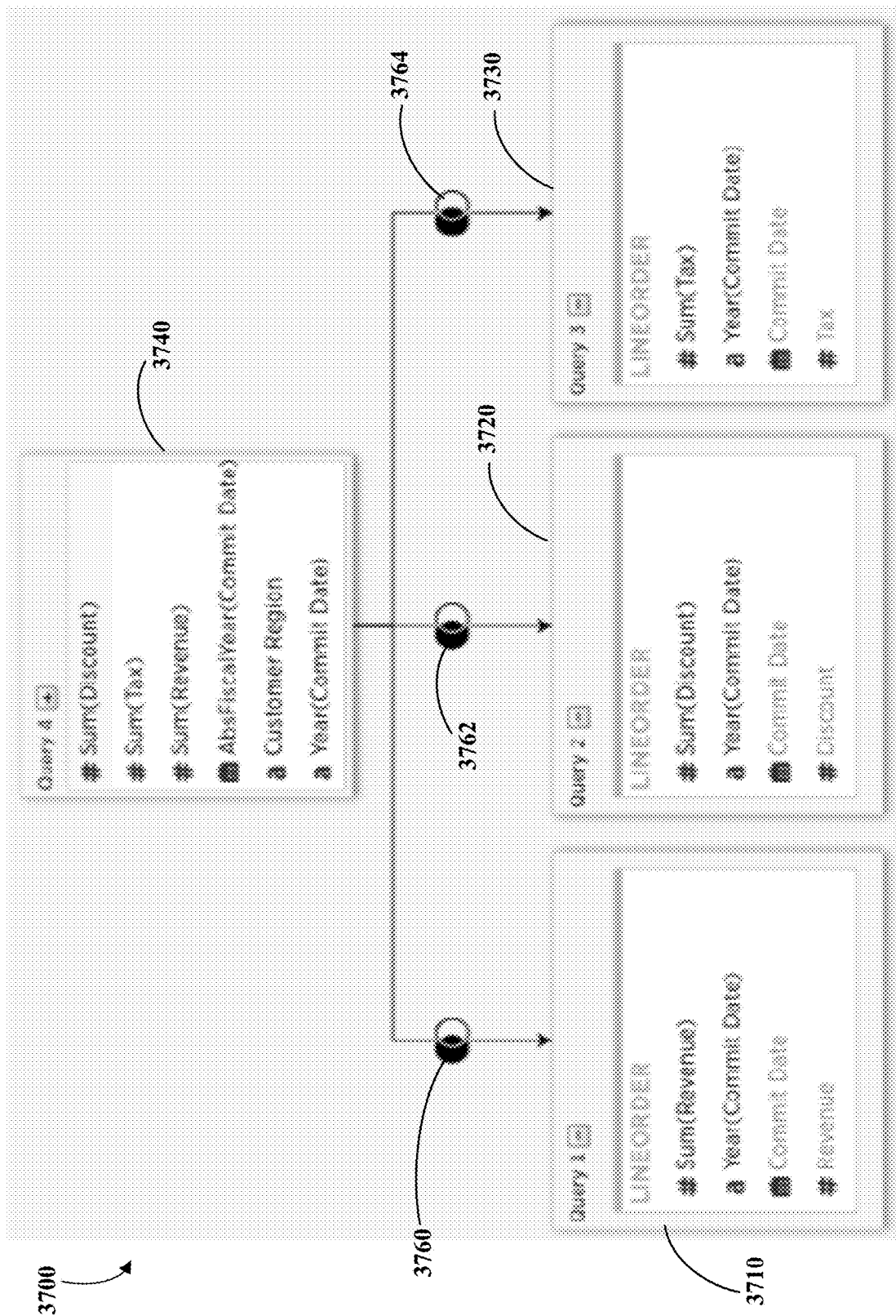
FIG. 37 is a diagram of an example of a query graph for illustrating a use case for transformation of a query by merging subqueries of a measure versus all query.

FIG. 37 is a diagram of an example of a query graph 3700 for illustrating a use case for transformation of a query by merging subqueries of a measure versus all query. Consider the query:

revenue tax discount customer region vs all yearly

For a "versus all" query, a separate query is made for each measure to create the "all" part of the results. This query may be encoded by the query graph 3700. The query graph 3700 includes a first subquery 3710 corresponding to the sum of revenue, a second subquery 3720 corresponding to the sum of discount, a third subquery 3730 corresponding to the sum of tax, and an anchor query 3740 that combines the results. The three subqueries (3710, 3720, and 3730) all have the same join graph since they all access the same single table (a Lineorder table). The results of these three subqueries (3710, 3720, and 3730) are merged into the anchor query using there left outer joins (3760, 3762, and 3764).

One query is made with all the measures grouped by all the grouping columns, including any in the versus clause (e.g., grouping columns referenced in the anchor query 3740). However, by default, when a system applies the query encoded by the query graph 3700 to a database, a separate query is made for each measure grouped by the grouping columns excluding those in the versus clause (e.g., the grouping columns of the first subquery 3710, the second subquery 3720 and the third subquery 3730). Thus, there is an opportunity for optimization that will merge these three queries to exploit this redundancy.

Figure 38:
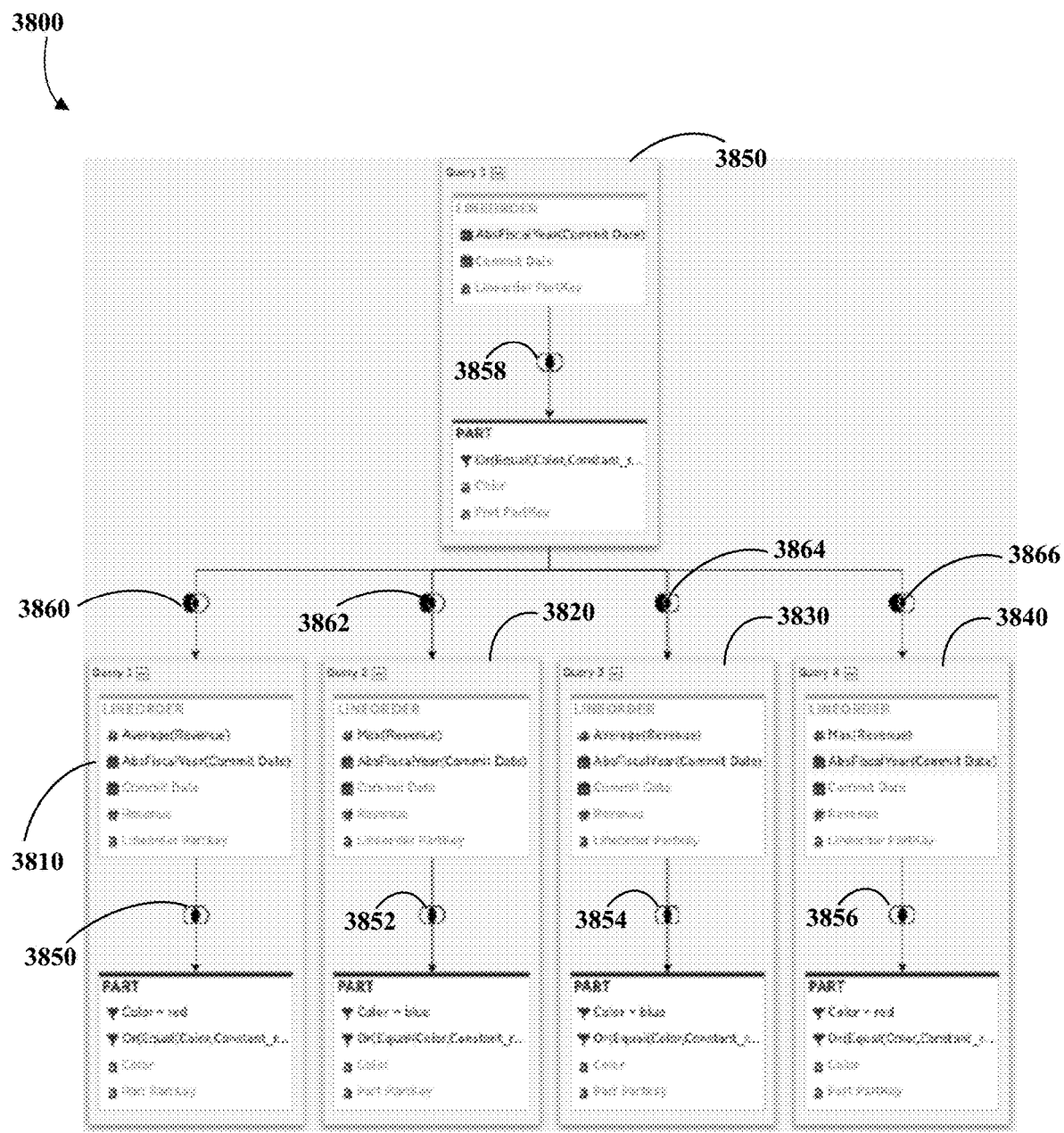
FIG. 38 is a diagram of an example of a query graph for illustrating a use case for transformation of a query by merging subqueries of an aggregate formula versus query.

FIG. 38 is a diagram of an example of a query graph 3800 for illustrating a use case for transformation of a query by merging subqueries of an aggregate formula versus query. Consider the query:

average(revenue) max(revenue) red vs blue yearly

This query may be encoded by the query graph 3800. The query graph 3800 includes a first subquery 3810 corresponding to the average revenue for red parts, a second subquery 3820 corresponding to the maximum revenue for blue parts, a third subquery 3830 corresponding to the average revenue for blue parts, a fourth subquery 3840 corresponding to the maximum revenue for red parts, and an anchor query 3850 that combines the results. Each of the subqueries (3810, 3820, 3830, and 3840) includes an inner join (3850, 3852, 3854, and 3856) that is used to implement the grouping (i.e., by part color) relevant for the respective subquery. The four subqueries (3810, 3820, 3830, and 3840) all have the same join graph since they all access the same two tables (a Lineorder table and a Part table) that are related by an inner join. The anchor query 3850 includes an inner join 3858.

The results of these four subqueries (3810, 3820, 3830 and 3840) are merged into the anchor query using left-outer joins (3860, 3862, 3864, and 3666).

One issue that comes up here is when the mergeable queries have different filters. This can potentially lead to wrong results because the merged query would have a different number of groups than originally expected. One optimization is to introduce a constraint that mergeable queries have the same filters as well, which would reduce the number of queries by an order of the number of filters in the versus clause. For example, the first subquery 3810 and the fourth subquery 3840 may be combined as:

average(revenue) max(revenue) yearly color=red

While the second subquery 3820 and the third subquery 3830 may be combined as:

average(revenue) max(revenue) yearly color=blue

However, it may be better to consolidate all of these repetitive aggregations into a single query.

Another issue comes from how the mergeable queries are joined to the query tree. Consider queries the first subquery 3810 and the second subquery 3820, which are otherwise mergeable. The goal of an algorithm may be to replace each one with a merged query (Q_M), which might have more groups than the original queries. Since the join 3860 and the join 3862 are left-outer joins, then there is no problem because neither the groups of first subquery 3810 or the second subquery 3820 (pre-optimization) or the groups of Q_M (post-optimization) would be honored. To generalize, if the mergeable queries are on the opposite side of a left/right outer join, then their granularity does not influence the final result, so increasing their granularity by merging them will continue to not influence the final result. If the join 3860 or the join 3862 were a right-outer join or an inner join, then increasing the granularity would potentially bring in more groups, which would propagate down to the final result.

A transformer (e.g., the subquery merge transformer 531) may be introduced to combine any mergeable queries into a single query to send to the database. For example, transformer may implement an algorithm with three main steps. To illustrates these steps, consider processing of the example query:

sum(revenue) red vs blue type

The following table shows an example of a decomposition of this query into a set of subqueries.

| Q0 | Q1 | Q2 | Q3 |
|---|---|---|---|
| c1: type | c1: sum(revenue)<br>c2: type<br>where color=red | c1: sum(revenue)<br>c2: type<br>where color=blue | c1: Q0.c1<br>c2: Q1.c1<br>c3: Q2.c1 |

Step 1: Identify mergeable query groups.

Traverse the query specification and group together subqueries that share the following properties: (1) Access the same set of tables in the database. (2) Use the same joins between those tables. (3) Have the same grouping columns. (4) Do not influence the granularity of the final query (left side of a Right Outer Join or right side of a Left Outer Join). (5) Do not have any having filters.

After this step, no changes have been made to the query tree, but Q1 and Q2 have been identified as mergeable.

Step 2: Create a merged query for each mergeable query group.

This merged query may have the grouping columns common to the mergeable queries and measures from each of the mergeable queries. For example, filters on the mergeable queries may be pushed into the measures in the form of the Aggregation_If formula. The following table shows an example of the set subqueries augmented with a merged query (Q_M).

| Q0 | Q1 | Q2 | Q3 | Q_M |
|---|---|---|---|---|
| c1: type | c1: sum(revenue)<br>c2: type<br>where color=blue | c1: sum(revenue)<br>c2: type<br>where color=red | c1: Q0.c1<br>c2: Q1.c1<br>c3: Q2.c1 | c1: sum_if(revenue, color=red)<br>c2: sum_if(revenue, color=blue)<br>c3: type |

Again, no changes were made to the query tree, but notice the new query Q_M, that is a merged representation of Q1 and Q2.

Step 3: Modify the dependents of the mergeable queries to use the results of the merged query.

Instead of selecting the aggregation from the mergeable query, these queries will select the appropriate Aggregation_If formula from the merged query. Since the Aggregation_If formula evaluates to NULL for groups that evaluate to false for the filter in the formula, a filter where column !=NULL may be applied to preserve the same number of groups as the original query. The following table shows an example of a transformed set subqueries using a merged query (Q_M) that has replaced Q1 and Q2.

| Q0 | Q_M | Q3 |
|---|---|---|
| c1: type | c1: sum_if(revenue, color=red)<br>c2: sum_if(revenue, color=blue)<br>c3: type | c1: Q0.c1<br>c2: not_null(Q_M.c1)<br>c3: not_null(Q_M.c2) |

For example, for the use case illustrated in FIG. 36, the transformer may combine x queries into 1 where x is the # of pinned measure formulas with the same grouping in the original query.

For example, for the use case illustrated in FIG. 37, the transformer may combine x queries into 1 where x is the # of measures in the original query.

For example, for the use case illustrated in FIG. 38, the transformer may combine x queries into 1 where x is the # of aggregate formulas * the # of filters in the versus clause.

In some implementations, flags may be used to toggle whether the transformer is applied. In some implementations, NULLS present in the original result may be filtered out. In some implementations, if a fan trap is present and the join type is not left-outer, mergeable queries may not be identified because of a left-outer join requirement. For example, a solution to address this circumstance may include checking a Least Common Ancestor (LCA) of a potentially mergeable query and the anchor table and ensuring that the LCA has a left-outer join.

Figure 39:
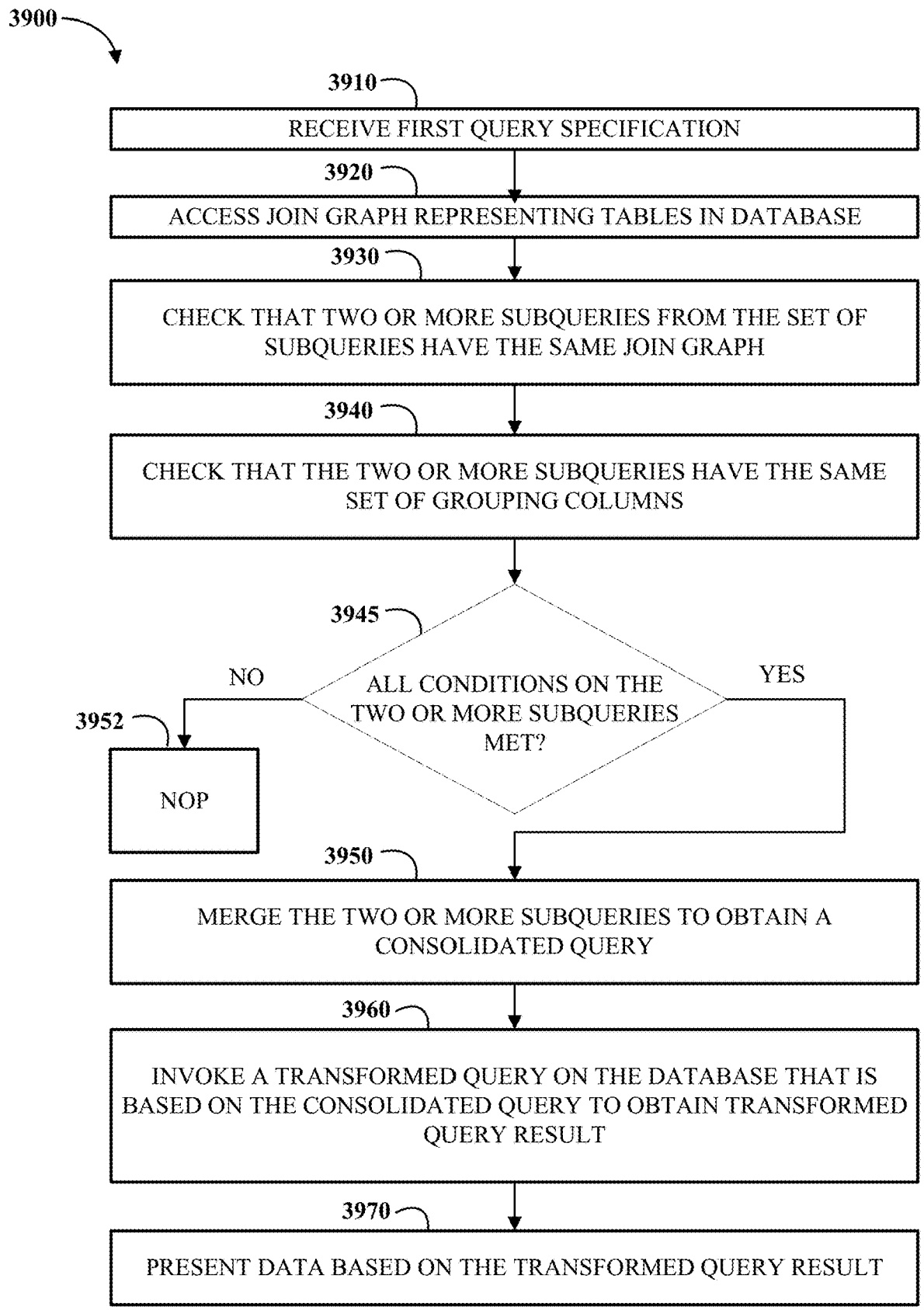
FIG. 39 is a flowchart illustrating an example of a technique for transforming a query by merging subqueries.

FIG. 39 is a flowchart illustrating an example of a technique 3900 for transforming a query by merging subqueries. The technique 3900 includes receiving 3910 a first query specification that references data in two or more of the tables of the database to specify multiple subqueries in a set of subqueries; accessing 3920 a first join graph representing tables in a database; checking 3930 that two or more subqueries from the set of subqueries have the same join graph; checking 3940 that the two or more subqueries have the same set of grouping columns; if (at step 3945) all conditions on the two or more subqueries are met, then merging 3950 the two or more subqueries to obtain a consolidated query; invoking 3960 a transformed query on the database that is based on the consolidated query to obtain a transformed query result; and presenting 3970 data based on the transformed query result. For example, the technique 3900 may be implemented by the query transformer 510 of FIG. 5. For example, the technique 3900 may be implemented by the database analysis server 1830 of FIG. 18. For example, the technique 3900 may be implemented using the computing device 1900 of FIG. 19. For example, the technique 3900 may be used to implement the subquery merge transformer 531 of FIG. 5.

The technique 3900 includes receiving 3910 a first query specification that references data in two or more of the tables of the database to specify multiple subqueries in a set of subqueries. In some implementations, the multiple subqueries in a set of subqueries are encoded as leaf queries of a query graph (e.g., similar to the query graph 1400 or the query graph 1500). For example, the first query specification may represent a question or a command for a database analysis system (e.g., a system including the database analysis server 1830). For example, the first query specification may be received 3910 by a server that is presenting a user interface (e.g., a webpage) to a user who is located at a remote location via communication messages over an electronic communications network (e.g., a wide area network). For example, the first query specification may be received 3910 by a server presenting a user interface when a user types in a search bar of the user interface and causes a message including the first query specification to be transmitted to the server. For example, a user may have generated the first query using the user interface (e.g., a web page) by typing (e.g., using a keyboard) or by speaking (e.g., using a microphone and speech recognition module). In some implementations, the first query specification is not modified by the server or other device that receives 3910 the first query specification. In some implementations, receiving 3910 the first query specification includes performing preliminary transformations on data received from a remote device to convert the query specification to a proper format for subsequent analysis. For example, receiving 3910 the first query specification may include receiving a query specification (e.g., the query specification 502) from a remote device (e.g., a user's personal computing device) and applying one or more transformations (e.g., using the worksheet transformer 520, the group function transformer 522, the windowing function transformer 524, and/or the multi-root query transformer 526) to the query specification to determine the first query specification. The first query specification may then be passed on for subsequent processing (e.g., passed into the subquery merge transformer 531).

The technique 3900 includes accessing 3920 a first join graph (e.g., the join graph 100 of FIG. 1) representing tables in a database. The first join graph has vertices corresponding to respective tables in the database and directed edges corresponding to join relationships. For example, the first join graph may be part of a data-model data structure that describes a logical structure of data stored in the database. For example, the first join graph may be stored in a variety of formats, such as a graph data structure with vertex records that include identifiers (e.g., names and/or pointers) for respective tables stored in the database. In some implementations, the join graph encodes logical relationships of tables in a worksheet (e.g., the worksheet W described above). For example, accessing 3920 the first join graph may include reading a data structure including the first join graph from a memory (e.g., the static memory 1920 or the low-latency memory 1930 of FIG. 19). For example, accessing 3920 the first join graph may include receiving data including the first join graph from a remote device (e.g., the database 572 of FIG. 5 or the external data source 1810 of FIG. 18) in communications received via a communications interface (e.g., the electronic communication unit 1940 of FIG. 19).

The technique 3900 includes checking 3930 that two or more subqueries from the set of subqueries have the same join graph. Two subqueries have the same join graph if they access the same tables and the join types between those tables are the same. For example, the join graph of a subquery may be a connected subgraph (e.g., similar to the connected subgraph 200 or the connected subgraph 300) of first join graph corresponding to that subquery. For example, two subqueries with the same join graph may have been generated by an earlier transformer applied to the first query specification, such as the group function transformer 522 or the views transformer 530.

The technique 3900 includes checking 3940 that the two or more subqueries have the same set of grouping columns. For example, two subqueries with the same set of grouping columns may have been generated by an earlier transformer applied to the first query specification. In some implementations, the first query specification was generated based in part by a group function transformer (e.g., the group function transformer 522) decomposing a query to generate multiple subqueries in the set of subqueries. For example, two subqueries that both lack grouping columns have the same set of grouping columns (i.e., an empty set of grouping columns).

If (at step 3945) all of the conditions for merging on the two or more subqueries are met, then the technique 3900 includes, responsive, at least in part, to the two or more subqueries having the same join graph and the same set of grouping columns, merging 3950 the two or more subqueries to obtain a consolidated query. For example, merging 3950 the two or more subqueries to obtain a consolidated query may include consolidating all of the aggregations of the two or more subqueries into a single consolidated subquery. For example, one or more other subqueries in the set of subqueries may be modified to access results of the consolidated query rather than the two or more subqueries that it is replacing. In some implementations, additional conditions for merging the two or more subqueries are checked before determining whether to merge 3950 the two or more subqueries. For example, one or more of the conditions checked by the technique 4000 of FIG. 40 may be checked and considered at step 3945. For example, the technique 3900 may include implementing the technique 4000 of FIG. 4000.

The technique 3900 includes invoking 3960 a transformed query on the database that is based on the consolidated query to obtain a transformed query result. In some implementations, the transformed query based on the consolidated query is simply the simply the consolidated query itself. In some implementations, the transformed query may be determined solely based on the query graph and the queries based on the multiple leaf queries. The transformed query (e.g., in a database agnostic syntax) may specify a logical set of operations for accessing and/or processing data available in the database. In some implementations, the transformed query is invoked 3960 by transmitting (e.g., via an electronic communications network) a request or command message including the transformed query to an external database server (e.g., the database 572 of FIG. 5 or the external data source 1810 of FIG. 18) that in turn executes a search specified by the transformed query on the database and returns the transformed query result. In some implementations, the transformed query is invoked 3960 by executing a search specified by the transformed query on the database, which may have data stored or cached locally (e.g., in high-speed volatile memory), to generate the transformed query result locally. For example, the transformed query may be encoded in the same format as the first query. In some implementations, the transformed query may be encoded in a different format than the first query in order to match the syntax requirements of a database server managing the database (e.g., an external database or a locally stored database). For example, the transformed query may be in a defined structured data access language (e.g., Structured Query Language (SQL) or a similar language), and may be determined based on a sequence of tokens of a database syntax of the first query. For example, the transformed query may be in another query format supported by a local or remote database server, and may be determined based on a sequence of tokens of the database syntax of the first query.

The technique 3900 includes presenting 3970 data based on the transformed query result. For example, raw data, summary data, and/or plots or charts of the transformed query result may be presented 3970 in a user interface (e.g., a webpage). In some implementations, a summary and/or visual formatting of the data may be determined based on a configuration record (e.g., including user preferences) of the user interface and/or the transformed query result by a machine learning module (e.g., including a neural network) that is trained to identify relevant aspects of data in the context of one or more databases and use cases, and select an appropriate display format. For example, the data based on the transformed query result may be presented 3970 by transmitting the data as part of the user interface in messages sent via an electronic communications network (e.g., as part of a websocket over a wide area network). In some implementations, the data based on the transformed query result may be presented 3970 in signals passed to a directly connected display for viewing by a user co-located with a computing device implementing the technique 3900.

If (at step 3945) any of the applicable conditions for merging on the two or more subqueries are not met, then a NOP 3952 occurs and the two or more subqueries are not merged 3950. Although not shown explicitly in FIG. 39, in this case, a query based on the first query specification, without merging 3950, may be invoked on the database to obtain a query result, and data based on the query result may be presented.

Although the technique 3900 is shown as a series of operations for clarity, implementations of the technique 3900 or any other technique or algorithm described in connection with the implementations disclosed herein can be performed in various orders or concurrently. Additionally, operations in accordance with this disclosure can be performed with other operations not presented and described herein. Furthermore, one or more aspects of the systems and techniques described herein can be omitted. For example, in some implementations, the operation presenting 3970 data based on the transformed query result may be omitted from the technique 3900.

Figure 40:
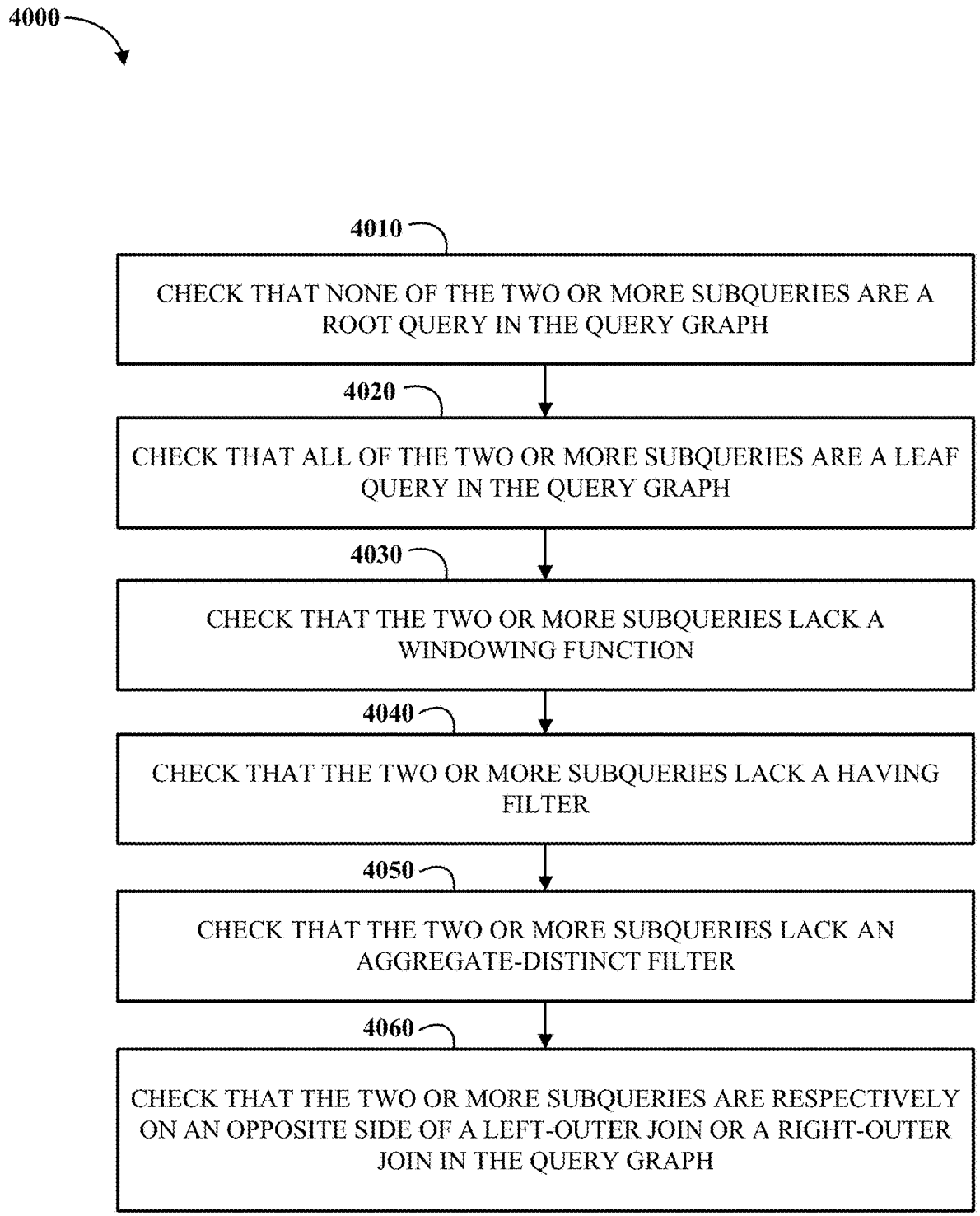
FIG. 40 is a flowchart illustrating an example of a technique for checking conditions for subqueries to be merged.

FIG. 40 is a flowchart illustrating an example of a technique 4000 for checking conditions for subqueries to be merged. The technique 4000 includes checking 4010 that none of the two or more subqueries are a root query in a query graph; checking 4020 that all of the two or more subqueries are a leaf query in a query graph; checking 4030 that the two or more subqueries lack a windowing function; checking 4040 that the two or more subqueries lack a having filter; checking 4050 that the two or more subqueries lack an aggregate-distinct filter; checking 4060 that the two or more subqueries are respectively on an opposite side of a left-outer join or a right-outer join in a query graph. For example, the technique 4000 may be implemented by the query transformer 510 of FIG. 5. For example, the technique 4000 may be implemented by the database analysis server 1830 of FIG. 18. For example, the technique 4000 may be implemented using the computing device 1900 of FIG. 19. For example, the technique 4000 may be used to implement the subquery merge transformer 531 of FIG. 5.

The technique 4000 includes checking 4010 that none of the two or more subqueries are a root query in a query graph. The set of subqueries of the first query specification may related by the query graph (e.g., similar to the query graph 1400, the query graph 1500, or the query graph 2400). In some implementations, it is desirable to avoid merging final queries, which should have their results returned directly to a user (i.e., without the results being further queried as an intermediate step). For example, a query specification may indicate one or more final queries whose results are determined and returned to a user. These one or more final queries may correspond to root queries in a query graph. If one of the two or more subqueries is a root query, then the subqueries will not be merged 3950.

The technique 4000 includes checking 4020 that all of the two or more subqueries are a leaf query in a query graph. The two or more subqueries to be merged should access database tables directly, rather than operating on results of other subqueries. If one of the two or more subqueries is not a leaf query, then the subqueries will not be merged 3950.

The technique 4000 includes checking 4030 that the two or more subqueries lack a windowing function. For example, a cumulative aggregate function or moving aggregate function are windowing functions. If one of the two or more subqueries includes a windowing function, then the subqueries will not be merged 3950.

The technique 4000 includes checking 4040 that the two or more subqueries lack a having filter. A having filter is if a filter that is applied after an aggregation function to disqualify elements of query result by group. If a having filter is present in one of the two or more subqueries, then the subqueries will not be merged 3950.

The technique 4000 includes checking 4050 that the two or more subqueries lack an aggregate-distinct filter. An aggregate-distinct filter returns unique values from a column per group. If one of the two or more subqueries includes an aggregate-distinct filter, then the subqueries will not be merged 3950.

The technique 4000 includes checking 4060 that the two or more subqueries are respectively on an opposite side of a left-outer join or a right-outer join in the query graph. To ensure that the query results are unchanged by the merging 3950 of the two or more subqueries, it may be helpful to check the join structure associated with the subqueries in the query graph of the first query specification. In some implementations, a join structure that makes the groups present in the final result independent of the groups present in the two or more queries to be merged 3950 is preferred. For example, if a subquery is on the right side of a left-outer join, then it cannot affect the groups included in the final result. Similarly, if a subquery is on the left side of a right-outer join, then it cannot affect the groups included in the final result. Thus, when the two or more subqueries are respectively on an opposite side (e.g., the left side of a right-outer join or the right side of a left-outer join) of a left-outer join or a right-outer join in the query graph, the merging 3950 of the two or more subqueries will not affect the groups included in the final result. If one of the two or more subqueries is not on an opposite side of a left-outer join or a right-outer join in the query graph, then the subqueries will not be merged 3950.

Although the technique 4000 is shown as a series of operations for clarity, implementations of the technique 4000 or any other technique or algorithm described in connection with the implementations disclosed herein can be performed in various orders or concurrently. Additionally, operations in accordance with this disclosure can be performed with other operations not presented and described herein. Furthermore, one or more aspects of the systems and techniques described herein can be omitted. For example, in some implementations, the operation checking 4050 that the two or more subqueries lack an aggregate-distinct filter may be omitted from the technique 4000.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent arrangements.

What is claimed is:

1. A method comprising:
    accessing a first join graph representing tables in a database, wherein the first join graph has vertices corresponding to respective tables in the database and directed edges corresponding to join relationships;
    receiving a first query specification that references data in two or more of the tables of the database to specify multiple subqueries in a set of subqueries;
    determining that two or more subqueries from the set of subqueries have the same connected subgraph of the first join graph;
    determining that the two or more subqueries have the same set of grouping columns;
    responsive to determining that the two or more subqueries having have the same connected subgraph of the first join graph and the same set of grouping columns, merging the two or more subqueries to obtain a consolidated query;
    invoking a transformed query on the database that is based on the consolidated query to obtain a transformed query result; and
    presenting data based on the transformed query result.

2. The method of claim 1, wherein the set of subqueries are related by a query graph, and comprising:
    checking that none of the two or more subqueries are a root query in the query graph.

3. The method of claim 1, wherein the set of subqueries are related by a query graph, and comprising:
    checking that all of the two or more subqueries are a leaf query in the query graph.

4. The method of claim 1, comprising:
    checking that the two or more subqueries lack a windowing function.

5. The method of claim 1, comprising:
    checking that the two or more subqueries lack a having filter.

6. The method of claim 1, comprising:
    checking that the two or more subqueries lack an aggregate-distinct filter.

7. The method of claim 1, wherein the set of subqueries are related by a query graph, and comprising:
    checking that the two or more subqueries are respectively on an opposite side of a left-outer join or a right-outer join in the query graph.

8. The method of claim 1, wherein the first query specification was generated based in part by a group function transformer decomposing a query to generate multiple subqueries in the set of subqueries.

9. A system, comprising:
    a network interface,
    a processor, and
    a memory, wherein the memory stores instructions executable by the processor to:
        access a first join graph representing tables in a database, wherein the first join graph has vertices corresponding to respective tables in the database and directed edges corresponding to join relationships;
        receive a first query specification that references data in two or more of the tables of the database to specify multiple subqueries in a set of subqueries;
        determine that two or more subqueries from the set of subqueries have the same connected subgraph of the first join graph;
        determine that the two or more subqueries have the same set of grouping columns; and
        responsive to a determination that the two or more subqueries have the same connected subgraph of the first join graph and the same set of grouping columns, merge the two or more subqueries to obtain a consolidated query.

10. The system of claim 9, wherein the set of subqueries are related by a query graph, and the memory stores instructions executable by the processor to:
    check that none of the two or more subqueries are a root query in the query graph.

11. The system of claim 9, wherein the set of subqueries are related by a query graph, and the memory stores instructions executable by the processor to:
    determining that the respective subqueries of the two or more subqueries are respective leaf queries in the query graph.

12. The system of claim 9, wherein the memory stores instructions executable by the processor to:
    check that the two or more subqueries lack a windowing function.

13. The system of claim 9, wherein the memory stores instructions executable by the processor to:
    check that the two or more subqueries lack a having filter.

14. The system of claim 9, wherein the memory stores instructions executable by the processor to:
    check that the two or more subqueries lack an aggregate-distinct filter.

15. The system of claim 9, wherein the set of subqueries are related by a query graph, and the memory stores instructions executable by the processor to:
    check that the two or more subqueries are respectively on an opposite side of a left-outer join or a right-outer join in the query graph.

16. The system of claim 9, wherein the first query specification is generated based in part by a group function transformer decomposing a query to generate multiple subqueries in the set of subqueries.

17. A non-transitory computer-readable storage medium that includes instructions that, when executed by a processor, facilitate performance of operations comprising:
- accessing a first join graph representing tables in a database, wherein the first join graph has vertices corresponding to respective tables in the database and directed edges corresponding to join relationships;
- receiving a first query specification that references data in two or more of the tables of the database to specify multiple subqueries in a set of subqueries;
- determining that two or more subqueries from the set of subqueries have the same connected subgraph of the first join graph;
- determining that the two or more subqueries have the same set of grouping columns;
- responsive to determining that the two or more subqueries have the same connected subgraph of the first join graph and the same set of grouping columns, merging the two or more subqueries to obtain a consolidated query;
- invoking a transformed query on the database that is based on the consolidated query to obtain a transformed query result; and
- presenting data based on the transformed query result.

18. The non-transitory computer-readable storage medium of claim 17, wherein the set of subqueries are related by a query graph, and including instructions that, when executed by a processor, facilitate performance of operations comprising:
- checking that none of the two or more subqueries are a root query in the query graph.

19. The non-transitory computer-readable storage medium of claim 17, wherein the set of subqueries are related by a query graph, and including instructions that, when executed by a processor, facilitate performance of operations comprising:
- checking that all of the two or more subqueries are a leaf query in the query graph.

20. The non-transitory computer-readable storage medium of claim 17, including instructions that, when executed by a processor, facilitate performance of operations comprising:
- checking that the two or more subqueries lack a windowing function.

* * * * *